US012545695B2

(12) United States Patent
Kang et al.

(10) Patent No.: US 12,545,695 B2
(45) Date of Patent: *Feb. 10, 2026

(54) COMPOUNDS FOR INHIBITING NEOVASCULARIZATION FACTORS AND USE THEREOF

(71) Applicants: UNIST (ULSAN NATIONAL INSTITUTE OF SCIENCE AND TECHNOLOGY), Ulsan (KR); SMARTIN BIO INC., Chungcheongbuk-do (KR)

(72) Inventors: Byoung Heon Kang, Ulsan (KR); So-Yeon Kim, Ulsan (KR); Nam Gu Yoon, Ulsan (KR); Changwook Lee, Ulsan (KR); Dong Ho Park, Daegu (KR)

(73) Assignees: UNIST (ULSAN NATIONAL INSTITUTE OF SCIENCE AND TECHNOLOGY), Ulsan (KR); SMARTIN BIO INC., Chungcheongbuk-do (KR)

( * ) Notice: Subject to any disclaimer, the term of this patent is extended or adjusted under 35 U.S.C. 154(b) by 842 days.

This patent is subject to a terminal disclaimer.

(21) Appl. No.: 17/784,969

(22) PCT Filed: Dec. 16, 2020

(86) PCT No.: PCT/KR2020/018475
§ 371 (c)(1),
(2) Date: Jun. 13, 2022

(87) PCT Pub. No.: WO2021/125800
PCT Pub. Date: Jun. 24, 2021

(65) Prior Publication Data
US 2023/0088747 A1 Mar. 23, 2023

(30) Foreign Application Priority Data
Dec. 16, 2019 (KR) .................. 10-2019-0168238

(51) Int. Cl.
*C07F 9/54* (2006.01)
*A61K 9/00* (2006.01)
*A61P 21/02* (2006.01)
*A61P 27/02* (2006.01)

(52) U.S. Cl.
CPC .......... *C07F 9/5442* (2013.01); *A61K 9/0048* (2013.01); *A61P 27/02* (2018.01)

(58) Field of Classification Search
None
See application file for complete search history.

(56) References Cited

U.S. PATENT DOCUMENTS

| | | | |
|---|---|---|---|
| 2005/0043553 A1 | 2/2005 | Smith et al. | |
| 2006/0229278 A1 | 10/2006 | Taylor et al. | |
| 2010/0297262 A1 | 11/2010 | Basu et al. | |

FOREIGN PATENT DOCUMENTS

| | | |
|---|---|---|
| CN | 102438615 A | 5/2012 |
| JP | 2012-524074 A | 10/2012 |
| KR | 2007/0030815 A | 3/2007 |
| KR | 2010/0003306 A | 1/2010 |
| KR | 2012/0008056 A | 1/2012 |
| KR | 101414922 B1 | 7/2014 |
| WO | WO-2021/125800 A1 | 6/2021 |

OTHER PUBLICATIONS

Grant & Hackh's Chemical Dictionary (5th Ed. 1987) at p. 148.*
Chemical Abstract Registry No. 1252673-56-5, indexed in the Registry File on STN CAS Online Nov. 11, 2010.*
Campochiaro, "Ocular Neovascularization," J. Mol. Med. (Berl). Mar. 2013; 91(3): 311-321.
Chames et al., "Therapeutic antibodies: successes, limitations and hopes for the future," Br. J. Pharmacol. May 2009;157(2): 220-233.
Chan Chae et al., "Control of Tumor Bioenergetics and Survival Stress Signaling by Mitochondrial HSP90s," Cancer Cell. Sep. 11, 2012;22(3):331-344.
Gewirth., "Paralog specific Hsp90 Inhibitors—a brief history and a bright future," Curr Top Med Chem. 2016; 16(25): 2779-2791.
International Search Report and Written Opinion for PCT/KR2020/018475 dated Jun. 24, 2021 w/ translated Search Report.
Kamba et al., "Mechanisms of adverse effects of anti-VEGF therapy for cancer," Br. J. Cancer, Jun. 18, 2007;96(12):1788-1795.
Masgras et al., "The Chaperone TRAP1 As a Modulator of the Mitochondrial Adaptations in Cancer Cells," Front Oncol. Mar. 29, 2017;7:Article 58 pp. 1-10.
Meadows et al., "Anti-VEGF Therapies in the Clinic," Cold Spring Harb Perspect Med. Oct. 1, 2012;2(10): 28 pages.
Onnis et al., "Development of HIF-1 inhibitors for cancer therapy," J. Cell. Mol. Med. vol. 13, No. 9A, 2009 pp. 2780-2786.
Verba et al., "Atomic structure of Hsp90-Cdc37-Cdk4 reveals that Hsp90 traps and stabilizes an unfolded kinase," Science. Jun. 24, 2016;352(6293):1542-1547.
Yuno et al., "Clinical Evaluation and Biomarker Profiling of Hsp90 Inhibitors," Stuart K. Calderwood and Thomas L. Prince, Chaperones: Methods and Protocols, Humana Press, 2018, pp. 424-441.
Zirlik et al., "Anti-Angiogenics: Current Situation and Future Perspectives," Oncol. Res. Treat., 2018;41(4):166-171.
Extended European Search Report for EP Application No. 20902617.8 dated Dec. 8, 2023.
Office Action for CN Application No. 202080090674.9 dated Jul. 29, 2023.

(Continued)

Primary Examiner — Po-Chih Chen
(74) Attorney, Agent, or Firm — Foley Hoag LLP; David P. Halstead

(57) ABSTRACT

The present specification relates to compounds for inhibiting neovascularization factors and use thereof. Furthermore, the present specification relates to methods for treating neovascularization diseases using the compounds.

8 Claims, 26 Drawing Sheets

(56) References Cited

OTHER PUBLICATIONS

Database Registry CAS, Accession No. RN 1097264-20-4, Entered STN: Jan. 28, 2009.
Database Registry CAS, Accession No. RN 1097264-21-5, Entered STN: Jan. 28, 2009.
Database Registry CAS, Accession No. RN 1097264-22-6, Entered STN: Jan. 28, 2009.
Database Registry CAS, Accession No. RN 1097264-23-7, Entered STN: Jan. 28, 2009.
Database Registry CAS, Accession No. RN 1097264-24-8, Entered STN: Jan. 28, 2009.
Database Registry CAS, Accession No. RN 1097264-25-9, Entered STN: Jan. 28, 2009.
Database Registry CAS, Accession No. RN 1443829-34-2, Entered STN: Jul. 14, 2013.
Database Registry CAS, Accession No. RN 2020059-12-3, Entered STN: Oct. 26, 2016.
Database Registry CAS, Accession No. RN 2020059-14-5, Entered STN: Oct. 26, 2016.
Database Registry CAS, Accession No. RN 2020059-16-7, Entered STN: Oct. 26, 2016.
Database Registry CAS, Accession No. RN 736106-69-7, Entered STN: Aug. 30, 2004.
Database Registry CAS, Accession No. RN 744954-06-1, Entered STN: Sep. 15, 2004.
Database Registry CAS, Accession No. RN 751438-91-2, Entered STN: Sep. 24, 2004.
Database Registry CAS, Accession No. RN 757154-83-9, Entered STN: Oct. 5, 2004.
Database Registry CAS, Accession No. RN 758645-04-4, Entered STN: Oct. 8, 2004.
Database Registry CAS, Accession No. RN 775538-34-6, Entered STN: Nov. 7, 2004.
Database Registry CAS, Accession No. RN 779287-78-4, Entered STN: Nov. 11, 2004.
Database Registry CAS, Accession No. RN 792893-94-8, Entered STN: Dec. 6, 2004.
Database Registry CAS, Accession No. RN 952180-97-1, Entered STN: Oct. 31, 2007.
Office Action for JP Application No. 2022-536658 dated Mar. 4, 2025.
Ortega et al., "5-Alkylresorcinol derivatives from the bryozoan Schizomavella mamillata: isolation, synthesis, and antioxidant activity." Marine Drugs 15 (2017): 344.
Yao et al., "Development of novel tail-modified anandamide analogs." Bioorganic & Medicinal Chemistry Letters 18(22) (2008): 5912-5915.

\* cited by examiner

[FIG. 10]
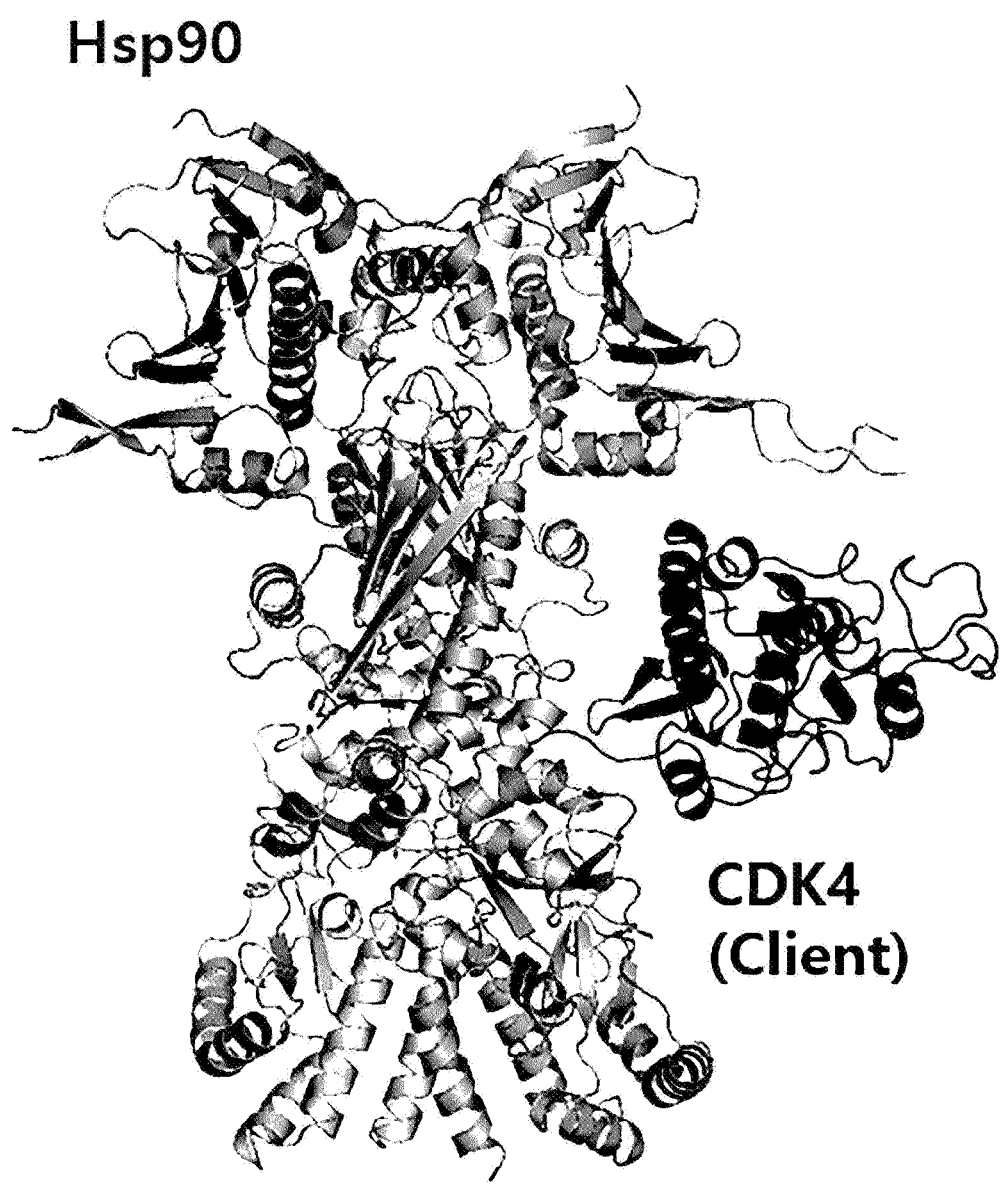

[FIG. 11]
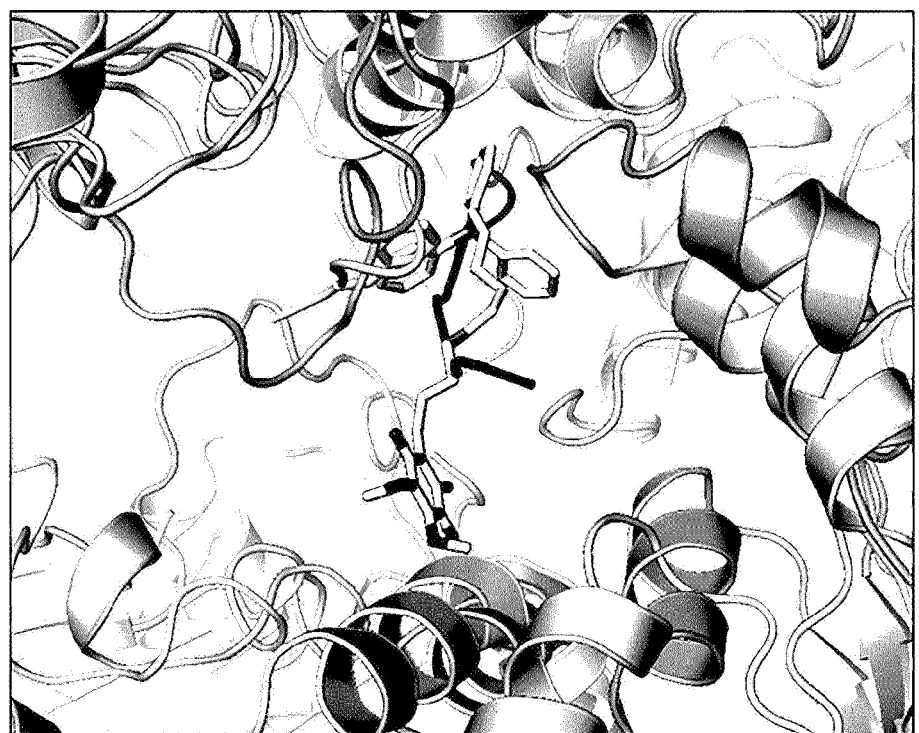
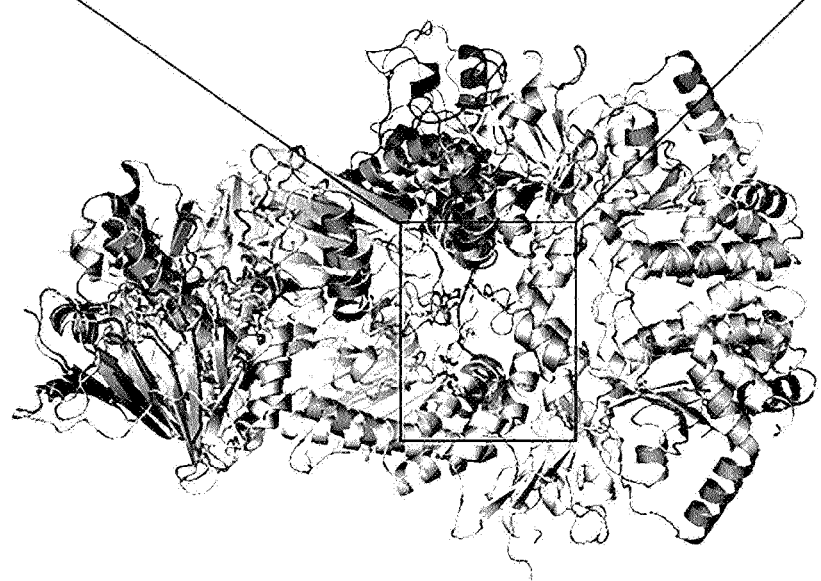

FIG. 13

| | | F461 | F468 | | | F546 | F549 | |
|---|---|---|---|---|---|---|---|---|
| Human | 441 | FEDYG | FMREG | TAEQ | 458 — 526 | FCFEQ | DEL | TLLHLR | 540 |
| Zebrafish | 456 | FEDYG | FMREG | TGEQ | 473 — 541 | FCFEQ | DEL | TLLHLH | 555 |
| Elephant | 444 | FVREG | FMREG | TTEQ | 461 — 529 | FQYKQ | LDE | TLLHLR | 543 |
| Mouse | 443 | FEDYG | FMREG | TAEQ | 460 — 528 | FCYEQ | DEL | TLLHLR | 542 |
| Rat | 443 | FEDYG | FMREG | TAEQ | 460 — 528 | FCYEQ | DEL | TLLHLR | 542 |
| Dog | 439 | FEDYG | FMREG | TAEQ | 458 — 524 | FCYEQ | DEL | TLLHLR | 538 |
| Chimpanzee | 469 | FEDYG | FMREG | TAEQ | 488 — 554 | FCFEQ | DEL | TLLHLR | 568 |

| | F368 | |
|---|---|---|
| Human | MKPSM DVSRELG | −360 |
| Zebrafish | MKPSM DVSHEMG | −375 |
| Elephant | MKPSM DVSQELG | −363 |
| Mouse | MKPSM DVSRELG | −362 |
| Rat | MKPSM DVSRELG | −362 |
| Dog | MKPSM DVSRELG | −358 |
| Chimpanzee | MRPSM DVSRELG | −388 |

FIG. 17
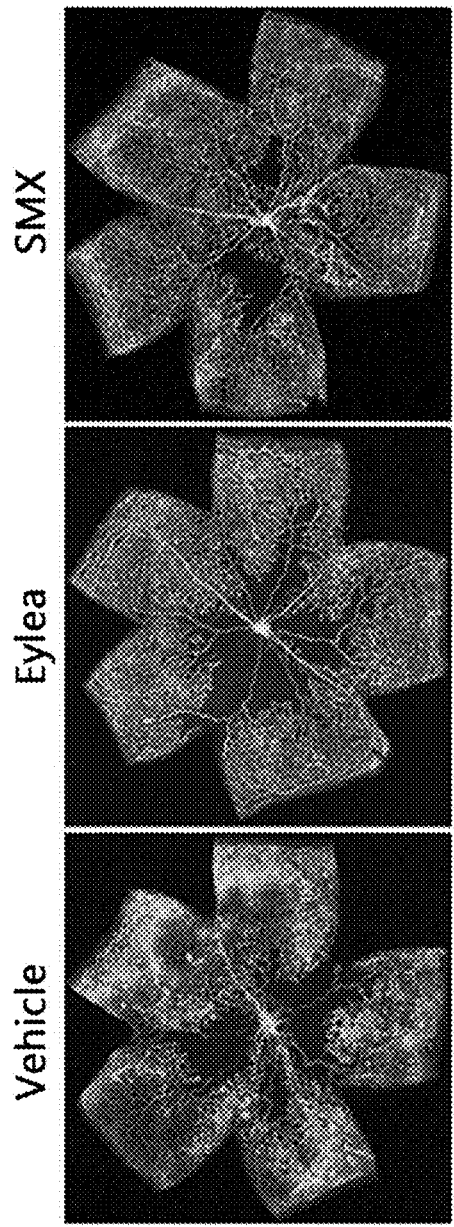
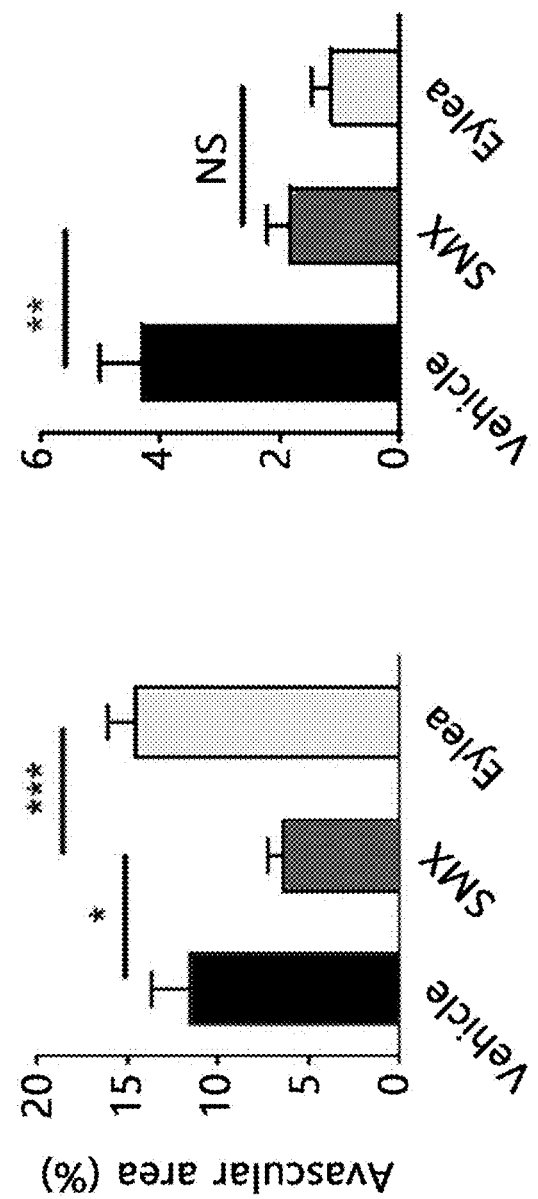

[FIG. 24]
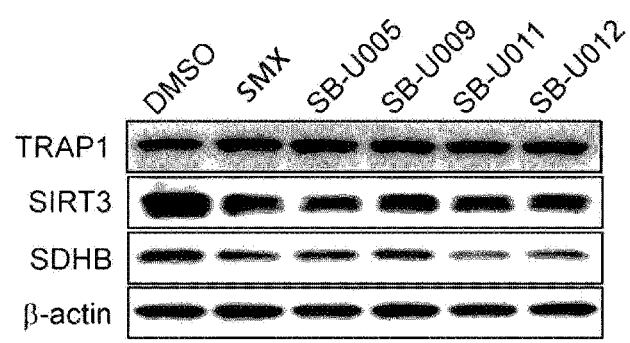

[FIG. 25]

| COMPOUND | HIF1 inhibition under hypoxia |
|---|---|
| | MIOM1 (IC$_{50}$, μM) |
| SMX | 0.4707 ±0.0155 |
| SB-U005 | 0.1019 ±0.0153 |
| SB-U009 | 0.1912 ±0.0221 |
| SB-U011 | 0.1035 ±0.0584 |
| SB-U012 | 0.0863 ±0.0071 |
| Gamitrinib | 1.803 ±0.0857 |
| PU-H71 | 0.149 ±0.046 |

[FIG. 26]

COMPOUNDS FOR INHIBITING NEOVASCULARIZATION FACTORS AND USE THEREOF

RELATED APPLICATIONS

This application is a § 371 national-stage application based on PCT/KR2020/018475, filed on Dec. 16, 2020, which claims priority from Korean Application 10-2019-0168238 filed on Dec. 16, 2019. The entire contents of PCT/KR2020/018475 are incorporated herein by reference in their entirety.

TECHNICAL FIELD

The present invention relates to compounds for inhibiting neovascularization factors and use thereof. Further, the present invention relates to methods for treating neovascularization diseases using the compounds.

BACKGROUND ART

Neovascularization is a physical phenomenon in which new blood vessels are formed around pre-existing blood vessels and may cause a disease or disorder when it occurs abnormally. The neovascularization mentioned in the present application includes angiogenesis in which new blood vessels grow from pre-existing blood vessels, and the two terms are used interchangeably.

For example, cancer cells form microvessels in overgrown cancer tissue by overproducing neovascularization factors, and the viability of cancer cells is increased by supplying oxygen and nutrients through the microvessels. Further, it is known that overproduction of neovascularization factors in the ocular structure causes various ocular diseases.

Existing studies for the treatment of such neovascular diseases have mostly focused on suppressing VEGF, which is a major neovascularization factor [1, 2]. Specifically, anti-VEGF therapy is based on the following three approaches: first, a method of using a VEGF ligand-specific antibody (for example, bevacizumab, aflibercept, ranibizumab) to prevent a VEGF ligand from binding to a VEGF receptor; a method of using a VEGF receptor-specific antibody (for example, ramucirumab); or a method of administering a tyrosine kinase inhibitor (TKI; sorafenib, sunitinib, pazopanib) that inhibits VEGF receptors.

Among them, the approach using an antibody poses a problem with the physical limitations of the antibody [3]. Although the pharmacokinetic properties of an antibody are improved as its molecular weight increases, there is a problem in that tissue penetration ability is lowered because vascular permeability is lowered.

Monoclonal antibodies have improved pharmacokinetic properties but have deteriorated tissue penetration ability. Antibody fragments such as a single-chain variable fragment (ScFv) have improved tissue penetration ability but have deteriorated pharmacokinetic properties. For this reason, most antibody therapies rely on invasive methods by injection administration to allow a drug to act directly on an abnormal tissue, and non-invasive methods such as oral administration and transdermal delivery are impossible.

Further, direct suppression of VEGF through antibodies may cause side effects [4]. Since VEGF is a growth factor having various functions, it may affect the normal growth of tissues when a VEGF inhibitor acts systemically. For this reason, an anti-VEGF therapy has a problem in that safety greatly deteriorates when the anti-VEGF therapy is not directly administered to an abnormal tissue or induced treatment is not applied to the abnormal tissue. Due to these disadvantages, although the anti-VEGF therapy is currently a mainstream therapy, the limitations thereof are clear, and there is a need for a study on a therapy through a new mechanism instead of VEGF inhibition.

TRAP-1 is known to regulate HIF-1α, which is one of the parent moderators of VEGF. TRAP-1 is one of the paralogs of HSP90, and inhibitors of HSP90 have been actively studied in the related art, but such inhibitors act non-selectively on HSP90 and paralogs thereof, and thus have a problem of showing high toxicity (see Korean Patent Application Laid-Open No. KR20150109540A). The inventors of the present application recognized that TRAP-1 may be a therapeutic target capable of replacing VEGF, and invented novel methods capable of selectively inhibiting TRAP-1, thereby leading to the present application.

DISCLOSURE

Technical Problem

One task disclosed by the present application is to provide compounds for inhibiting neovascularization factors or pharmaceutically acceptable salts thereof.

Another task disclosed by the present application is to provide pharmaceutical compositions including the compound, a pharmaceutically acceptable salt thereof or a prodrug thereof.

Still another task disclosed by the present application is to provide methods for treating neovascular diseases, the methods including: prescribing pharmaceutical compositions including the compound, a pharmaceutically acceptable salt thereof or a prodrug thereof.

Further, yet another task disclosed by the present application is to provide methods for treating neovascular ocular diseases among neovascular diseases.

Furthermore, yet another task disclosed by the present application is to provide pharmaceutical compositions for eye drop administration for treating neovascular ocular diseases.

Further, yet another task disclosed by the present application is to provide methods for treating neovascular ocular diseases, which is characterized by administering the pharmaceutical compositions orally or through eye drops.

Technical Solution

The present application provides compounds having a structure represented by the following [Chemical Formula 1], pharmaceutically acceptable salts thereof or prodrugs thereof.

[Chemical Formula 1]

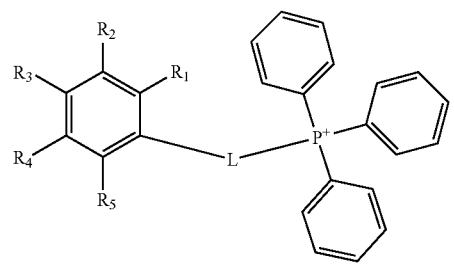

wherein,

R$_1$, R$_2$, R$_3$, R$_4$, and R$_5$ are selected independently from H, a halogen, hydroxy, a hydroxy C$_{1\sim5}$ alkyl, a C$_{1\sim5}$ alkyl, a C$_{1\sim5}$ alkenyl, a C$_{1\sim5}$ alkynyl, and a C$_{1\sim5}$ alkoxy. Here, when any one of R$_1$ and R$_4$ is hydroxy, the other one is not hydroxy, or when any one of R$_2$ and R$_5$ is hydroxy, the other one may not be hydroxy;

L comprises —(CH$_2$)$_n$—; and n is an integer of 5 or more and 12 or less.

Alternatively, R$_1$ in Chemical Formula 1 is H, a C$_{1\sim5}$ alkyl, a C$_{1\sim5}$ alkenyl, or a C$_{1\sim5}$ alkynyl.

Alternatively, R$_3$ and R$_4$ in Chemical Formula 1 are each a C$_{1\sim5}$ alkoxy.

Alternatively, R$_1$ in Chemical Formula 1 is H, a C$_{1\sim5}$ alkyl, a C$_{1\sim5}$ alkenyl, or a C$_{1\sim5}$ alkynyl; and R$_3$ and R$_4$ are each a C$_{1\sim5}$ alkoxy.

Alternatively, R$_2$ and R$_5$ in Chemical Formula 1 are each hydroxy, alkoxy or a halogen, and in this case, at least one of R$_2$ and R$_5$ is a halogen.

Alternatively, in Chemical Formula 1, R$_1$ is H, a C$_{1\sim5}$ alkyl, a C$_{1\sim5}$ alkenyl, or a C$_{1\sim5}$ alkynyl; R$_3$ and R$_4$ are each a C$_{1\sim5}$ alkoxy; and R$_2$ and R$_5$ are each hydroxy, alkoxy or a halogen, and in this case, at least one of R$_2$ and R$_5$ is a halogen.

Furthermore, L in Chemical Formula 1 comprises —(CH$_2$)$_n$—, wherein n is 10.

Alternatively, Chemical Formula 1 provides the compound of represented by any one selected from [Chemical Formula 2] to [Chemical Formula 5]:

[Chemical Formula 2]

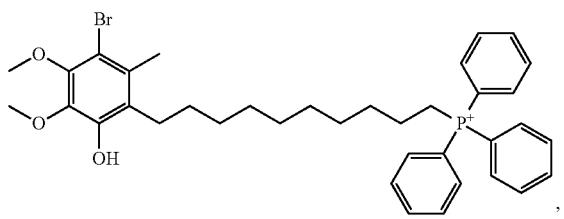

,

[Chemical Formula 3]

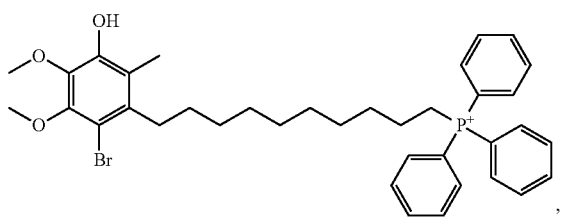

,

[Chemical Formula 4]

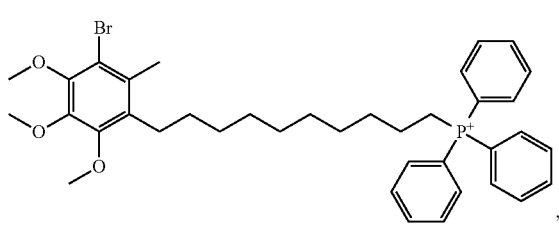

,

[Chemical Formula 5]

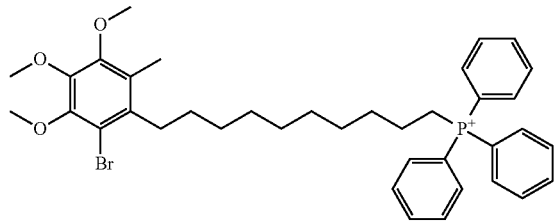

.

Further, the present application provides pharmaceutical compositions for treating of neovascular ocular diseases comprising a compound having a structure represented by the following [Chemical Formula 1], a pharmaceutically acceptable salt thereof or a prodrug thereof:

[Chemical Formula 1]

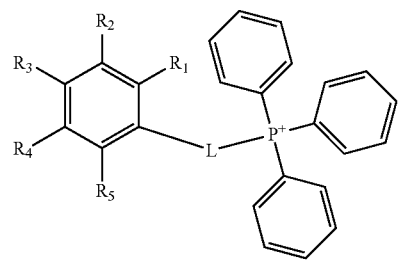

wherein,

R$_1$, R$_2$, R$_3$, R$_4$, and R$_5$ are selected independently from H, a halogen, hydroxy, a hydroxy C$_{1\sim5}$ alkyl, a C$_{1\sim5}$ alkyl, a C$_{1\sim5}$ alkenyl, a C$_{1\sim5}$ alkynyl, and a C$_{1\sim5}$ alkoxy. Here, when any one of R$_1$ and R$_4$ is hydroxy, the other one is not hydroxy, or when any one of R$_2$ and R$_5$ is hydroxy, the other one may not be hydroxy;

L comprises —(CH$_2$)$_n$—; and n is an integer of 5 or more and 12 or less.

Alternatively, R$_1$ in Chemical Formula 1 is H, a C$_{1\sim5}$ alkyl, a C$_{1\sim5}$ alkenyl, or a C$_{1\sim5}$ alkynyl.

Alternatively, R$_3$ and R$_4$ in Chemical Formula 1 are each a C$_{1\sim5}$ alkoxy.

Alternatively, R$_1$ in Chemical Formula 1 is H, a C$_{1\sim5}$ alkyl, a C$_{1\sim5}$ alkenyl, or a C$_{1\sim5}$ alkynyl; and R$_3$ and R$_4$ are each a C$_{1\sim5}$ alkoxy.

Alternatively, R$_2$ and R$_5$ in Chemical Formula 1 are each hydroxy, alkoxy or a halogen, and in this case, at least one of R$_2$ and R$_5$ is a halogen.

Alternatively, in Chemical Formula 1, R$_1$ is H, a C$_{1\sim5}$ alkyl, a C$_{1\sim5}$ alkenyl, or a C$_{1\sim5}$ alkynyl; R$_3$ and R$_4$ are each a C$_{1\sim5}$ alkoxy; and R$_2$ and R$_5$ are each hydroxy, alkoxy or a halogen, and in this case, at least one of R$_2$ and R$_5$ is a halogen.

Furthermore, L in Chemical Formula 1 comprises —(CH$_2$)$_n$—, wherein n is 10.

Alternatively, Chemical Formula 1 provides the compound of represented by any one of selected from [Chemical Formula 2] to [Chemical Formula 5]:

[Chemical Formula 2]

[Chemical Formula 3]

[Chemical Formula 4]

[Chemical Formula 5]

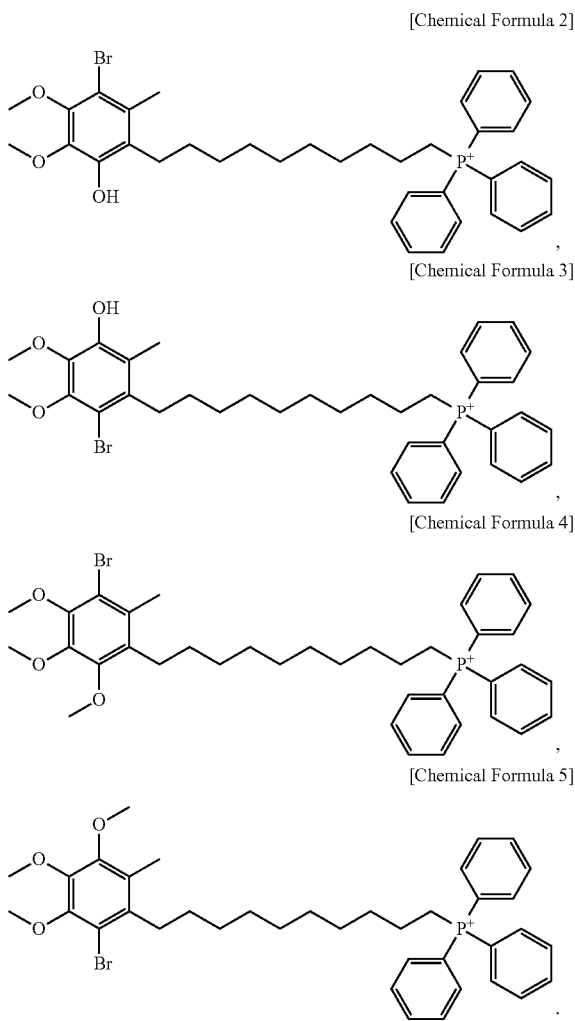 [SMILES: COc1c(O)c(CCCCCCCCCC[P+](c2ccccc2)(c2ccccc2)c2ccccc2)c(C)c(Br)c1OC ; COc1c(O)c(C)c(CCCCCCCCCC[P+](c2ccccc2)(c2ccccc2)c2ccccc2)c(Br)c1OC ; COc1c(Br)c(C)c(CCCCCCCCCC[P+](c2ccccc2)(c2ccccc2)c2ccccc2)c(OC)c1OC ; COc1c(C)c(CCCCCCCCCC[P+](c2ccccc2)(c2ccccc2)c2ccccc2)c(Br)c(OC)c1OC]

Alternatively, the present application provides pharmaceutical compositions for treating neovascular ocular diseases comprising a compound having a structure represented by the following [Chemical Formula 6], a pharmaceutically acceptable salt thereof or a prodrug thereof:

[Chemical Formula 6]

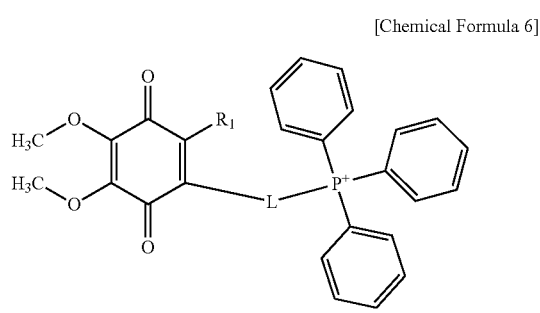

wherein,
$R_1$ is methyl;
L comprises —$(CH_2)_n$—; and
n is an integer of 5 or more and 12 or less.
Alternatively, L in Chemical Formula 6 is —$(CH_2)_{10}$—.
Further, the pharmaceutical composition according to the present application is for eye drops.

Alternatively, provided is a pharmaceutical composition for treating a neovascular ocular disease, in which the neovascular ocular disease is a choroidal neovascular disease, a retinal neovascular disease, a subretinal neovascular disease, a corneal neovascular disease, an iris neovascular disease or neovascular glaucoma. Further, the neovascular ocular disease is the retinal neovascular disease selected from diabetic retinopathy, retinopathy of prematurity, or retinal vein occlusion. Preferably, the retinal neovascular disease is diabetic retinopathy.

Furthermore, provided is a pharmaceutical composition for treating a neovascular ocular disease, in which the choroidal neovascular disease is wet age-related macular degeneration (wet AMD).

Advantageous Effects

Treatment of neovascular diseases is possible using the pharmaceutical compositions of the present application. Among them, particularly, a neovascularization ocular disease can be treated. The following effects may be obtained using the pharmaceutical compositions of the present application.

Non-invasive treatment is possible using the pharmaceutical composition of the present application. The SMx and novel compound molecules of the present application have high tissue penetration ability as small molecules rather than proteins. For this reason, there is no need for direct injection administration to abnormal tissue, and there is an advantage in that non-invasive treatment such as oral administration or eye drop administration is possible.

Further, pharmaceutical compositions disclosed by the present application or treatment methods using the pharmaceutical compositions has higher stability than existing therapeutic agents or treatment methods. This enables abnormal cells to be specifically treated because existing therapeutic agents target factors expressed in both abnormal cells and normal cells whereas SMx which is a pharmaceutical composition disclosed by the present application and a novel compound molecule target factors overexpressed in abnormal cells. For this reason, the pharmaceutical compositions disclosed by the present application have an advantage in that toxicity is more improved by showing no side effects on normal cells.

DESCRIPTION OF DRAWINGS

FIG. 10 illustrates the binding structure of HSP90 and the client protein confirmed in a previous study.

FIG. 11 is an overlap of the binding position between HSP90 and the client protein according to FIG. 10 and the binding position between TRAP-1 and SMx according to FIG. 12.

FIG. 13 illustrates the results of analyzing the interspecies conservation of positions involved in binding to SMx on TRAP-1.

FIG. 17 illustrates the results of retinal vascular analysis of an oxygen-induced retinopathy mouse model in which SMx and Eylea (Aflibercept) are intraocularly injected.

FIG. 24 illustrates the results of a full-down assay for verifying that SMx and novel compound molecules (SB-U005, SB-U009, SB-U011, and SB-U012) bind to TRAP1 competitively with the client protein.

FIG. 25 illustrates $IC_{50}$ values when an MIO-M1 HRE cell line is treated with SMx and novel compound molecules (SB-U005, SB-U009, SB-U011, and SB-U012).

FIG. 26 illustrates the results of western blot which confirms the change in expression of a neovascularization factor (HIF-1α) when an ARPE-19 cell line, which is a retinal pigment epithelial cell line, is treated with SMx and novel compound molecules (SB-U005, SB-U009, SB-U011, and SB-U012).

MODES OF THE INVENTION

Prior Art Documents

Non-Patent Documents

Figure 1:
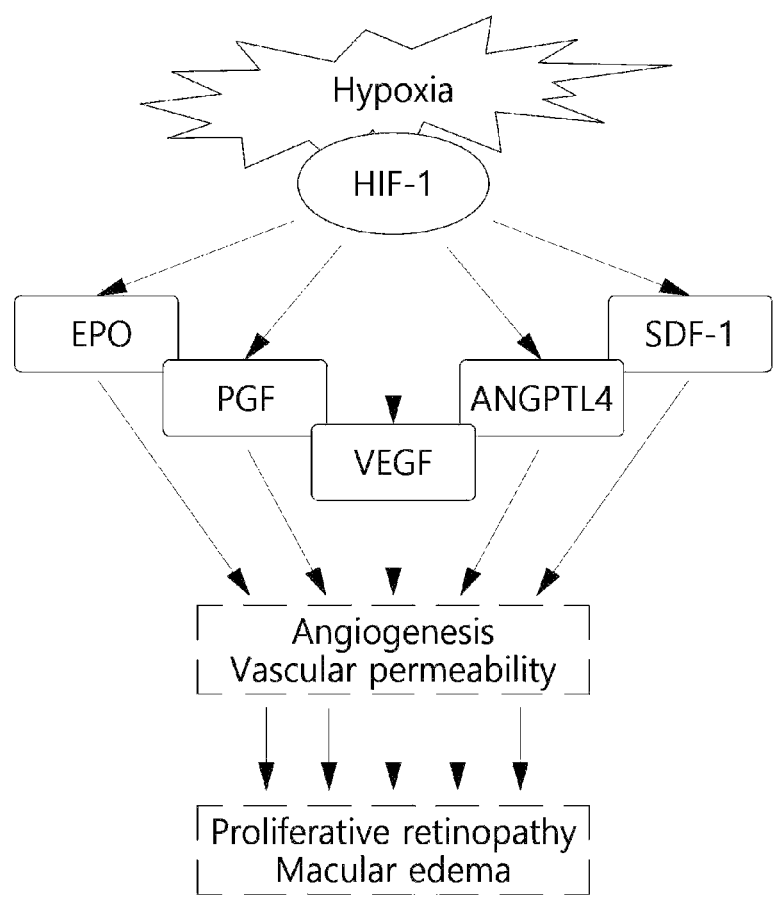
FIG. 1 illustrates the signaling pathways of TRAP-1 and related neovascularization factors.

[1] Kellen L. Meadows and Herbert I. Hurwitz, Anti-VEGF Therapies in the Clinic, Cold Spring Harb Perspect Med. 2012 Oct. 1; 2(10).

[2] Katja Zirlik and Justus Duyster, Anti-Angiogenics: Current Situation and Future Perspectives, Oncol Res Treat. 2018; 41(4):166-171.

[3] Patrick Chames, Marc Van Regenmortel, Etienne Weiss and Daniel Baty, Therapeutic antibodies: successes, limitations and hopes for the future, Br J Pharmacol. 2009 May; 157(2):220-33.

[4] T Kamba and DM McDonald, Mechanisms of adverse effects of anti-VEGF therapy for cancer, Br J Cancer. 2007 Jun. 18; 96(12):1788-95.

[5] Peter A. Campochiaro, Ocular Neovascularization, J Mol Med (Berl). 2013 March; 91(3): 311-321.

[6] Barbara Onnis, Annamaria Rapisarda and Giovanni Melillo, Development of HIF-1 inhibitors for cancer therapy, J. Cell. Mol. Med. Vol 13, No 9A, 2009 pp. 2780-2786.

[7] Young Chan Chae, M. Cecilia Caino, Sofia Lisanti, and et al. Control of Tumor Bioenergetics and Survival Stress Signaling by Mitochondrial HSP90s, Cancer Cell. 2012 Sep. 11; 22(3):331-44.

[8] Stuart K. Calderwood and Thomas L. Prince, Chaperones: Methods and Protocols, Humana Press, 2018, pp. 424-432.

[9] Daniel T. Gewirth, Paralog specific Hsp90 Inhibitors—a brief history and a bright future, Curr Top Med Chem. 2016; 16(25): 2779-2791.

[10] Ionica Masgras, Carlos Sanchez-Martin, Giorgio Colombo and Andrea Rasola, The Chaperone TRAP1 As a Modulator of the Mitochondrial Adaptations in Cancer Cells, Front Oncol. 2017 Mar. 29; 7:58.

[11] Verba K A, Wang R Y, Arakawa A, Liu Y, Shirouzu M, Yokoyama S, and Agard D A, Atomic structure of Hsp90-Cdc37-Cdk4 reveals that Hsp90 traps and stabilizes an unfolded kinase, Science. 2016 Jun. 24; 352(6293):1542-7.

1. Definitions

The term "alkoxy" refers to an alkyl group, preferably a lower alkyl group, to which oxygen is bonded. A representative alkoxy group includes methoxy, ethoxy, propoxy, tert-butoxy and the like.

The term "alkoxyalkyl" refers to an alkyl group substituted with an alkoxy group, and may be represented by alkyl-O-alkyl in a general chemical formula.

The term "alkenyl," as used herein, means an aliphatic functional group including at least one double bond, is also intended to include both "unsubstituted alkenyl" and "substituted alkenyl", and means that the latter among them is an alkenyl group having a substituent, which replaces hydrogen on one or more carbons of the alkenyl group. These substituents may be present on one or more carbons that are included or are not included in one or more double bonds. Furthermore, these substituents include all things that can be considered for the alkyl group, as discussed below, except for the case where stability becomes an issue. For example, substitution of an alkenyl group with one or more alkyl, carbocyclyl, aryl, heterocyclyl, or heteroaryl groups may be considered.

The "alkyl" group or "alkane" is a straight-chained or branched non-aromatic hydrocarbon that is completely saturated. Typically, the straight-chained or branched alkyl group has 1 to about 20 carbon atoms unless otherwise defined. Straight-chained and branched alkyl groups include methyl, ethyl, n-propyl, isopropyl, n-butyl, sec-butyl, tert-butyl, pentyl, hexyl, pentyl and octyl. A $C_1$-$C_6$ straight-chained or branched alkyl group is referred to by another name as a "lower alkyl" group.

Furthermore, the term "alkyl" (or "lower alkyl") used in the present specification, examples, and the claims is intended to include both "unsaturated alkyl" and "substituted alkyl" and means that the latter among them is an alkyl group having a substituent, which replaces hydrogen on one or more carbons of the hydrocarbon. The substituent may include, for example, a halogen, a hydroxyl, carbonyl (for example, carboxyl, alkoxycarbonyl, formyl, or acyl), a thiocarbonyl (for example, thioester, thioacetate, or thioformate), alkoxy, phosphoryl, phosphate, phosphonate, phosphinate, amino, amido, amidine, imine, cyano, nitro, azido, sulfhydryl, alkylthio, sulfate, sulfonate, sulfamoyl, sulfonamido, sulfonyl, heterocyclyl, aralkyl, or an aromatic or heteroaromatic group, unless otherwise specified. It can be appreciated by those skilled in the art that when the substitution is appropriate, a substituted functional group on a hydrocarbon chain may itself be substituted. For example, the substituent of the substituted alkyl may include amino, azido, imino, amido, a phosphoryl (including phosphonate and phosphinate), a sulfonyl (including sulfate, sulfonamido, sulfamoyl and sulfonate), and a silyl group in a substituted form and an unsubstituted form, and may include ether, alkylthio, a carbonyl (including ketone, aldehyde, carboxylate, and ester), —CF$_3$, —CN and the like as well. Cycloalkyl may be additionally substituted with alkyl, alkenyl, alkoxy, alkylthio, aminoalkyl, carbonyl-substituted alkyl, —CF$_3$, —CN, and the like.

The term "hydroxyalkyl" refers to an alkyl group having at least one hydroxy substituent, for example, a linear monovalent hydrocarbon radical which is substituted with one or two hydroxy group(s) and includes 1 to 6 carbon atoms or a branched monovalent hydrocarbon radical including 3 to 6 carbon atoms, provided that when two hydroxy groups are present, the two hydroxy groups are not present on the same carbon atom. Specifically, the hydroxyalkyl includes hydroxymethyl, 2-hydroxyethyl, 2-hydroxypropyl, 3-hydroxypropyl, 1-(hydroxymethyl)-2-methylpropyl, 2-hydroxybutyl, 3-hydroxybutyl, 4-hydroxybutyl, 2,3-dihydroxypropyl, 1-(hydroxymethyl)-2-hydroxyethyl, 2,3-dihydroxybutyl, 3,4-dihydroxybutyl and 2-(hydroxymethyl)-3-hydroxypropyl and the like.

The term "alkynyl," as used herein, refers to an aliphatic functional group including at least one triple bond, is also intended to include both "unsubstituted alkynyl" and "substituted alkynyl", and means that the latter among them is an alkynyl group having a substituent, which replaces hydrogen on one or more carbons of the alkynyl group. These substituents may be present on one or more carbons that are included or are not included in one or more triple bonds. Further, these substituents include all things that can be considered for the alkyl group, as discussed above, except for the case where stability becomes an issue. For example, substitution of an alkynyl group with one or more alkyl, carbocyclyl, aryl, heterocyclyl, or heteroaryl groups may be considered.

The term "C$_{x-y}$" was intended to include a functional group including x to y carbons in the chain when used with a functional group such as, for example, acyl, acyloxy, alkyl, alkenyl, alkynyl, or alkoxy. For example, the term "C$_{x-y}$ alkyl" refers to a substituted or unsubstituted saturated hydrocarbon group and means a straight-chained alkyl and a branched alkyl group which include x to y carbons in the chain and include, for example, a haloalkyl group such as trifluoromethyl and 2,2,2-trifluoroethyl. C$_0$ alkyl refers to hydrogen when it is at the terminal position and a bond when it is inside. The terms "C$_{2-y}$ alkenyl" and "C$_{2-y}$ alkynyl" are a substituted or unsubstituted unsaturated aliphatic moiety, to which definitions regarding a length and possible substitutions for the above-described alkyl is applied but means to include at least one double or triple bond, respectively.

The term "aryl", as used herein, refers to a substituted or unsubstituted single-ring aromatic group and includes those in which each atom of the ring is carbon. Preferably, the ring is a 5- to 7-membered ring, more preferably, a 6-membered ring. The term "aryl" also refers to a polycyclic ring system including two or more cyclic rings, in which two adjacent rings share two or more carbons and at least one of the rings is aromatic, and for example, the other cyclic rings may be cycloalkyl, cycloalkenyl, cycloalkynyl, aryl, heteroaryl, and/or heterocyclyl. The aryl group includes benzene, naphthalene, phenanthrene, phenol, aniline, and the like.

The terms "carbocycle" and "carbocyclic", as used herein, refer to a saturated or unsaturated ring, in which each atom of the ring is carbon. The term carbocycle includes both an aromatic carbocycle and a non-aromatic carbocycle. The non-aromatic carbocycle includes a cycloalkane ring in which all carbon atoms are saturated, and a cycloalkene ring including at least one double bond.

The term "carbocycle" includes 5-7 membered monocyclic and 8-12 membered bicyclic rings. Each ring of the bicyclic carbocycle may be selected from a saturated, unsaturated, or aromatic ring. The carbocycle includes bicyclic molecules in which two or three or more atoms are shared between two rings. The term "fused carbocycle" refers to a bicyclic carbocycle, in which each ring shares two adjacent atoms with other rings. Each ring of the fused carbocycle may be selected from a saturated, unsaturated, or aromatic ring. In exemplary examples, an aromatic ring (for example, phenyl) may be fused with a saturated or unsaturated ring (for example, cyclohexane, cyclopentane, or cyclohexene). All combinations of saturated, unsaturated, and aromatic bicyclic rings are included in the definition of carbocyclic as far as it is allowed by the valence. An exemplary "carbocycle" includes cyclopentane, cyclohexane, bicyclo[2.2.1]heptane, 1,5-cyclooctadiene, 1,2,3,4-tetrahydronaphthalene, bicyclo[4.2.0]oct-3-ene, naphthalene and adamantane. An exemplary fused carbocycle includes decalin, naphthalene, 1,2,3,4-tetrahydronaphthalene, bicyclo[4.2.0]octane, 4,5,6,7-tetrahydro-1H-indene and bicyclo[4.1.0]hept-3-ene. A "carbocycle" may be substituted at any one or more positions which may have a hydrogen atom.

A "cycloalkyl" group is a fully saturated cyclic hydrocarbon. The "cycloalkyl" includes monocyclic and bicyclic rings. Unless otherwise defined, a monocyclic cycloalkyl group generally has 3 to about 10 carbon atoms, and more generally, 3 to 8 carbon atoms. A second ring of the bicyclic cycloalkyl may be selected from saturated, unsaturated, and aromatic rings. The cycloalkyl includes bicyclic molecules in which one, two or three or more atoms are shared between two rings. The term "fused cycloalkyl" means that as a bicyclic cycloalkyl, each ring shares two atoms with other rings. A second ring of the fused bicyclic cycloalkyl may be selected from saturated, unsaturated, and aromatic rings. A "cycloalkenyl" group is a cyclic hydrocarbon including one or more double bonds.

The terms "heteroaryl" and "hetaryl" refer to a substituted or unsubstituted single ring structure, preferably a 5- to 7-membered ring, and more preferably a 5- to 5-membered ring and include those whose ring structure includes at least one heteroatom, preferably 1 to 4 heteroatom(s), and more preferably 1 or 2 heteroatom(s).

The terms "heteroaryl" and "hetaryl" also refer to a polycyclic ring system including two or more cyclic rings, in which two adjacent rings share two or more carbons and at least one of the rings is heteroaromatic, and for example, the other cyclic rings may be cycloalkyl, cycloalkenyl, cycloalkynyl, aryl, heteroaryl, and/or heterocyclyl. A heteroaryl group includes, for example, pyrrole, furan, thiophene, imidazole, oxazole, thiazole, pyridine, pyrazine, pyridazine, and pyrimidine, and the like.

The term "heteroatom", as used herein, refers to the atoms of all elements other than carbon or hydrogen. A preferred heteroatom is nitrogen, oxygen, and sulfur.

The terms "heterocyclyl", heterocycle", and "heterocyclic" are a substituted or unsubstituted non-aromatic ring structure, preferably a 3- to 10-membered ring, and more preferably a 3- to 7-membered ring and refer to those in which a ring structure thereof includes at least one heteroatom, preferably 1 to 4 heteroatom(s), and more preferably 1 or 2 heteroatom(s). The terms "heterocyclyl" and "heterocyclic" also refer to a polycyclic ring system including two or more cyclic rings, in which two adjacent rings share two or more carbons and at least one of the rings is heterocyclic, and for example, the other cyclic rings may be cycloalkyl, cycloalkenyl, cycloalkynyl, aryl, heteroaryl, and/or heterocyclyl. The heterocyclyl group includes, for example, piperidine, piperazine, pyrrolidine, morpholine, lactone, lactam, and the like.

The expression "lower" was intended to include, for example, a functional group in which 10 or less, preferably 6 or less atoms other than hydrogen are present when used in conjunction with a chemical functional group such as acyl, acyloxy, alkyl, alkenyl, alkynyl, or alkoxy. The "lower alkyl" refers to, for example, an alkyl group having 10 or less, preferably 6 or less carbon atoms.

The term "covalent bond" refers to a chemical bond between atoms, which is not an ionic bond.

The term "functional group comprising X" refers to a chemical functional group including an X atom. For example, there are ketone, hydroxy, alkoxyalkyl, carboxy, and the like as a typical functional group comprising O.

The "hsp90s" refers to both the chaperone proteins HSP90 (Hsp90-α1, Hsp90-α2, Hsp90-β) and paralogs (grp94, TRAP-1) thereof present in the body. The "HSP90" collectively refers to Hsp90-α1, Hsp90-α2, and Hsp90-β, which are hsp90s present in the cytoplasm unless otherwise specified.

The "binding ability" refers to both biochemical and/or physical phenomena caused by an electrostatic force and/or a hydrophobic effect between two molecules and is not intended to limit the term to an interaction having a strength at a specific level or more.

The "prodrug" refers to the conversion to a medicinal material of interest after administration in vivo, and here, the conversion may be enzymatic or non-enzymatic. The prodrug of an active compound may be prepared by modifying a functional group in the active compound in a manner that allows the modification of an active parent compound to be cleaved by a typical manipulation or in vivo. The prodrug includes a compound in which a hydroxy, amino or mercapto group is bonded to any group, that is, the prodrug of the active compound is cleaved to form a free hydroxy, free amino or free mercapto group, respectively, when administered to a subject. Examples of the prodrug include acetate, formate, and benzoate derivatives of alcohol or acetamide, and formamide and benzamide derivatives of an amine functional group, and the like in the active compound, but are not limited thereto.

The "pharmaceutically acceptable salts" refers to salts of compounds derived from various physiologically acceptable organic and inorganic counter ions. The counter ions are well known in the art, and include, for example, sodium, potassium, calcium, magnesium, aluminum, lithium and ammonium, for example, tetraalkylammonium and the like (when the molecule contains an acidic functional group); and when the molecule contains a basic functional group, salts of an organic or inorganic acid, such as hydrochlorides, sulfates, phosphates, diphosphates, nitrate hydrobromides, tartrates, mesylates, acetates, malates, maleates, fumarates, tartrates, succinates, citrates, lactates, pamoates, salicylates, stearates, methanesulfonates, p-toluenesulfonates, oxalates, and the like. Suitable pharmaceutically acceptable salts thereof include those listed in the literature [Remington's Pharmaceutical Sciences, 17th Edition, pg. 1418 (1985) and P. Heinrich Stahl, Camille G. Wermuth (Eds.), Handbook of Pharmaceutical Salts Properties, Selection, and Use; 2002]. Examples of acid addition salts include salts formed from acids, such as hydriodic acid, phosphoric acid, meta-phosphoric acid, nitric acid and sulfuric acid, and an organic acid, such as alginic acid, ascorbic acid, anthranilic acid, benzoic acid, camphor sulfuric acid, citric acid, embonic acid (pamoic acid), ethanesulfonic acid, formic acid, fumaric acid, furoic acid, galacturonic acid, gentisic acid, gluconic acid, glucuronic acid, glutamic acid, glycollic acid, isonicotinic acid, isethionic acid, lactic acid, malic acid, mandelic acid, methanesulfonic acid, mucic acid, pantothenic acid, phenylacetic acid, propionic acid, saccharic acid, salicylic acid, stearic acid, succinic acid, sulfanilic acid, trifluoroacetic acid and arylsulfonic acid, for example, benzenesulfonic acid and p-toluenesulfonic acid. Examples of base addition salts formed of alkali metals and alkaline earth metals and organic bases include not only chloroprocaine, choline, N,N-dibenzylethylenediamine, diethanolamine, ethylenediamine, lysine, meglumine (N-methylglucamine), and crokine, but also internally formed salts. Salts having non-physiologically acceptable anions or cations are within the scope of the present invention as useful intermediates for preparing physiologically acceptable salts and/or for use in non-therapeutic, for example, in vitro, situations. The pharmaceutically acceptable salts according to the present application include halogen salts, that is, fluoro salts, bromine salts, iodine salts and the like.

2. Compound Structures of the Present Application

The present application provides a drug molecule for inhibiting TRAP-1.

The drug molecule according to the present application is a compound having a structure represented by the following [Chemical Formula 7], B-L-C$^+$ [Chemical Formula 7]

wherein,

B is a bonding moiety having affinity for a TRAP-1 protomer, L is a linking moiety for linking a bonding moiety and a cationic moiety, and C$^+$ is a cationic moiety with a positive charge.

In this case, the bonding moiety includes a cyclic ring, or further includes 4 to 10 monocyclic rings, or furthermore may include 5 to 7 monocyclic rings. Further, the cyclic ring may be a carbocyclic ring or may be a heterocyclic ring. In this case, the heteroatom constituting the heterocyclic ring may be exemplarily nitrogen, oxygen, sulfur, or phosphorus. In addition, the cyclic ring may be aryl. Furthermore, the cyclic ring may be a polycyclic ring such as a bicyclic ring.

Alternatively, the cyclic ring may be substituted with one or more substituents. In this case, the substituent may be alky, alkenyl, or alkynyl. Alternatively, the substituent may be a functional group including a heteroatom.

In this case, the functional group including a heteroatom may be a functional group including a halogen. In this case, the functional group including a halogen may be exemplarily F, Cl, Br or I.

Also, in this case, the functional group including a heteroatom may be a functional group including oxygen. In this case, the functional group including oxygen may be exemplarily hydroxy, carbonyl, formyl, alkoxycarbonyloxy, carboxy, alkoxycarbonyl, alkoxy or methylenedioxy.

Alternatively, in this case, the functional group including a heteroatom may be a functional group including nitrogen. In this case, the functional group including nitrogen may be exemplarily amide, amine, ammonium, imine, imide, cyanate, nitrate, nitrile, pyridine, azide, or carbamate.

Alternatively, in this case, the functional group including a heteroatom may be a functional group including sulfur. In this case, the functional group including sulfur may be exemplarily thiol, sulfide, disulfide, sulfoxide, sulfone, sulfonic acid, sulfonate, thione, thial, thioate or dithioate.

In this case, the bonding moiety may include an aliphatic functional group, for example, an alkyl ($(CH_2)_n$).

In this case, n may be an integer of 1 or more and 20 or less. Further, n may be an integer between two numbers selected from 1, 2, 3, 4, 5, 6, 7, 8, 9, 10, 11, 12, 13, 14, 15, 16, 17, 18, 19, and 20. Furthermore, n may be an integer between two numbers selected from 5, 6, 7, 8, 9, 10, 11, and 12. Still furthermore, n may be an integer of 5 or more and 12 or less. Preferably, n may be 10.

Alternatively, in this case, the bonding moiety may include alkenyl or alkynyl.

Alternatively, in this case, the aliphatic functional group may be bonded to the bonding moiety, the cationic moiety, or another aliphatic functional group through heteroatoms. In this case, the heteroatom may be exemplarily oxygen, nitrogen, or sulfur. For example, one exemplary bonding moiety may have a structure of $-(CH_2)_x-O-(CH_2)_y-$ (x and y are an integer of 0 or more).

Alternatively, the bonding moiety may include an ethyleneoxy unit ($(C_2H_4O)m$). In this case, m may be an integer of 1 or more and 0.

Alternatively, the bonding moiety may include alkyl and ethyleneoxy units.

Alternatively, the bonding moiety may have a length in a specific range. In this case, the bonding moiety may have a length of 5 to 60 angstroms, further a length of 10 to 50 angstroms, furthermore a length of 20 to 40 angstroms, or still furthermore a length of 25 to 35 angstroms.

C is a cationic moiety having a positive charge or a reduced form thereof.

In this case, the cationic moiety may have a positive charge.

In this case, the cationic moiety may include an oxidized atom. Further, the oxidized atom may be $N^+$ or $P^+$.

Alternatively, in this case, the cationic moiety may include a functional group including an oxidized atom.

In this case, the functional group may be an amine group, or a phosphane group.

Alternatively, in this case, the cationic moiety may be in a reduced form thereof.

Alternatively, the cationic moiety includes a cyclic ring, or further may include 4 to 10 monocyclic rings, or furthermore may include 5 to 7 monocyclic rings. Further, the cyclic ring may be a carbocyclic ring or may be a heterocyclic ring. In this case, the heteroatom constituting the heterocyclic ring may be exemplarily nitrogen, oxygen, sulfur, or phosphorus. In addition, the cyclic ring may be aryl. Furthermore, the cyclic ring may be a polycyclic ring such as a bicyclic ring.

Alternatively, the cyclic ring may be substituted with one or more substituents. In this case, the substituent may be alky, alkenyl, or alkynyl.

Alternatively, the substituent may be a functional group including a heteroatom.

Alternatively, when the cationic moiety includes an oxidized atom, the cyclic ring may be a substituent which is bonded to the oxidized atom.

Alternatively, the distance between the bonding moiety and the cationic moiety in the positional relationship of the entire molecule may be 5 to 60 angstroms, further 10 to 50 angstroms, furthermore 20 to 40 angstroms, or still furthermore 25 to 35 angstroms.

The drug molecule according to the present application is a compound having a structure represented by the following [Chemical Formula 8],

[Chemical Formula 8]

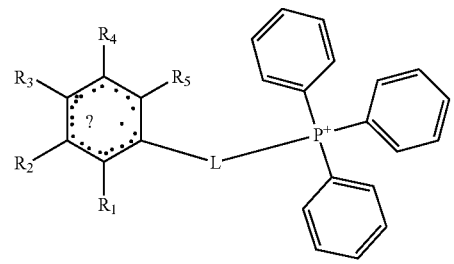

In this case, a 6-membered ring constituting the bonding moiety on the left side may be a carbocyclic ring or a heterocyclic ring. The dotted line and "?" indicated inside the 6-membered ring mean that a single bond or multiple bonds can be arbitrarily formed within an allowable range for bonding between the atoms constituting the above ring. In this case, the heteroatom constituting the heterocyclic ring may be exemplarily nitrogen, oxygen, sulfur, or phosphorus. In addition, the 6-membered cyclic ring may be aryl.

In this case, $R_1$ to $R_5$ may each be independently H, alkyl, alkenyl, alkynyl or a functional group including a heteroatom. Exemplarily, any one of $R_1$ to $R_5$ may be alkyl, furthermore, the alkyl may be a $C_{1-5}$ alkyl, or still furthermore, the alkyl may be methyl.

In this case, the functional group including a heteroatom may be a functional group including oxygen. In this case, the functional group including oxygen may be exemplarily hydroxy, carbonyl, formyl, alkoxycarbonyloxy, carboxy, alkoxycarbonyl, alkoxy, alkoxyalkyl, or methylenedioxy.

In a preferred embodiment, the functional group including oxygen may be a $C_{1-5}$ alkoxy, or further methoxy. In another preferred embodiment, the functional group including oxygen may be hydroxy or carbonyl.

In this case, the functional group including a heteroatom may be a functional group including a halogen. In this case, the functional group including a halogen may be exemplarily F, Cl, Br or I.

Alternatively, in this case, the functional group including a heteroatom may be a functional group including nitrogen. In this case, the functional group including nitrogen may be exemplarily amide, amine, ammonium, imine, imide, cyanate, nitrate, nitrile, pyridine, azide, or carbamate.

Alternatively, in this case, the functional group including a heteroatom may be a functional group including sulfur. In this case, the functional group including sulfur may be exemplarily thiol, sulfide, disulfide, sulfoxide, sulfone, sulfonic acid, sulfonate, thione, thial, thioate or dithioate.

In Chemical Formula 8, L is a linking moiety which links the bonding moiety and the cationic moiety.

In this case, the linking moiety may include an aliphatic functional group, for example, an alkyl $((CH_2)_n)$.

In this case, n may be an integer of 1 or more and 20 or less. Further, n may be an integer between two numbers selected from 1, 2, 3, 4, 5, 6, 7, 8, 9, 10, 11, 12, 13, 14, 15, 16, 17, 18, 19, and 20. Furthermore, n may be an integer between two numbers selected from 5, 6, 7, 8, 9, 10, 11, and 12. Still furthermore, n may be an integer of 5 or more and 12 or less. Preferably, n may be 10.

Alternatively, in this case, the linking moiety may include alkenyl or alkynyl.

Alternatively, in this case, the aliphatic functional group may be bonded to the bonding moiety, the cationic moiety, or another aliphatic functional group through heteroatoms. In this case, the heteroatom may include exemplarily oxygen, nitrogen, or sulfur. For example, one exemplary linking moiety may have a structure of $-(CH_2)_x-O-(CH_2)_y-$ (x and y are an integer of 0 or more).

Alternatively, the linking moiety may include an ethyleneoxy unit $((C_2H_4O)m)$. In this case, m may be an integer of 1 or more and 0.

Alternatively, the linking moiety may include alkyl and ethyleneoxy units.

Alternatively, the linking moiety may have a length in a specific range. In this case, the length of the linking moiety may be 5 to 60 angstroms, further 10 to 50 angstroms, furthermore 20 to 40 angstroms, or still furthermore 25 to 35 angstroms.

The drug molecule according to the present application is a compound having a structure represented by the following [Chemical Formula 9],

[Chemical Formula 9]

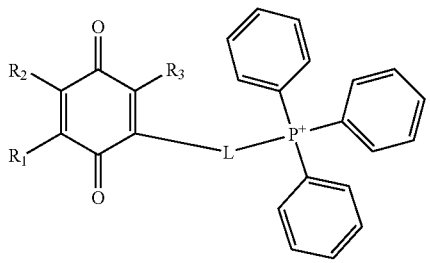

In this case, $R_1$ to $R_3$ may each be independently H, alkyl, alkenyl, alkynyl or a functional group including a heteroatom. Exemplarily, any one of $R_1$ to $R_3$ may be alkyl, furthermore, the alkyl may be a $C_{1-5}$ alkyl, or still furthermore, the alkyl may be methyl.

In this case, the functional group including a heteroatom may be a functional group including oxygen.

In this case, the functional group including oxygen may be exemplarily hydroxy, carbonyl, formyl, alkoxycarbonyloxy, carboxy, alkoxycarbonyl, alkoxy, alkoxyalkyl, or methylenedioxy.

In a preferred embodiment, the functional group including oxygen may be a $C_{1-5}$ alkoxy, or further methoxy. In another preferred embodiment, the functional group including oxygen may be hydroxy or carbonyl.

Alternatively, in this case, the functional group including a heteroatom may be a functional group including a halogen. In this case, the functional group including a halogen may be exemplarily F, Cl, Br or I.

Alternatively, in this case, the functional group including a heteroatom may be a functional group including nitrogen. In this case, the functional group including nitrogen may be exemplarily amide, amine, ammonium, imine, imide, cyanate, nitrate, nitrile, pyridine, azide, or carbamate.

Alternatively, in this case, the functional group including a heteroatom may be a functional group including sulfur. In this case, the functional group including sulfur may be exemplarily thiol, sulfide, disulfide, sulfoxide, sulfone, sulfonic acid, sulfonate, thione, thial, thioate or dithioate.

In Chemical Formula 9, L is a linking moiety which links the bonding moiety and the cationic moiety.

In this case, the linking moiety may include an aliphatic functional group, for example, an alkyl $((CH_2)_n)$.

In this case, n may be an integer of 1 or more and 20 or less. Further, n may be an integer between two numbers selected from 1, 2, 3, 4, 5, 6, 7, 8, 9, 10, 11, 12, 13, 14, 15, 16, 17, 18, 19, and 20. Furthermore, n may be an integer between two numbers selected from 5, 6, 7, 8, 9, 10, 11, and 12. Still furthermore, n may be an integer of 5 or more and 12 or less. Preferably, n may be 10.

Alternatively, in this case, the linking moiety may include alkenyl or alkynyl.

Alternatively, in this case, the aliphatic functional group may be bonded to the bonding moiety, the cationic moiety, or another aliphatic functional group through heteroatoms. In this case, the heteroatom may include exemplarily oxygen, nitrogen, or sulfur. For example, one exemplary linking moiety may have a structure of $-(CH_2)_x-O-(CH_2)_y-$ (x and y are an integer of 0 or more).

Alternatively, the linking moiety may include an ethyleneoxy unit $((C_2H_4O)m)$. In this case, m may be an integer of 1 or more and 0.

Alternatively, the linking moiety may include alkyl and ethyleneoxy units.

Alternatively, the linking moiety may have a length in a specific range. In this case, the length of the linking moiety may be 5 to 60 angstroms, further 10 to 50 angstroms, furthermore 20 to 40 angstroms, or still furthermore 25 to 35 angstroms.

Alternatively, the drug molecule according to the present application may be a compound in a reduced form of a compound having a structure of Chemical Formula 9.

The drug molecule according to the present application is a compound having a structure represented by the following [Chemical Formula 10],

[Chemical Formula 10]

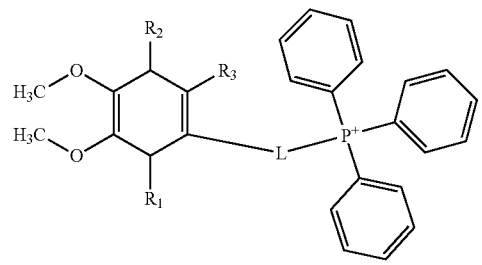

In this case, $R_1$ to $R_3$ may each be independently H, alkyl, alkenyl, alkynyl or a functional group including a heteroatom. Exemplarily, any one of $R_1$ to $R_3$ may be alkyl, furthermore, the alkyl may be a $C_{1-5}$ alkyl, or still furthermore, the alkyl may be methyl.

In this case, the functional group including a heteroatom may be a functional group including oxygen. In this case, the functional group including oxygen may be exemplarily hydroxy, carbonyl, formyl, alkoxycarbonyloxy, carboxy, alkoxycarbonyl, alkoxy, alkoxyalkyl, or methylenedioxy.

In a preferred embodiment, the functional group including oxygen may be a $C_{1-5}$ alkoxy, or further methoxy. In another preferred embodiment, the functional group including oxygen may be hydroxy or carbonyl.

In this case, the functional group including a heteroatom may be a functional group including a halogen. In this case, the functional group including a halogen may be exemplarily F, Cl, Br, or I.

Alternatively, in this case, the functional group including a heteroatom may be a functional group including nitrogen. In this case, the functional group including nitrogen may be exemplarily amide, amine, ammonium, imine, imide, cyanate, nitrate, nitrile, pyridine, azide, or carbamate.

Alternatively, in this case, the functional group including a heteroatom may be a functional group including sulfur. In this case, the functional group including sulfur may be exemplarily thiol, sulfide, disulfide, sulfoxide, sulfone, sulfonic acid, sulfonate, thione, thial, thioate or dithioate.

In Chemical Formula 10, L is a linking moiety which links the bonding moiety and the cationic moiety.

In this case, the linking moiety may include an aliphatic functional group, for example, an alkyl $((CH_2)_n)$.

In this case, n may be an integer of 1 or more and 20 or less. Further, n may be an integer between two numbers selected from 1, 2, 3, 4, 5, 6, 7, 8, 9, 10, 11, 12, 13, 14, 15, 16, 17, 18, 19, and 20. Furthermore, n may be an integer between two numbers selected from 5, 6, 7, 8, 9, 10, 11, and 12. Still furthermore, n may be an integer of 5 or more and 12 or less. Preferably, n may be 10.

Alternatively, in this case, the linking moiety may include alkenyl or alkynyl.

Alternatively, in this case, the aliphatic functional group may be bonded to the bonding moiety, the cationic moiety, or another aliphatic functional group through heteroatoms. In this case, the heteroatom may include exemplarily oxygen, nitrogen, or sulfur. For example, one exemplary linking moiety may have a structure of $—(CH_2)_x—O—(CH_2)_y—$ (x and y are an integer of 0 or more).

Alternatively, the linking moiety may include an ethyleneoxy unit $((C_2H_4O)m)$. In this case, m may be an integer of 1 or more and 0.

Alternatively, the linking moiety may include alkyl and ethyleneoxy units.

Alternatively, the linking moiety may have a length in a specific range. In this case, the length of the linking moiety may be 5 to 60 angstroms, further 10 to 50 angstroms, furthermore 20 to 40 angstroms, or still furthermore 25 to 35 angstroms.

The drug molecule according to the present application is a compound having a structure represented by the following [Chemical Formula 6],

[Chemical Formula 6]

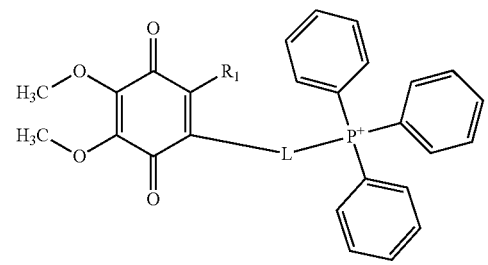

In this case, $R_1$ may be H, alkyl, alkenyl, alkynyl or a functional group including a heteroatom. Exemplarily, $R_1$ may be alkyl, furthermore, the alkyl may be a $C_{1-5}$ alkyl, or still furthermore, the alkyl may be methyl.

In this case, the functional group including a heteroatom may be a functional group including oxygen. In this case, the functional group including oxygen may be exemplarily hydroxy, carbonyl, formyl, alkoxycarbonyloxy, carboxy, alkoxycarbonyl, alkoxy, alkoxyalkyl, or methylenedioxy.

In a preferred embodiment, the functional group including oxygen may be a $C_{1-5}$ alkoxy, or further methoxy. In another preferred embodiment, the functional group including oxygen may be hydroxy or carbonyl.

In this case, the functional group including a heteroatom may be a functional group including a halogen. In this case, the functional group including a halogen may be exemplarily F, Cl, Br, or I.

Alternatively, in this case, the functional group including a heteroatom may be a functional group including nitrogen. In this case, the functional group including nitrogen may be exemplarily amide, amine, ammonium, imine, imide, cyanate, nitrate, nitrile, pyridine, azide, or carbamate.

Alternatively, in this case, the functional group including a heteroatom may be a functional group including sulfur. In this case, the functional group including sulfur may be exemplarily thiol, sulfide, disulfide, sulfoxide, sulfone, sulfonic acid, sulfonate, thione, thial, thioate or dithioate.

In Chemical Formula 6, L is a linking moiety which links the bonding moiety and the cationic moiety.

In this case, the linking moiety may include an aliphatic functional group, for example, an alkyl $((CH_2)_n)$.

In this case, n may be an integer of 1 or more and 20 or less. Further, n may be an integer between two numbers selected from 1, 2, 3, 4, 5, 6, 7, 8, 9, 10, 11, 12, 13, 14, 15, 16, 17, 18, 19, and 20. Furthermore, n may be an integer between two numbers selected from 5, 6, 7, 8, 9, 10, 11, and 12. Still furthermore, n may be an integer of 5 or more and 12 or less. Preferably, n may be 10.

Alternatively, in this case, the linking moiety may include alkenyl or alkynyl.

Alternatively, in this case, the aliphatic functional group may be bonded to the bonding moiety, the cationic moiety, or another aliphatic functional group through heteroatoms. In this case, the heteroatom may include exemplarily oxygen, nitrogen, or sulfur. For example, one exemplary linking moiety may have a structure of $—(CH_2)_x—O—(CH_2)_y—$ (x and y are an integer of 0 or more).

Alternatively, the linking moiety may include an ethyleneoxy unit $((C_2H_4O)m)$. In this case, m may be an integer of 1 or more and 0.

Alternatively, the linking moiety may include alkyl and ethyleneoxy units.

Alternatively, the linking moiety may have a length in a specific range. In this case, the length of the linking moiety may be 5 to 60 angstroms, further 10 to 50 angstroms, furthermore 20 to 40 angstroms, or still furthermore 25 to 35 angstroms.

Alternatively, the drug molecule according to the present application may be a compound in a reduced form of a compound having a structure of Chemical Formula 6.

The drug molecule according to the present application is a compound having a structure represented by the following [Chemical Formula 11],

[Chemical Formula 11]

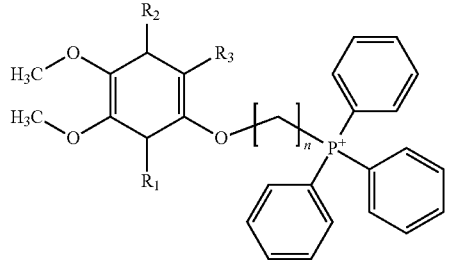

In this case, $R_1$ to $R_3$ may each be independently H, alkyl, alkenyl, alkynyl or a functional group including a heteroatom. Exemplarily, any one of $R_1$ to $R_3$ may be alkyl, furthermore, the alkyl may be a $C_{1-5}$ alkyl, or still furthermore, the alkyl may be methyl.

In this case, the functional group including a heteroatom may be a functional group including oxygen. In this case, the functional group including oxygen may be exemplarily hydroxy, carbonyl, formyl, alkoxycarbonyloxy, carboxy, alkoxycarbonyl, alkoxy, alkoxyalkyl, or methylenedioxy.

In a preferred embodiment, the functional group including oxygen may be a $C_{1-5}$ alkoxy, or further methoxy. In another preferred embodiment, the functional group including oxygen may be hydroxy or carbonyl.

In this case, the functional group including a heteroatom may be a functional group including a halogen. In this case, the functional group including a halogen may be exemplarily F, Cl, Br, or I.

Alternatively, in this case, the functional group including a heteroatom may be a functional group including nitrogen. In this case, the functional group including nitrogen may be exemplarily amide, amine, ammonium, imine, imide, cyanate, nitrate, nitrile, pyridine, azide, or carbamate.

Alternatively, in this case, the functional group including a heteroatom may be a functional group including sulfur. In this case, the functional group including sulfur may be exemplarily thiol, sulfide, disulfide, sulfoxide, sulfone, sulfonic acid, sulfonate, thione, thial, thioate or dithioate.

In addition, in the structure of the linking moiety, n is an integer of 1 or more. In this case, n may be an integer of 1 or more and 20 or less. Further, n may be an integer between two numbers selected from 1, 2, 3, 4, 5, 6, 7, 8, 9, 10, 11, 12, 13, 14, 15, 16, 17, 18, 19, and 20. Furthermore, n may be an integer between two numbers selected from 5, 6, 7, 8, 9, 10, 11, and 12. Still furthermore, n may be an integer of 5 or more and 12 or less. Preferably, n may be 10. In this case, the hydrocarbon portion may include multiple bonds within an allowable range.

Alternatively, the linking moiety may have a length in a specific range. In this case, the length of the linking moiety may be 5 to 60 angstroms, further 10 to 50 angstroms, furthermore 20 to 40 angstroms, or still furthermore 25 to 35 angstroms.

Exemplarily, a compound according to Chemical Formula 6 may be the compound having the following structure.

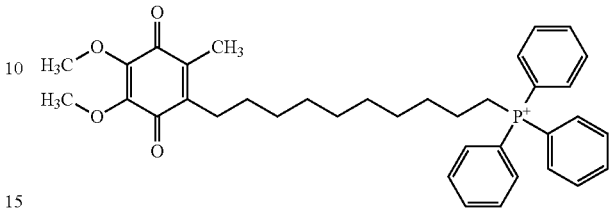

Further, the compound molecule according to the present application is a new compound having a structure represented by the following Chemical Formula 1,

[Chemical Formula 1]

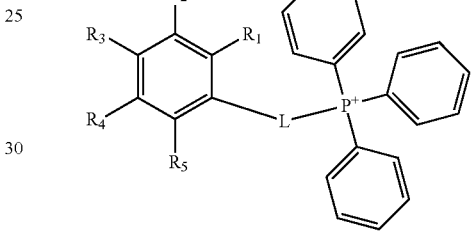

In this case, $R_1$ to $R_5$ may each be independently H, alkyl, alkenyl, alkynyl or a functional group including a heteroatom. Exemplarily, any one of $R_1$ to $R_5$ may be alkyl, furthermore, the alkyl may be a $C_{1-5}$ alkyl, or still furthermore, the alkyl may be methyl.

In this case, the functional group including a heteroatom may be a functional group including oxygen. In this case, the functional group including oxygen may be exemplarily hydroxy, carbonyl, formyl, alkoxycarbonyloxy, carboxy, alkoxycarbonyl, alkoxy, alkoxyalkyl, or methylenedioxy.

In an embodiment, the functional group including oxygen may be a $C_{1-5}$ alkoxy, or further methoxy. In another preferred embodiment, the functional group including oxygen may be hydroxy or hydroxyalkyl.

In this case, the functional group including a heteroatom may be a functional group including a halogen. In this case, the functional group including a halogen may be exemplarily F, Cl, Br, or I.

Alternatively, in this case, the functional group including a heteroatom may be a functional group including nitrogen. In this case, the functional group including nitrogen may be exemplarily amide, amine, ammonium, imine, imide, cyanate, nitrate, nitrile, pyridine, azide, or carbamate.

Alternatively, in this case, the functional group including a heteroatom may be a functional group including sulfur. In this case, the functional group including sulfur may be exemplarily thiol, sulfide, disulfide, sulfoxide, sulfone, sulfonic acid, sulfonate, thione, thial, thioate or dithioate.

As an example, $R_1$, $R_2$, $R_3$, $R_4$, and $R_5$ may each be selected from H, a halogen, hydroxy, a hydroxy $C_{1-5}$alkyl, a $C_{1-5}$ alkyl, a $C_{1-5}$ alkenyl, a $C_{1-5}$ alkynyl, and a $C_{1-5}$ alkoxy.

In this case, when any one of $R_1$, $R_2$, $R_3$, $R_4$, and $R_5$ is hydroxy, a substituent located in the direction facing the hydroxy may not be hydroxy. Here, the substituent located in the direction facing the hydroxy may be, for example, ($R_1$ and $R_4$) or ($R_2$ and $R_5$). Specifically, when any one of $R_1$ and $R_4$ is hydroxy, the other one is not hydroxy, or when any one of $R_2$ and $R_5$ is hydroxy, the other one may not be hydroxy. Here, "(x and y)" means a set consisting of x and y.

When the facing substituents of $R_1$, $R_2$, $R_3$, $R_4$, and $R_5$ are all hydroxy, for example, in the case of a compound in which $R_1$ and $R_4$ are both hydroxy or $R_2$ and $R_5$ are both hydroxy, the electromagnetic exchange of the elements of the compound itself may cause an oxidation/reduction reaction. Therefore, when one of the facing substituents of the compound of Chemical Formula 2 is hydroxy, it is possible to have an effect of inactivating the oxidation/reduction reaction occurring in the compound itself as the other one is not hydroxy.

Specifically, in Chemical Formula 1, $R_1$ may be H, a $C_{1\sim5}$ alkyl, a $C_{1\sim5}$ alkenyl, or a $C_{1\sim5}$ alkynyl, furthermore, may be a $C_{1\sim5}$ alkyl, and still furthermore, may be methyl.

Alternatively, $R_3$ and $R_4$ may each be a $C_{1\sim5}$ alkoxy.

Alternatively, $R_2$ and $R_5$ are each hydroxy, alkoxy or a halogen, and in this case, at least one of $R_2$ and $R_5$ may be a halogen.

Furthermore, L in Chemical Formula 1 is a linking moiety which links a bonding moiety (left) including $R_1$ to $R_5$ substituents and triphenyl phosphonium (right).

In this case, the linking moiety may include an aliphatic functional group, for example, an alkyl $((CH_2)_n)$.

In this case, n may be an integer of 1 or more and 20 or less. Further, n may be an integer between two numbers selected from 1, 2, 3, 4, 5, 6, 7, 8, 9, 10, 11, 12, 13, 14, 15, 16, 17, 18, 19, and 20. Furthermore, n may be an integer between two numbers selected from 5, 6, 7, 8, 9, 10, 11, and 12. Still furthermore, n may be an integer of 5 or more and 12 or less. Preferably, n may be 10.

Alternatively, in this case, the linking moiety may include alkenyl or alkynyl.

Alternatively, in this case, the aliphatic functional group may be bonded to the bonding moiety, the cationic moiety, or another aliphatic functional group through heteroatoms. In this case, the heteroatom may include exemplarily oxygen, nitrogen, or sulfur. For example, one exemplary linking moiety may have a structure of —$(CH_2)_x$—O—$(CH_2)_y$— (x and y are an integer of 0 or more).

Alternatively, the linking moiety may include an ethyleneoxy unit $((C_2H_4O)m)$. In this case, m may be an integer of 1 or more and 0.

Alternatively, the linking moiety may include alkyl and ethyleneoxy units.

Alternatively, the linking moiety may have a length in a specific range. In this case, the length of the linking moiety may be 5 to 60 angstroms, further 10 to 50 angstroms, furthermore 20 to 40 angstroms, or still furthermore 25 to 35 angstroms.

In a preferred embodiment, the compound according to the Chemical Formula 1 may be the compound having a structure represented by the following Chemical Formula 2.

[Chemical Formula 2]

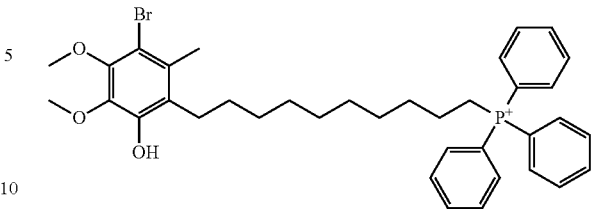

In another embodiment, the compound according to the Chemical Formula 1 may be the compound having a structure represented by the following Chemical Formula 3.

[Chemical Formula 3]

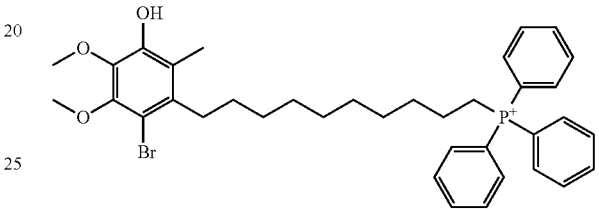

In still another embodiment, the compound according to the Chemical Formula 1 may be the compound having a structure represented by the following Chemical Formula 4.

[Chemical Formula 4]

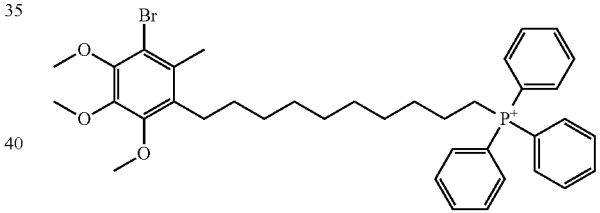

In still another embodiment, the compound according to the Chemical Formula 1 may be the compound having a structure represented by the following Chemical Formula 5.

[Chemical Formula 5]

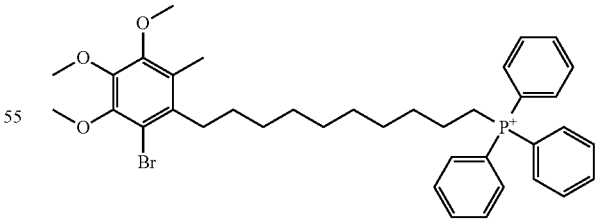

The compounds according to the present application represented by Chemical Formulae 1 to 11 may be provided in the form of pharmaceutically acceptable salts thereof or prodrugs thereof. In an exemplary embodiment, the pharmaceutically acceptable salt may be an acid addition salt, or a halogen salt. Preferably, the pharmaceutically acceptable salt may be a bromine salt.

3. Relationship Between Neovascularization Factors and Neovascular Diseases

A neovascular disease is caused by abnormal neovascularization. Neovascularization is originally a normal homeostasis maintenance action for smooth supply of blood to tissue. However, when such neovascularization is more excessive than in normal tissue, such abnormal neovascularization causes a neovascular disease. Although the causes of the neovascular disease share some commonalities, they cannot be considered to have the same pathological mechanism, and on the whole, a detailed pathological mechanism is not clearly known. However, commonly, neovascularization factors are involved in most neovascular diseases as a major cause.

In neovascular diseases, abnormal cells overproduce neovascularization factors compared to normal cells. Representative of the important neovascularization factors is a vascular endothelial growth factor (VEGF). Suppression of a VEGF ligand, a VEGF receptor (VEGFR) and factors involved in the signaling thereof is known to inhibit such abnormal neovascularization.

Further, recently, study results have been released that hypoxia-inducible factor 1-alpha (HIF-1α) is involved in neovascularization. For example, there is a result that HIF-1α induces retinal and subretinal neovascularization in the eye [5]. HIF-1α is known as a factor overexpressed in a hypoxic state and involved in the growth and survival of cells. In addition, HIF-1α is involved in neovascularization and is one of the parent moderators of VEGF. The neovascularization signaling pathway of HIF-1α is shown in in FIG. 1. Despite the research on the possibility of direct inhibitory treatment of HIF-1α, it has not produced any significant results to date due to unexpected toxicity [6].

In addition, EPO, PGF, ANGPTL4, SDF-1, VEGFR1, VEGFR2, PDGFRP, and CXCR4 among the child moderators of HIF-1α also function as neovascularization factors.

4. Treatment of Neovascular Disease by Suppressing TRAP-1

The inventors of the present application has investigated factors that are expressed only in abnormal cells as parent moderators of VEGF and HIF-1α rather than VEGF and HIF-1α which have been used as the main targets in the related art. The present application includes methods for inhibiting the same, effective materials for inhibiting the same, as well as formulations and therapeutic methods including the same.

Tumor necrosis factor receptor-associated protein-1 (TRAP-1) is a paralog of heat shock protein-90 (HSP90) which is a chaperone protein and a mitochondrial protein which is present only in mitochondria.

HSP90 is a chaperone protein which is responsible for a large portion of the body's protein and is known to be involved in the function of regulating cellular homeostasis, and thus has been studied as an anticancer target [7]. However, since HSP90 is a common chaperone protein expressed without distinguishing abnormal cells and normal cells, there are many cases where unexpected side effects are produced by inhibiting HSP90. For this reason, 18 HSP90 inhibitors have entered the clinical trial phase since 1999, but only 5 HSP90 inhibitors have been in clinical trials until 2018 [8].

Figure 3:
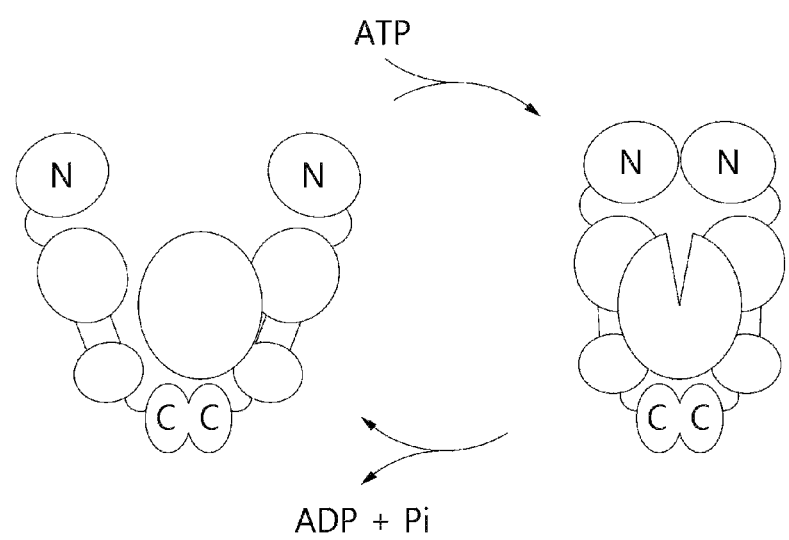
FIG. 3 illustrates the structure of TRAP-1 and an operating process thereof.

The hsp90s including TRAP-1 has a structure in which two protomers are bonded. In this case, each protomer is referred to as a first protomer and a second protomer. When a specific client protein binds to hsp90s, hsp90s has the functions of binding and degrading ATP and forming a stereo structure of the client protein, as protomers arranged spaced apart approach. Each protomer consists of an N-terminal domain, a middle domain, and a C-terminal domain. The N-terminal domain is a domain where ATP binds to produce energy for the activity of hsp90s. The middle domain is a domain where client proteins specific to each hsp90s bind. The C-terminal domain is a domain where two protomers are linked. Exemplarily, the structure and operating process of TRAP-1 are illustrated in FIG. 3.

hsp90s is characterized by very high N-terminal domain homology between paralogs, but low middle domain homology. Existing HSP90 inhibitors include an adenosine backbone, which is homologous to ATP, and thus suppressed HSP90 by competitively inhibiting the binding of ATP to the N-terminus of hsp90s. This caused a problem in that existing HSP90 inhibitors acted non-selectively on all hsp90s [9]. This raised awareness of the need for selective inhibitors targeting sites with low homology for each paralog but did not lead to the development of practical drug molecules [10].

During a study on hsp90s and inhibitors thereof, the inventors of the present application confirmed that mitochondrial hsp90, not cytoplasmic hsp90s, is actively involved in the metabolism of abnormal cells in neovascular diseases. Based on this, the inventors of the present application developed gamitrinib in which a functional group with mitochondrial membrane permeability is attached to geldanamycin known as an inhibitor of HSP90, and confirmed that gamitrinib has an excellent therapeutic effect. However, gamitrinib still showed a suppressive ability against cytoplasmic hsp90s, and thus had a problem of showing strong toxicity (see Korean Patent Application Laid-Open No. KR20150109540A).

Thus, furthermore, the inventors of the present application analyzed tissues in which neovascular diseases occurred, and found that TRAP-1 among mitochondrial hsp90s was expressed only in abnormal tissue sites. Thus, as a result of recognizing the need for selective suppression of TRAP-1 and conducting an experiment to suppress TRAP-1, it was verified that TRAP-1 is an effective target for the treatment of a neovascular disease. Thus, subsequently, after continuous studies on inhibitors capable of selectively suppressing TRAP-1, a selective inhibitor of TRAP-1 could be developed for the first time. The compound according to the present application, which is one of them, enables selective suppression of TRAP-1 by binding to the middle domain having low homology among the protomers of TRAP-1.

Figure 2:
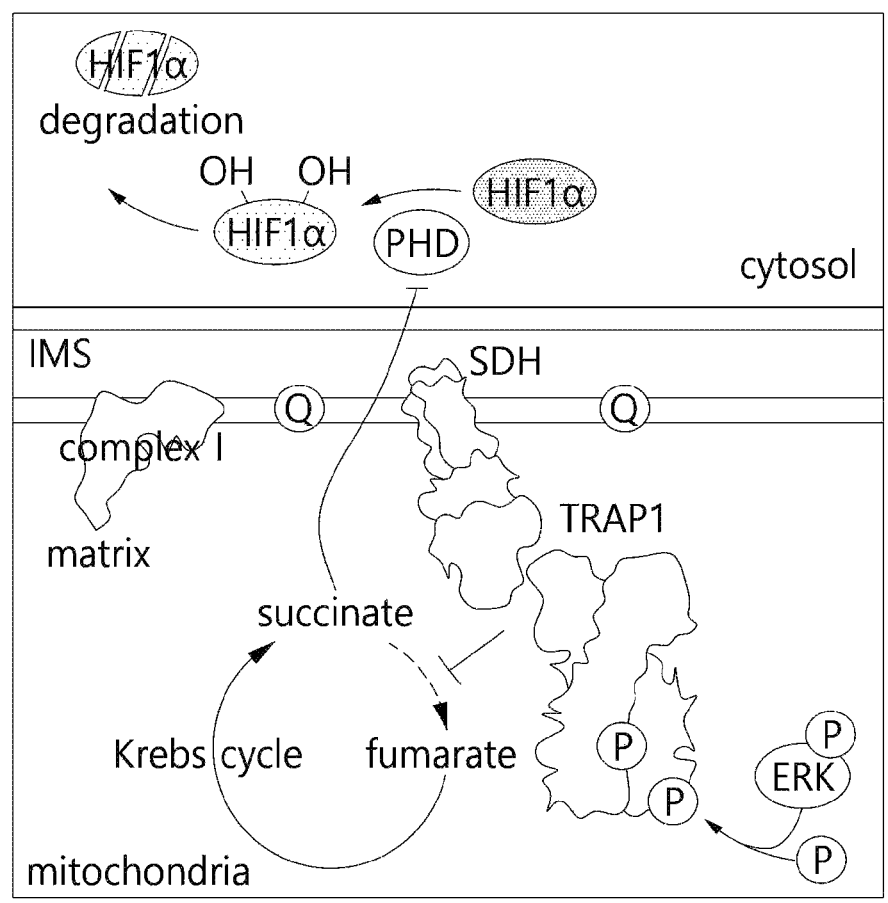
FIG. 2 illustrates a specific signaling pathway between TRAP-1 and HIF-1α.

TRAP-1 is a parent moderator of HIF-1α, and the confirmed signal transduction system of TRAP-1 and HIF-1α is shown in FIG. 2.

5. Suppression of TRAP-1 by Compounds According to the Present Application

The purpose of this table of contents is to clarify the interaction between the structure of the compound according to the present application and TRAP-1, and also to disclose the structural characteristics of the compound in this regard.

The drug molecule according to the present application is a compound having a structure of Chemical Formula 7, $$B\text{-}L\text{-}C^+ \qquad \text{[Chemical Formula 7]}$$

wherein,

B is a bonding moiety having affinity for a TRAP-1 protomer, L is a linking moiety for linking a bonding moiety and a cationic moiety, and C⁺ is a cationic moiety with a positive charge.

In this case, the bonding moiety may have the ability to bind to the N-terminal domain, middle domain, or C-terminal domain of the TRAP-1 protomer. In this case, the bonding moiety needs to have binding ability to the active site of the TRAP-1 protomer, and it is desirable that the bonding moiety has binding ability to the middle moiety.

In addition, it is preferred that the bonding moiety has a specific volume. This is because it is desirable to have a suitable volume in order to have binding ability to the TRAP-1 protomer. In certain preferred exemplary embodiments, the bonding moiety may include an alkoxy group as a substituent. Furthermore, the bonding moiety may include two or more alkoxy groups as substituents. In certain preferred exemplary embodiments, the bonding moiety may include a carbonyl group as a substituent. Furthermore, the bonding moiety may include two or more carbonyl groups as substituents. In certain preferred exemplary embodiments, the bonding moiety may include an alky group as a substituent. In certain preferred exemplary embodiments, the bonding moiety may include an alkoxy group and a carbonyl group group as a substituent. Furthermore, the bonding moiety may include two or more alkoxy groups and two or more carbonyl groups as substituents.

In this case, the length of the linking moiety may affect the interaction between TRAP-1 and the drug molecule of the present application. The interaction between TRAP-1 and the drug molecule may be (1) when the drug molecule binds to a specific part of two precursors of TRAP-1, (2) when all of one drug molecule binds to a specific part of the two precursors of TRAP-1, and (3) when the drug molecule cannot bind to a specific part of a precursor of TRAP-1. Except for the case of (3), when the length of the linking moiety is, for example, less than a specific length, the proportion of (1) may be higher than the proportion of (2). Further, when the length of the linking moiety is equal to or more than a specific length, the proportion of (2) may be higher than the proportion of (1). In addition, when the length of the linking moiety is a specific length, the proportion of (2) may be optimized so as to be the highest.

Further, the length of the linking moiety may be a value close to the distance between a specific component of the first protomer and a specific component of the second protomer in a state where TRAP-1 does not bind to ATP. In this case, the specific component of each protomer may be an N-terminal domain, a middle domain, or a C-terminal domain, respectively. Furthermore, in this case, at least one of the specific components of each protomer may be a middle domain. Alternatively, in this case, the length of the linking moiety may be a value close to the distance between a specific component of the first protomer and a specific component of the second protomer in a state where TRAP-1 binds to ATP. In this case, the specific component of each protomer may be an N-terminal domain, a middle domain, or a C-terminal domain, respectively. Furthermore, in this case, at least one of the specific components of each protomer may be a middle domain.

Alternatively, the cationic moiety may have high lipophilicity. Exemplarily, a molecule having high lipophilicity has a bulky non-polar part, has a polar part surrounded by the non-polar part, or may have a large molecular weight. The cationic moiety permeates the mitochondrial membrane to allow drug molecules to be delivered into the mitochondria.

Additionally, the cationic moiety may have the ability to bind to the N-terminal domain, middle domain, or C-terminal domain of the protomer. This is because the minimum amount of therapeutically effective drug molecule can be efficiently reduced when the cationic moiety shows the ability to bind to the protomer. However, the ability of the cationic moiety to bind to the protomer does not need to be the same as that of the bonding moiety.

In addition, it is preferred that a specific part of the bonding moiety has a specific volume. This is because a suitable volume is required to have the ability to bind to a specific part of the protomer. In this case, the specific part may have a cyclic structure.

6. Classification of Ocular Diseases

Ocular diseases may be classified in various ways. First, ocular diseases may be classified according to the ocular structure in which an abnormality occurs.

In this case, the ocular structure in which an abnormality occurs may be an eyeball-surrounding structure surrounding the eyeball. The eyeball-surrounding structure may be the eyelids or lacrimal glands.

Alternatively, the ocular structure in which an abnormality occurs may be a component of the eyeball, which constitutes the eyeball. The component of the eyeball may be the conjunctiva, sclera, cornea, iris, ciliary body, lens, choroid, retina, vitreous body, optic nerve, or ocular muscle. In this case, the ocular disease occurring in the retina is called retinosis or retinopathy.

In addition, ocular diseases may be classified according to the presence or absence of neovascularization.

An ocular disease caused by neovascularization of a specific ocular structure or the entire eyeball is called a neovascular ocular disease. Neovascularization refers to a physical phenomenon in which new blood vessels are formed around pre-existing blood vessels, and in the present application, neovascularization includes angiogenesis, which is a phenomenon in which new blood vessels grow from pre-existing blood vessels. Abnormal vascular weakening, ischemia, or overproduction of neovascularization factors may result in abnormal neovascularization in the ocular structure. For this reason, since the blood vessel structure becomes dense, and the blood vessels cannot grow sufficiently thick, abnormal symptoms, such as an increase in pressure of the blood vessels and separation of the blood vessel from the ocular structure, occur.

Neovascular ocular disease may be classified according to the ocular structure in which neovascularization occurs. In this case, the neovascular ocular disease may be choroidal neovascularization, retinal neovascularization, subretinal neovascularization, corneal neovascularization, or iris neovascularization (Rubeosis iridis).

Among them, retinal neovascularization occurs when neovascularization that begins from the inside of the retina protrudes to the boundary between the retina and the vitreous body. Symptoms such as contamination of the vitreous body and retinal detachment appear due to ischemia that occurs in new blood vessels. Ocular diseases caused by this include diabetic retinopathy, retinopathy of prematurity, retinal vein occlusion, or the like. Retinal neovascular disease is accompanied by ischemic symptoms of retinal blood vessels, and thus is also called ischemia retinopathy.

In subretinal neovascularization, neovascularization that begins in the substructure of the retina protrudes to the boundary between the substructure and the retina. In this case, subretinal neovascularization may be caused by choroidal neovascularization. Representative ocular diseases caused by this include wet age-related macular degeneration (wet AMD), and the like. In the case of wet age-related macular degeneration, ischemia that occurs in the new blood vessels that have penetrated under the macula causes degeneration of the photoreceptors and macular cells of the macula.

Alternatively, neovascular ocular diseases may be classified according to symptoms without being specific to a specific ocular structure. For example, neovascular glaucoma belongs to this category.

An ocular disease in which neovascularization is not observed in a specific ocular structure or the entire eye is called a non-neovascular ocular disease. Dry age-related macular degeneration (dry AMD) belongs to this category.

The ocular disease to be treated in the present application corresponds to a neovascular ocular disease.

7. Pharmaceutical Compositions According to the Present Application

The present application may provide pharmaceutical compositions including one or more selected from the compounds according to the present application as an active ingredient. In this case, the compounds according to the present application refer to compounds represented by Chemical Formulae 1 to 11, and the contents of "2. Compound structures of the present application" shall apply mutatis mutandis to Chemical Formulae 1 to 11.

In specific exemplary embodiments, the pharmaceutical composition according to the present application may be used for the treatment of a neovascular ocular disease. Further, the neovascular ocular disease may be choroidal neovascular disease, retinal neovascular disease, subretinal neovascular disease, corneal neovascular disease, iris neovascular disease (Rubeosis iridis) or neovascular glaucoma. In one embodiment, the neovascular ocular disease may be retinal neovascular disease. Further, the retinal neovascular disease may be diabetic retinopathy, retinopathy of prematurity, or retinal vein occlusion. Preferably, the retinal neovascular disease may be diabetic retinopathy. In another exemplary embodiment, the neovascular ocular disease may be choroidal neovascular disease. Further, the choroidal neovascular disease may be wet age-related macular degeneration (wet AMD).

In specific exemplary embodiments, the pharmaceutical composition according to the present may be for oral or eye drop administration. Preferably, the pharmaceutical composition according to the present may be for eye drop administration.

The present application may provide methods for treating neovascular ocular diseases, the methods including administering one or more selected from the compounds according to the present application. In this case, the compounds according to the present application refer to compounds represented by Chemical Formulae 1 to 11, and the contents of "2. Compound structures of the present application" shall apply mutatis mutandis to Chemical Formulae 1 to 11.

In specific exemplary embodiments, the neovascular ocular disease may be choroidal neovascular disease, retinal neovascular disease, subretinal neovascular disease, corneal neovascular disease, iris neovascular disease (Rubeosis iridis) or neovascular glaucoma. In one embodiment, the neovascular ocular disease may be retinal neovascular disease. Further, the retinal neovascular disease may be diabetic retinopathy, retinopathy of prematurity, or retinal vein occlusion. Preferably, the retinal neovascular disease may be diabetic retinopathy. In another exemplary embodiment, the neovascular ocular disease may be choroidal neovascular disease. Further, the choroidal neovascular disease may be wet age-related macular degeneration (wet AMD).

In specific exemplary embodiments, the methods for treating neovascular ocular diseases according to the present may comprise administering the compounds according to the present application by oral or eye drop route. Preferably, the method for treating a neovascular ocular disease according to the present application may include administering the compound according to the present application by an eye drop route.

The composition and invention of the present application may be used for the treatment of a subject in need thereof. In specific exemplary embodiments, the subject is a mammal, such as a human, or a non-human mammal. When administered to a subject, for example, a human, the composition or compound is preferably administered as, for example, a pharmaceutical composition including the compound of the present application and a pharmaceutically acceptable carrier. The pharmaceutically acceptable carrier is well known in the art, and includes, for example, an aqueous solution such as water or physiologically buffered saline or an oil such as glycol, glycerol, olive oil, or other solvents or vehicles such as injectable organic esters. In preferred exemplary embodiments, when such pharmaceutical compositions are administered to humans, especially when administered by an invasive route (that is, a route that avoids transport or diffusion through the epithelial roof wall, such as injection or transplantation), the aqueous solution is free of a pyrogen or substantially free of a pyrogen. An additive may be selected, for example, to contribute to the sustained release of a preparation or to selectively target one or more cells, tissues, or organs. The pharmaceutical composition may be provided as a tablet, a capsule (including a sprinkle capsule and a gelatin capsule), granules, a lyophilisate which can be reconstituted, a powder, a solution, a syrup, a suppository, or an injection, or in other unit dosage forms. The composition may also be provided as a transdermal delivery system, for example, a skin patch. The composition may also be provided as a solution suitable for topical administration, for example, eye drops.

A pharmaceutically acceptable carrier may include a physiologically acceptable agent including for example, one that serves to stabilize, increase solubility, or increase the absorption of a compound, such as the compound of the present application. The physiologically acceptable agent includes, for example, a carbohydrate such as glucose, sucrose or dextran, an antioxidant such as ascorbic acid or glutathione, a chelating agent, a low molecular weight protein or other stabilizers or additives. The selection of a pharmaceutically acceptable carrier, for example, a physiologically acceptable agent, depends, for example, on the route of administration of the composition. A formulation of the pharmaceutical composition may be a self-emulsifying drug delivery system or a self-microemulsifying drug delivery system. The pharmaceutical composition (formulation) may be a pharmaceutical composition in which, for example, the compound of the present application is included inside liposomes or other polymer matrices. Liposomes, for example, consist of phospholipids or other lipids and are nontoxic, physiologically acceptable, and metabolizable carriers that are relatively easy to prepare and administer.

As used herein, the term "pharmaceutically acceptable" refers to a compound, material, composition, and/or dosage form that does not exhibit excessive toxicity, irritation, allergic reaction or other problems or side effects within the scope of reasonable medical judgment, and thus is suitable for use in contact with tissues of a subject and has a reasonable benefit/risk ratio.

As used herein, the term "pharmaceutically acceptable carrier" refers to a pharmaceutically acceptable material, composition, or carrier, for example, a liquid or solid filler, diluent, additive, solvent, or encapsulated material. Each carrier should be "acceptable", which means that it is compatible with the other components of the dosage form and does not harm the subject. Some examples of a material capable of functioning as a pharmaceutically acceptable carrier include: (1) sugars such as lactose, glucose and sucrose; (2) starch such as corn starch or potato starch; (3) cellulose such as sodium carboxymethyl cellulose, ethyl cellulose and cellulose acetate, and derivatives thereof; (4) powdered tragacanth; (5) malt; (6) gelatin; (7) talc; (8) additives such as cocoa butter and suppository wax; (9) oils such as peanut oil, cottonseed oil, safflower oil, sesame oil, olive oil, corn oil and soybean oil; (10) glycols such as propylene glycol; (11) polyols such as glycerin, sorbitol, mannitol, and polyethylene glycol; (12) esters such as ethyl oleate and ethyl laurate; (13) agar; (14) buffering agents such as magnesium hydroxide and aluminum hydroxide; (15) alginic acid; (16) pyrogen-free water; (17) isotonic distilled water; (18) Ringer's solution; (19) ethyl alcohol; (20) a phosphate buffer solution; and (21) other nontoxic compatible materials that are included in a pharmaceutical dosage form.

The pharmaceutical composition (formulation) may be administered via various routes of administration, and the route of administration includes, for example, oral (for example, drenches such as aqueous or non-aqueous solutions or suspensions, tablets, capsules (including sprinkle capsules and gelatin capsules), boluses, powders, granules, pastes for application to the tongue); absorption through the oral mucosa (for example: sublingually); anal, rectal or vaginal (for example, as a pessary, cream or foam); parenteral (intramuscularly, intravenously, subcutaneously or intrathecally, for example, a sterile solution or suspension); nasal; intraperitoneal; subcutaneously; transdermal (for example, as a patch applied to the skin); and topical (for example, as a cream, ointment or spray applied to the skin, or as eye drops) administration. The compound may also be formulated for inhalation. In certain exemplary embodiments, a compound may be simply dissolved or suspended in sterile water. Specific examples of appropriate routes of administration and compositions suitable for same can be found in, for example, U.S. Pat. Nos. 6,110,973, 5,763,493, 5,731,000, 5,541,231, 5,427,798, 5,358,970 and 4,172,896, as well as in patents cited therein.

The formulations may conveniently be provided in a unit dosage form and may be prepared by any method well known in the art of pharmacy. The amount of active material which can be mixed with a carrier material to produce a single dosage form will vary depending upon the subject to be treated and the particular mode of administration. The amount of an active material that can be mixed with a carrier material to produce a single dosage form will generally be an amount of the compound that produces a therapeutic effect. Generally, based on 100 percent, the amount is about 1 percent to about 99 percent of an active material, preferably about 5 percent to about 70 percent, and most preferably from about 10 percent to about 30 percent.

Methods for preparing these formulations or compositions include combining an active compound, for example, the compound of the present application, with a carrier and, optionally, one or more accessory ingredients. In general, the formulations are prepared by uniformly and intimately combining the compound of the present application with a liquid carrier, or a finely divided solid carrier, or both, and then molding the product, if necessary.

Formulations of the present application suitable for oral administration may be in the form of capsules (including sprinkle capsules and gelatin capsules), cachets, pills, tablets, lozenges (using a flavored base, usually sucrose and acacia or tragacanth), lyophilisates, powders, granules, or a solution or a suspension in an aqueous or non-aqueous liquid, or an oil-in-water or water-in-oil liquid emulsion, or an elixir or syrup, or pastilles (using an inert base, such as gelatin and glycerin, or sucrose and acacia) and/or mouth washes and the like, each containing a predetermined amount of the compound of the present application as an active material. Compositions or compounds may also be administered in the form of a bolus, ointment or paste.

To prepare a solid dosage form (capsules (including sprinkle capsules and gelatin capsules), tablets, pills, dragees, powders, granules and the like), the active ingredient is mixed with one or more pharmaceutically acceptable carriers, for example, sodium citrate or dicalcium phosphate, and/or any of the following: (1) fillers or extenders, such as starch, lactose, sucrose, glucose, mannitol, and/or silicic acid; (2) binders, such as, for example, carboxymethylcellulose, alginic acid, gelatin, polyvinyl pyrrolidone, sucrose and/or acacia; (3) humectants, such as glycerol; (4) disintegrating agents, such as agar-agar, calcium carbonate, potato or tapioca starch, alginic acid, certain silicates, and sodium carbonate; (5) solution retarding agents, such as paraffin; (6) absorption accelerators, such as quaternary ammonium compounds; (7) wetting agents, such as, for example, cetyl alcohol and glycerol monostearate; (8) absorbents, such as kaolin and bentonite clay; (9) lubricants, such as talc, potassium stearate, magnesium stearate, solid polyethylene glycol, sodium lauryl sulfate, and mixtures thereof; (10) complexing agents, such as modified and unmodified cyclodextrins; and (11) coloring agents. In the case of capsules (including sprinkle capsules and gelatin capsules), tablets and pills, the pharmaceutical compositions may also include buffering agents. Solid compositions of a similar type may also be used as fillers in soft and hard-filled gelatin capsules using lactose or milk sugars, as well as high molecular weight polyethylene glycol and the like.

A tablet may be made by compression or molding, optionally with one or more additional ingredients. Compressed tablets may be prepared using a binder (for example, gelatin or hydroxypropylmethyl cellulose), a lubricant, an inert diluent, a preservative, a disintegrating agent (for example, sodium starch glycolate or cross-linked sodium carboxymethyl cellulose), a surfactant or a dispersing agent. Molded tablets may be prepared by molding a mixture of the powdered compound soaked with an inert liquid diluent in a suitable machine.

The tablets, and other solid dosage forms of the pharmaceutical compositions, for example, dragees, capsules (including sprinkle capsules and gelatin capsules), pills and granules, may optionally be surrounded or prepared with coatings and shells, such as enteric coatings and other coatings well known in the pharmaceutical-formulating art. These formulations may also be prepared using, for example, hydroxypropylmethyl cellulose in varying proportions to provide a desired release profile, other polymer matrices, liposomes and/or microspheres, so as to provide slow or controlled release of the active ingredient therein. These formulations may be sterilized by, for example, filtration through a bacteria-retaining filter, or by binding sterilizing agents in the form of a sterile solid composition that can be dissolved in sterile water or incorporating a suitable amount of sterile injectable material immediately before use. These compositions may also optionally contain opacifying agents and may be in the form of a composition that these compositions release the active ingredient(s) necessarily or preferentially in a certain amount in the gastrointestinal tract, and optionally, in a delayed manner. Examples of embedding compositions that can be used include polymeric materials and waxes. The active material can also be in a micro-encapsulated form, if appropriate, with one or more of the aforementioned additives.

Liquid dosage forms useful for oral administration include pharmaceutically acceptable emulsions, lyophilisates for reconstitution, microemulsions, solutions, suspensions, syrups, and elixirs. In addition to the active ingredient, the liquid dosage forms may include inert diluents commonly used in the art, such as, for example, water or other solvents, cyclodextrins and derivatives thereof, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (specifically, cottonseed oil, peanut oil, corn oil, germ oil, olive oil, castor oil and sesame oil), glycerol, tetrahydrofuryl alcohol, polyethylene glycol and fatty acid esters of sorbitan, and mixtures thereof.

Besides inert diluents, the oral compositions may also include adjuvants such as wetting agents, emulsifying or suspending agents, sweetening, flavoring, coloring, perfuming and preservative agents.

Suspensions, in addition to the active materials, may include suspending agents as, for example, ethoxylated isostearyl alcohols, polyoxyethylene sorbitol and sorbitan esters, microcrystalline cellulose, aluminum metahydroxide, bentonite, agar-agar and tragacanth, and mixtures thereof.

The formulation of a pharmaceutical compositions for rectal, vaginal, or urethral administration may be provided as a suppository, and may be prepared by mixing one or more active compounds with one or more suitable non-irritating additives or carriers, for example, cocoa butter, polyethylene glycol, a suppository wax or a salicylate, and those which are solid at room temperature, but liquid at body temperature, and thus, will melt in the rectum or vaginal cavity to release the active compound.

The formulation of a pharmaceutical composition for oral administration may be provided as a mouth wash, or an oral spray, or an oral ointment.

Alternatively or additionally, compositions may be formulated for delivery via a catheter, stent, wire, or other intraluminal devices. Delivery via such devices may be useful particularly for delivery to the bladder, urethra, ureter, rectum, or intestines.

Formulations which are suitable for vaginal administration also include pessaries, tampons, creams, gels, pastes, foams, or spray formulations containing carriers that are well known in the art to be appropriate.

Dosage forms for topical or transdermal administration include powders, sprays, ointments, pastes, creams, lotions, gels, solutions, patches, and inhalants. The active compound may be mixed in a sterile environment with a pharmaceutically acceptable carrier, and if necessary, with any preservatives, buffers, or propellants.

The ointments, pastes, creams, and gels may contain, in addition to an active compound, additives, such as animal and vegetable fats, oils, waxes, paraffin, starch, tragacanth, cellulose derivatives, polyethylene glycol, silicone, bentonite, silicic acid, talc and zinc oxide, or mixtures thereof.

Powders and sprays may contain, in addition to an active compound, additives such as lactose, talc, silicic acid, aluminum hydroxide, calcium silicate and polyamide powder, or mixtures of these materials. Sprays may additionally contain general propellants, such as chlorofluorohydrocarbons and volatile unsubstituted hydrocarbons, such as butane and propane.

Transdermal patches have an additional advantage of providing controlled delivery of a compound of the present application to the body. Such dosage forms may be made by dissolving or dispersing the active compound in an appropriate vehicle. Absorption enhancers may be used to increase the flow of the compound penetrating the skin. The rate of such flow can be controlled by either providing a rate controlling membrane or dispersing the compound in a polymer matrix or gel.

Ophthalmic formulations, eye ointments, powders, solutions, and the like, are also contemplated as being within the scope of the present application. Exemplary ophthalmic formulations are described in U.S. Publication Nos. 2005/0080056, 2005/0059744, 2005/0031697 and 2005/004074 and U.S. Pat. No. 6,583,124, the contents of which are incorporated herein by reference. If desired, liquid ophthalmic formulations have properties similar to that of lacrimal fluids, the aqueous humor or vitreous humor or are compatible with such fluids. A preferred route of administration is local administration (for example, topical administration, such as eye drops or administration via an implant).

The term "parenteral administration" as used herein refers to a mode of administration other than enteral and topical administration, generally by injection, and includes intravenous, intramuscular, intraarterial, intrathecal, intracapsular, intraorbital, intracardiac, intradermal, intraperitoneal, transtracheal, subcutaneous, subcuticular, intraarticular, subcapsular, subarachnoid, intraspinal and intrasternal injection and infusion, but are not limited thereto.

Pharmaceutical compositions suitable for parenteral administration include one or more active compounds mixed with one or more pharmaceutically acceptable sterile isotonic aqueous or non-aqueous solutions, dispersions, suspensions or emulsions, or sterile powders which may be reconstituted into sterile injectable solutions or dispersions just prior to use, and may include antioxidants, buffers, bacteriostats, solutes which render the formulation isotonic when administered to the blood of an intended recipient or suspending or thickening agents.

Examples of suitable aqueous or non-aqueous carriers that may be used in the pharmaceutical composition of the present application include water, ethanol, polyols (such as glycerol, propylene glycol, polyethylene glycol, and the like), and suitable mixtures thereof, vegetable oils, such as olive oil, and injectable organic esters, such as ethyl oleate. Appropriate fluidity may be maintained, for example, by the use of coating materials, such as lecithin, by the maintenance of the required particle size in the case of dispersions and using surfactants.

These compositions may also contain adjuvants such as preservatives, wetting agents, emulsifying agents, and dispersing agents. Suppression of microorganism activity may be ensured by including various antibacterial and antifungal agents, such as paraben, chlorobutanol, phenol sorbic acid, and the like.

In addition, it may be desirable to include isotonic agents, such as sugars, sodium chloride, and the like in the compositions. Additionally, prolonged absorption of the injectable pharmaceutical formulation may be brought about by including agents that delay absorption such as aluminum monostearate and gelatin.

In some cases, in order to prolong the effect of a drug, it is desirable to slow the absorption of the drug from subcutaneous and intramuscular injections. This may be accomplished by the use of a liquid suspension of a crystalline or amorphous material having poor water solubility. In this case, the rate of absorption of the drug depends upon the rate of dissolution of the material, that is, may depend upon the size and shape of crystals. Alternatively, delayed absorption of a parenterally administered drug formulation may be accomplished by dissolving or suspending the drug in an oil vehicle.

Injectable depot forms are made by forming microencapsulated matrices of the subject compounds in biodegradable polymers such as polylactide-polyglycolide. Depending on the ratio of drug to polymer, and the nature of the particular polymer used, the release rate of drug may be adjusted. Examples of other biodegradable polymers include poly (orthoesters) and poly(anhydrides). Injectable depot formulations may also be prepared by enclosing the drug in liposomes or microemulsions that are compatible with body tissue.

For use in the methods of the present application, active compounds may be provided by themselves or as a pharmaceutical composition containing, for example, 0.1 to 99.5% (more preferably, 0.5 to 90%) of active ingredient in combination with a pharmaceutically acceptable carrier.

Methods of introduction may also be provided by rechargeable or biodegradable devices. Various slow-release polymeric devices have been recently developed and tested in vivo in order to adjust the release of drugs, including proteinaceous biopharmaceuticals. A variety of biocompatible polymers (including hydrogels), including both biodegradable and non-degradable polymers, can be used to make an implant for the sustained release of a compound at a particular target site.

Actual dosage levels of the active ingredients in the pharmaceutical compositions may be varied so as to obtain an amount of the active ingredient that is effective to achieve a desired therapeutic response for a particular patient, composition, and mode of administration, without exhibiting toxicity to the patient.

The selected dosage level will depend upon a variety of factors including the activity of the particular compound or combination of compounds used, or the ester, salt or amide thereof, the route of administration, the time of administration, the rate of excretion of the particular compound(s) being used, the duration of the treatment, other drugs, compounds and/or materials used in combination with the particular compound(s) used, the age, sex, body weight, condition, general health and prior medical history of the patient being treated, and other factors well known in the medical field.

A physician or veterinarian having ordinary skill in the art can readily determine and prescribe the required therapeutically effective amount of the pharmaceutical composition. For example, the physician or veterinarian can start doses of the pharmaceutical composition or compound at levels lower than that required in order to achieve a desired therapeutic effect and slowly increase the dosage until the desired effect is achieved. The "therapeutically effective amount" refers to the concentration of a compound that is sufficient to elicit the desired therapeutic effect. It is generally understood that the effective amount of the compound will vary according to the body weight, sex, age, and medical history of a subject. Other factors which influence the effective amount include the severity of the subject's condition, the disorder being treated, the stability of the compound, and, if desired, another type of therapeutic agent being administered with the compound of the present application but are not limited thereto. A larger total dose can be delivered by multiple administrations of the preparation. Methods for determining efficacy and dosage are known to those skilled in the art (Isselbacher et al. (1996) Harrison's Principles of Internal Medicine 13 ed., 1814-1882, incorporated herein by reference).

In general, a suitable daily dose of an active compound used in the compositions and methods of the present application will be an amount of the compound that is the lowest dose effective for producing a therapeutic effect. Such an effective dose will generally depend upon the factors described above.

In certain exemplary embodiments, the compound of the present application may be used alone or conjointly administered with another type of therapeutic agent. As used herein, the term "conjoint administration" refers to any mode of administration of two or more different therapeutic compounds such that a second compound is administered while the previously administered therapeutic compound is still effective in the body (for example, the two compounds are simultaneously effective in the subject, and may include synergistic effects of the two compounds). For example, the different therapeutic compounds can be administered either in the same formulation or in separate formulations, either concomitantly or sequentially. In certain exemplary embodiments, the different therapeutic compounds can be administered within 1 hour, 12 hours, 24 hours, 36 hours, 48 hours, 72 hours, or a week of one another. Therefore, a subject who receives such treatment can benefit from a combined effect of different therapeutic compounds.

In certain exemplary embodiments, conjoint administration of the compound of the present application with one or more additional therapeutic agents (for example, one or more additional chemotherapeutic agents) provides improved efficacy compared to each individual administration of the compound of the present application or the one or more additional therapeutic agents. In certain such exemplary embodiments, the conjoint administration provides an additive effect, wherein the additive effect refers to the sum of each of the effects of individual administration of the compound of the present application and the one or more additional therapeutic agents.

The present application includes the use of pharmaceutically acceptable salts of compounds of the present application in the compositions and methods of the present application. In certain exemplary embodiments, intended salts of the present application include alkyl, dialkyl, trialkyl or tetra-alkyl ammonium salts, but are not limited thereto. In certain exemplary embodiments, intended salts of the present application include L-arginine, benenthamine, benzathine, betaine, calcium hydroxide, choline, deanol, diethanolamine, diethylamine, 2-(diethylamino)ethanol, ethanolamine, ethylenediamine, N-methylglucamine, hydrabamine, 1H-imidazole, lithium, L-lysine, magnesium, 4-(2-hydroxyethyl)morpholine, piperazine, potassium, 1-(2-hydroxyethyl)pyrrolidine, sodium, triethanolamine, tromethamine, and zinc salts, but are not limited thereto. In certain exemplary embodiments, intended salts of the present application include Na, Ca, K, Mg, Zn, or other metal salts, but are not limited thereto.

The pharmaceutically acceptable acid addition salts may also be present as water, methanol, ethanol, dimethylformamide, and other various solvates. Mixtures of such solvates may also be prepared. The source of such solvate may be from a solvent that crystallizes, which may be due to the intrinsic characteristics of the solvent being prepared or crystallized, or due to accidental causes according to the solvent.

The composition according to the present application may comprise wetting agents, such as sodium lauryl sulfate and magnesium stearate, emulsifiers and lubricants, coloring agents, release agents, coating agents, sweetening, flavoring and perfuming agents, preservatives, and antioxidants.

Examples of pharmaceutically acceptable antioxidants include: (1) water-soluble antioxidants, such as ascorbic acid, cysteine hydrochloride, sodium bisulfate, sodium metabisulfite, sodium sulfite and the like; (2) oil-soluble antioxidants, such as ascorbyl palmitate, butylated hydroxyanisole (BHA), butylated hydroxytoluene (BHT), lecithin, propyl gallate, alpha-tocopherol, and the like; and (3) metal-chelating agents, such as citric acid, ethylenediamine tetraacetic acid (EDTA), sorbitol, tartaric acid, phosphoric acid, and the like.

SPECIFIC EXAMPLES

Example 1. Experiment Methods for the Following Experiments

Oxygen-Induced Retinopathy Mouse Model and SMX Eyeball Injection

An oxygen-induced retinopathy mouse model was induced by rearing young C57BL/6J (Hyochang Science Inc.) mice aged 7 days after birth (P7) in a hyperoxic chamber (Coy Lab. in vivo chamber, 75% $O_2$) for 5 days (P12), and then rearing the mice in a normoxic environment for 5 days (P17). After the young mice were removed from the hyperoxic chamber (P12), 1 ul of SMX was intraocularly injected once at a concentration of 0.15 mM (0.1% DMSO). The SMX used for ocular injection was used after being diluted in phosphate buffer saline (1×PBS) to 0.1%, and 0.1% DMSO in 1×pbs was used in control mice. In the case of Eylea (aflibercept, anti-VEGFab), 40 ug was diluted in 1 ul and 1 ul was intraocularly injected.

Retinal Vascular Analysis

The oxygen-induced retinopathy mouse model was formed, and then perfused with 1×PBS and 4% PFA. After mouse eyes were extracted and fixed in 4% PFA, the retinas were isolated. The isolated retinas were washed with 1×PBS, and then blocked (0.1% BSA, 0.1% Triton X-100 in 1×PBS) at room temperature for 1 hour. The retinas were treated with a CD31 blood-vessel staining antibody (CD31, Cell Signaling, 1:100) overnight at 4° C. The next day, the retinas were washed with 1×PBS and then stained with a secondary antibody overnight at 4° C. (Alexa Fluor 594-anti rabbit antibody, 1:500). The next day, the retinas were washed with 1×PBS, and then mounted. Blood vessel staining was analyzed under a fluorescence microscope (Zen, Axio Zoom). Analysis was performed using Zen software.

Cell Culture

Muller cells (MIO-M1) were cultured at 37° C. and 5% $CO_2$, and DMEM-low glucose (Sigma) including 10% fetal bovine serum and 1% penicillin & streptomycin was used as the medium. A hypoxic chamber was maintained at 37° C., 5% $CO_2$ and 1% $O_2$.

Western Blot

Muller cells (MIO-M1) were seeded in the number of $4 \times 10^5$ on a 60-millimeter plate and cultured in 3 ml of medium for 24 hours. The next day, the cells were treated with SMX, a mitochondrial heat shock protein 90 (TRAP1) inhibitor according to the concentrations shown in the drawing and cultured in a hypoxic chamber for 6 hours. Whole cell lysates were made from the cultured cells, electrophoresed, transferred to a PVDF membrane, and then treated with a primary antibody at 4° C. for 18 hours. The next day, the whole cell lysates were treated with a secondary antibody for 1 hour and protein expression was analyzed using a western blotting detection reagent.

Total RNA Extraction and RNA Level Analysis

Muller cells were treated with gamitrinib and SMX at 3 uM and cultured in a 1% $O_2$ environment for 8 hours, and then total RNA was extracted (Qiagen, total RNA extraction kit). cDNA was synthesized from 1 ug of total RNA (NEB, cDNA synthesis kit). After angiogenic factors were synthesized using PCR, the RNA level was analyzed by agarose electrophoresis.

Tube Formation Assay

TRAP1 was knocked down from Muller cells using siRNA. After changing the media, conditioned media were made by culturing the cells in a 1% $O_2$ environment for 24 hours and stored at −86° C. A 96-well plate was coated with Matrigel, and HUVE cells and conditioned media were mixed and aliquoted. After the cells were cultured in a 37° C. incubator for 4 hours, tube formation was analyzed. Images were captured using a Bio Image Navigator microscope and analyzed by the Image J program.

ATPase Activity Assay

ATPase activity was measured by measuring the release of inorganic phosphates through the PiColorLock Gold Phosphate Detection Kit (Innova Biosciences) according to the manufacturer's manual. TRAP1 (0.5 μM) was cultured with 0.2 mM ATP in 100 mM Tris, 20 mM KCl, and 6 mM $MgCl_2$ under the conditions of pH 7.0 and 37° C. for 3 hours. Thereafter, the PiColorLock Gold reagent and an accelerator (100:1) were added to a 100 μL ATP hydrolyzate sample. After culturing at 25° C. for 5 minutes, the change in color was stopped by adding 10 μL of a stop solution thereto, and the absorbance at 620 nm was measured by SYNERGY NEO microplate reader (BioTek Instruments).

For inhibitory ability analysis, TRAP1 was cultured with a predetermined concentration (0.520 μM) of inhibitor for 30 minutes and then stirred with ATP. Absorbance values were normalized to a DMSO control and data was expressed as % ATPase activity.

Example 2. Suppression of TRAP1 has Therapeutic Effects on Neovascular Ocular Disease

Example 2.1. Preparation of Oxygen-Induced Retinopathy Mouse Model Using TRAP1+/+, +/− Mice TRAP1+/+ and TRAP1+/− mice derived from the same embryos were used by crossing TRAP1+/−(female) and TRAP1+/−(male).

A retinopathy mouse model was made by rearing wild or hetero young TRAP1 mice from day 7 to day 12 after birth (P7-P12) in a hyperoxic chamber (Coy Lab. in vivo chamber, 75% $O_2$), and then rearing the mice from day 12 to day 17 in a normoxic environment.

Example 2.2. Retinal Vascular Analysis of TRAP-1+/+, +/− Oxygen-Induced Retinopathy Mouse Model The oxygen-induced retinopathy mouse model was formed, and then perfused with 1×PBS and 4% PFA. After mouse eyes were extracted and fixed in 4% PFA, the retinas were isolated. The isolated retinas were washed with 1×PBS, and then blocked (0.1% BSA, 0.1% Triton X-100 in 1×PBS) at room temperature for 1 hour. The retinas were treated with a CD31 blood-vessel staining antibody (CD31, Cell Signaling, 1:100) overnight at 4° C. The next day, the retinas were washed with 1×PBS and then stained with a secondary antibody (Alexa Fluor 594-anti rabbit antibody, 1:500) overnight at 4° C. The next day, the retinas were washed with 1×PBS, and then mounted. Blood vessel staining was analyzed under a fluorescence microscope (Zen, Axio Zoom). Analysis was performed using Zen software.

Figure 4:
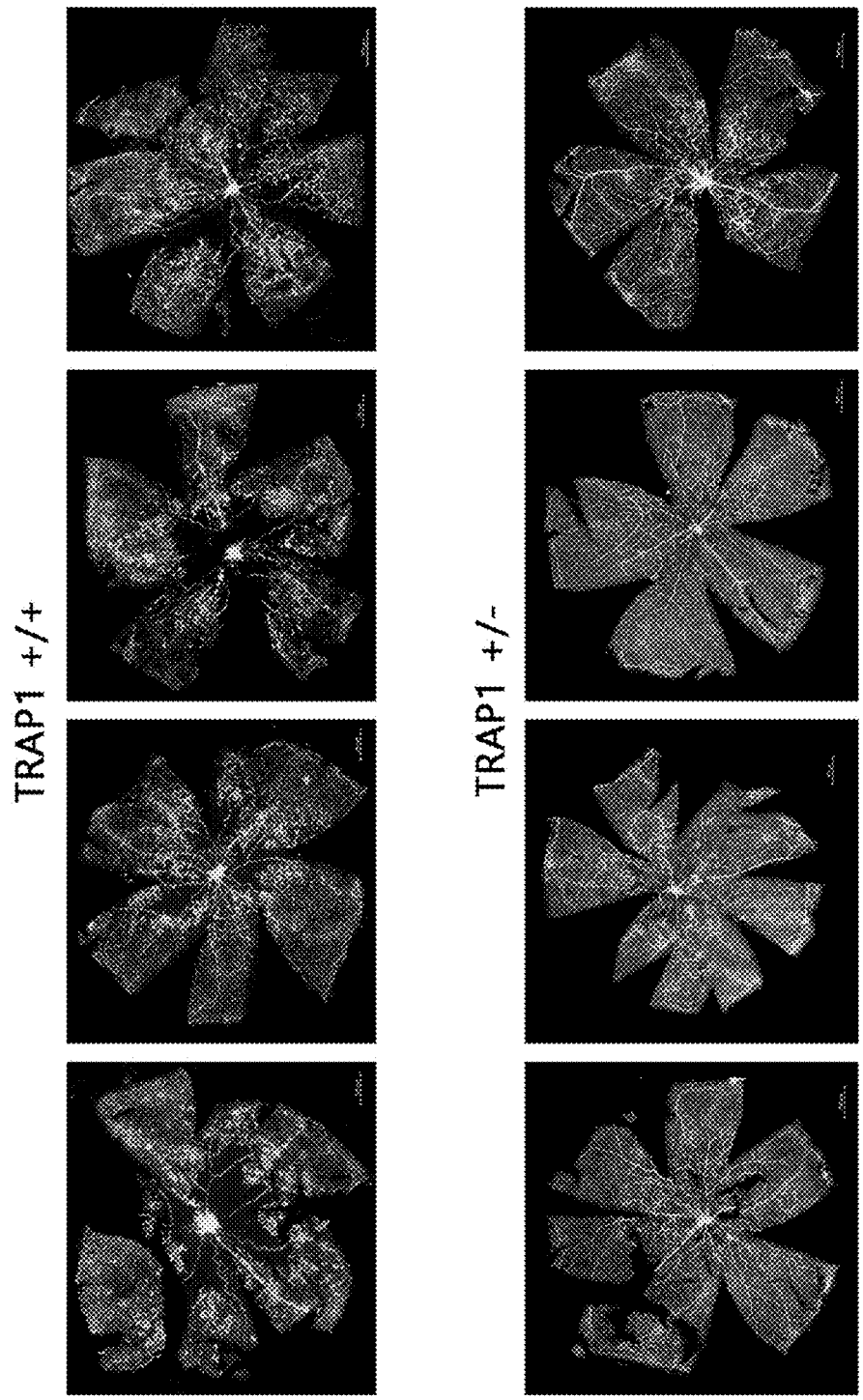
FIG. 4 is a set of retinal angiograms of an oxygen-induced retinopathy model prepared with TRAP-1+/+ mice and TRAP1+/− mice.
Figure 5:
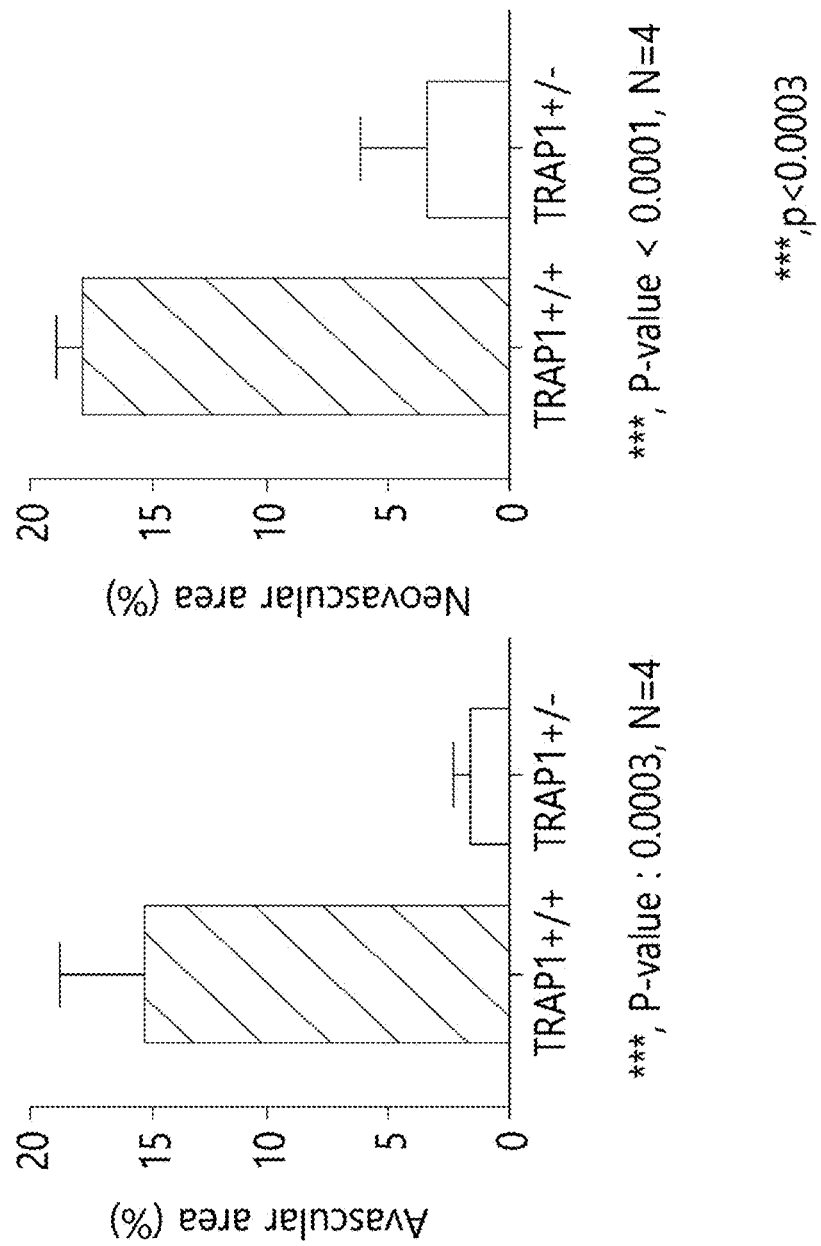
FIG. 5 is a set of results of statistically processing the set of retinal angiograms of the oxygen-induced retinopathy model prepared with TRAP1+/+ mice and TRAP-1+/− mice in FIG. 4.

As a result of retinal vascular analysis, in the TRAP-1+/+ oxygen-induced retinopathy mouse model, it was observed that the avascular area of the retina was increased and simultaneously, the neovascular area of the retina was increased, so symptoms of oxygen-induced retinopathy were clearly observed. Conversely, in the TRAP-1+/− oxygen-induced retinopathy mouse model, changes in the avascular area and neovascular area of the retina were observed to be remarkably smaller, so it could be confirmed that the oxygen-induced retinopathy was significantly improved (FIG. 4 and FIG. 5). In addition, in the TRAP1+/− oxygen-induced retinopathy mouse model, in addition to the improvement of oxygen-induced retinopathy, a phenotype different from that of wild-type mice was not observed, so it could be confirmed that there were no side effects according to suppression of the TRAP-1. In summary, it was possible to draw a conclusion that TRAP-1 is an effective and safe target for treating or preventing neovascular diseases.

Example 2.3. Suppression of TRAP-1 Suppresses Production of Neovascularization Factors It was previously mentioned that TRAP-1 is both a parent moderator of HIF-1α and a parent moderator of neovascularization factors such as VEGF (FIG. 2). Since diabetic retinopathy is a typical retinal neovascular disease, suppression of TRAP-1 suppresses neovascularization factors and will also treat diabetic retinopathy.

A tube formation assay was performed to verify that TRAP-1 is a parent moderator of neovascularization factors.

Muller cells (MIO-M1) were cultured at 37° C. and 5% $CO_2$, and DMEM-low glucose (Sigma) including 10% fetal bovine serum and 1% penicillin & streptomycin was used as the medium. A hypoxic chamber was maintained at 37° C., 5% $CO_2$ and 1% $O_2$. TRAP1 was knocked down from Muller cells using siRNA. After changing the media, conditioned media were made by culturing the cells in a 1% $O_2$ environment for 24 hours and stored at −86° C. A 96-well plate was coated with Matrigel, and HUVE cells and conditioned media were mixed and aliquoted. After the cells were cultured in a 37° C. incubator for 4 hours, a tube formation was analyzed. Images were captured using a Bio Image Navigator microscope and analyzed by the Image J program.

Figure 6:
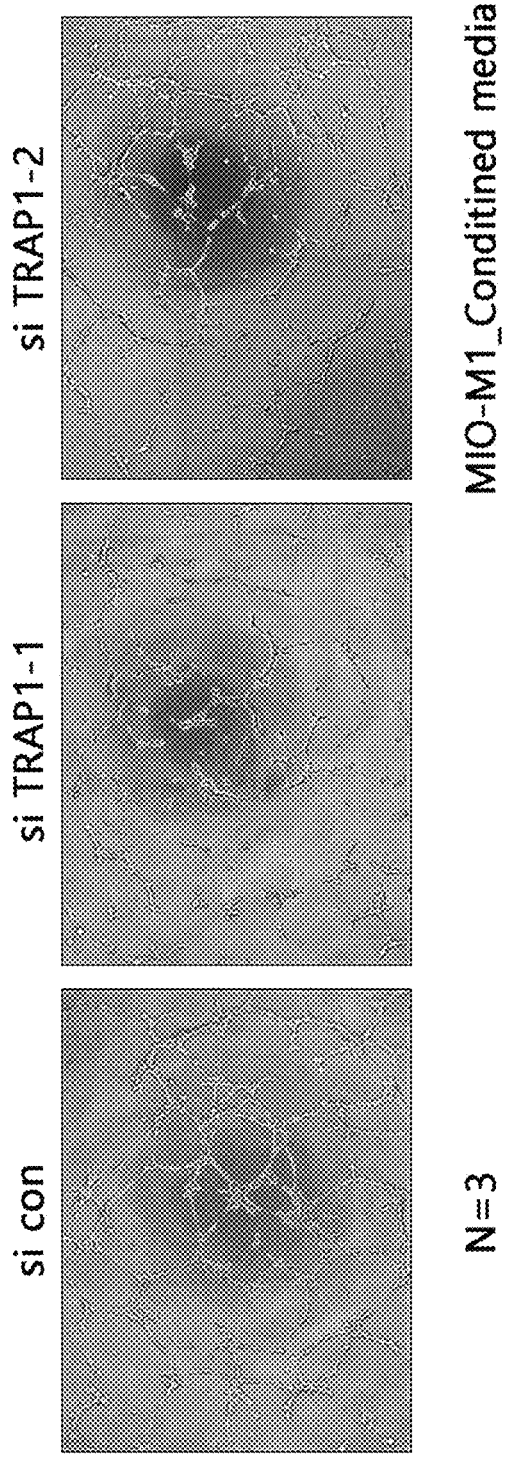
FIG. 6 illustrates the results of tube formation assay for cells in which TRAP-1 is knocked down.
Figure 7:
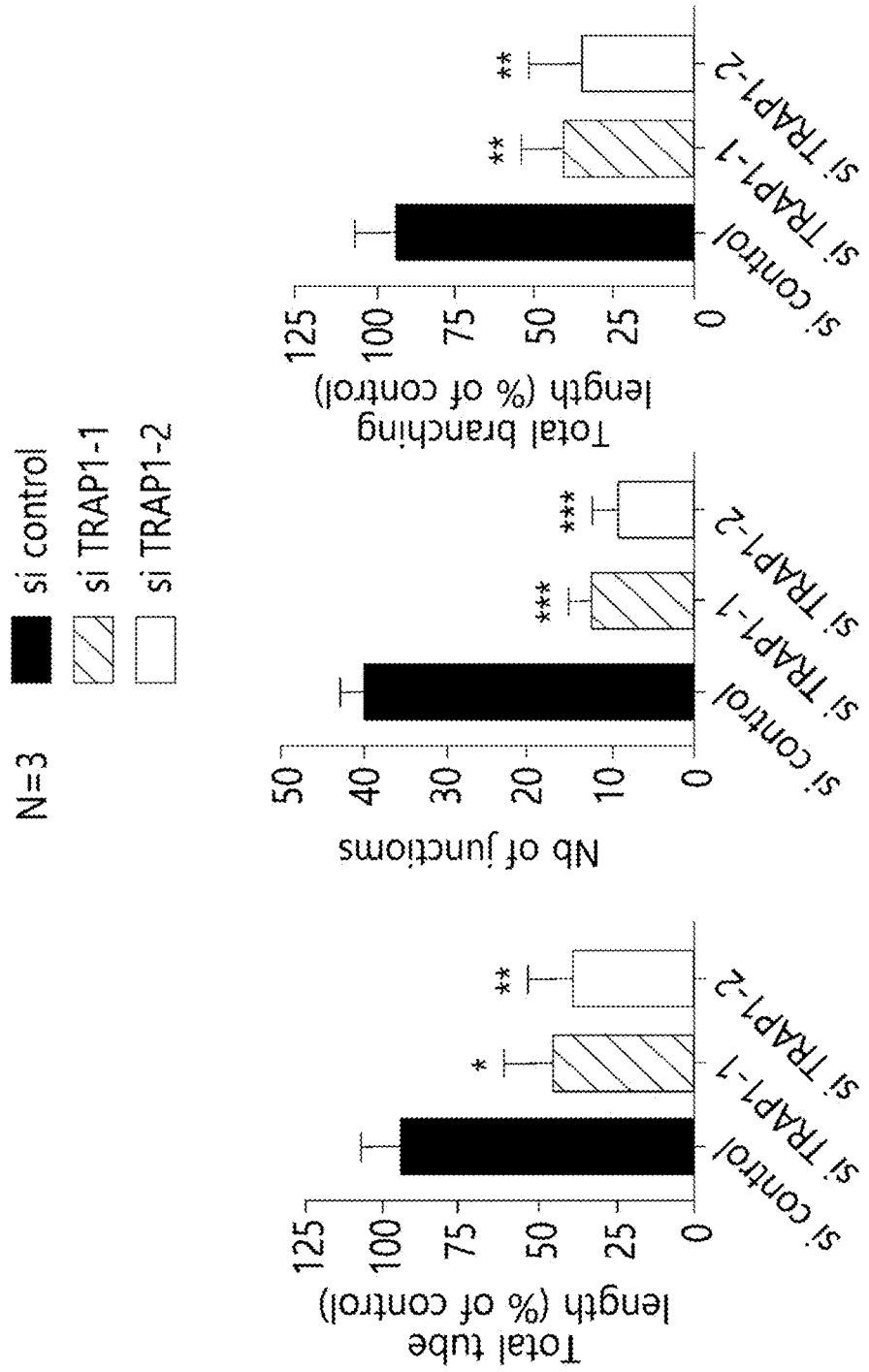
FIG. 7 is a set of results of statistically processing the tube formation assay results by FIG. 6.

As a result of the tube formation assay (FIG. 6 and FIG. 7), it could be confirmed that the tube length, the number of branches, and the intersections were reduced, and thus, neovascularization was suppressed in a group using conditioned media made from Muller cells in which TRAP1 was knocked down.

Example 3. SMx Molecules have Ability to Suppress TRAP-1

Example 3.1. Materials Used in the Experiment and Sources

In order to carry out the experiment, an SMx molecule with the following structural formula was obtained. The SMx molecule was purchased from MedchemExpress (CAS No. 845959-50-4).

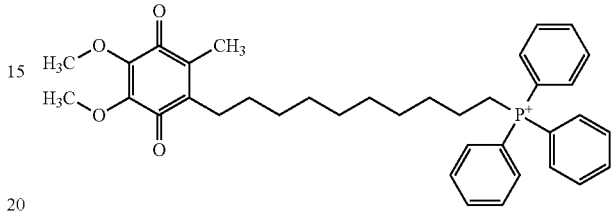

Further, for comparison with SMx, PU-H71, which is an N-terminal domain inhibitor of hsp90s, and gamitrinib, which was previously developed by the inventor, were obtained. PU-H71 was obtained through Tocris and gamitrinib was obtained through LEGOCHEM BIOSCIENCES, Inc.

Example 3.2. Binding Structure of TRAP-1 and SMx

Figure 12:
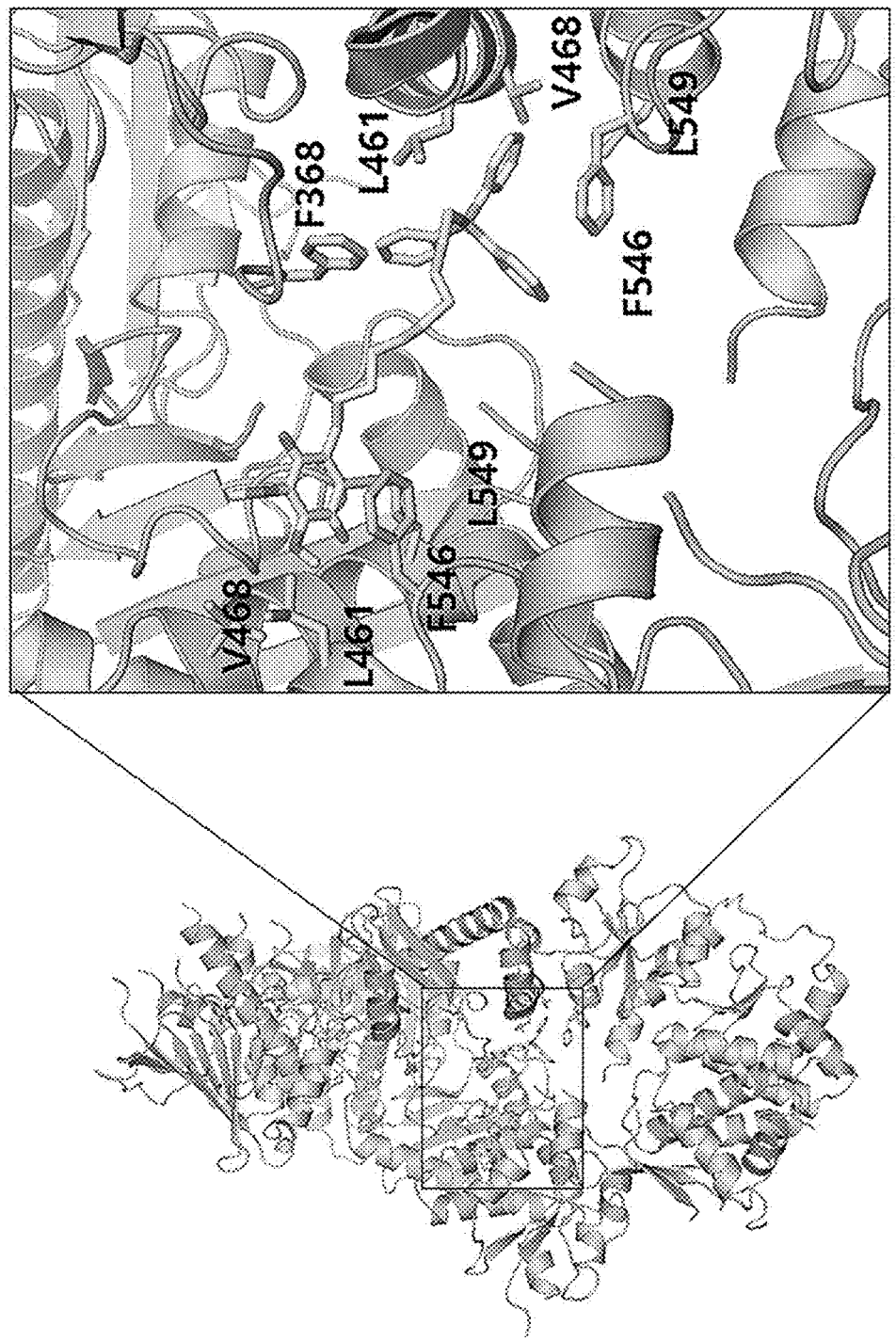
FIG. 12 illustrates the results of analyzing X-ray crystallography of the binding structure of TRAP-1 and SMx.

X-ray diffraction (XRD) measurements were performed on the binding structure of TRAP-1 and SMx in order to confirm a position to which SMx binds on TRAP-1. As TRAP-1, TRAP-1 of zebrafish was used. The results of observing the binding structure of TRAP-1 and SMx are shown in FIG. 12. On the right side of FIG. 12, the major amino acid residues involved in the binding to SMx on TRAP-1 are shown. In order to understand the functions of the residues, the interspecies conservation of the corresponding residues was analyzed. As a result of the analysis, it could be predicted that the corresponding residues would play an important role in the function of TRAP-1 as sites with extremely high interspecies conservation (FIG. 13).

To better understand their role, the above binding structure was compared and analyzed with the structure of Hsp90, which is a homolog of TRAP-1. From previous papers, the binding structure of Hsp90 and CDK4, which is a client protein thereof, was derived [11]. As a result of comparative analysis of both structures, it could be confirmed by structural comparison that the binding position of SMx on TRAP-1 coincided with the binding position of the client protein on Hsp90. The corresponding position is a residue belonging to the middle domain of TRAP-1, and it could be predicted that SMx would bind to TRAP-1 competitively with the client protein (FIG. 11).

Example 3.3. SMx Binds to TRAP-1 Competitively with Client Protein

Figure 14:
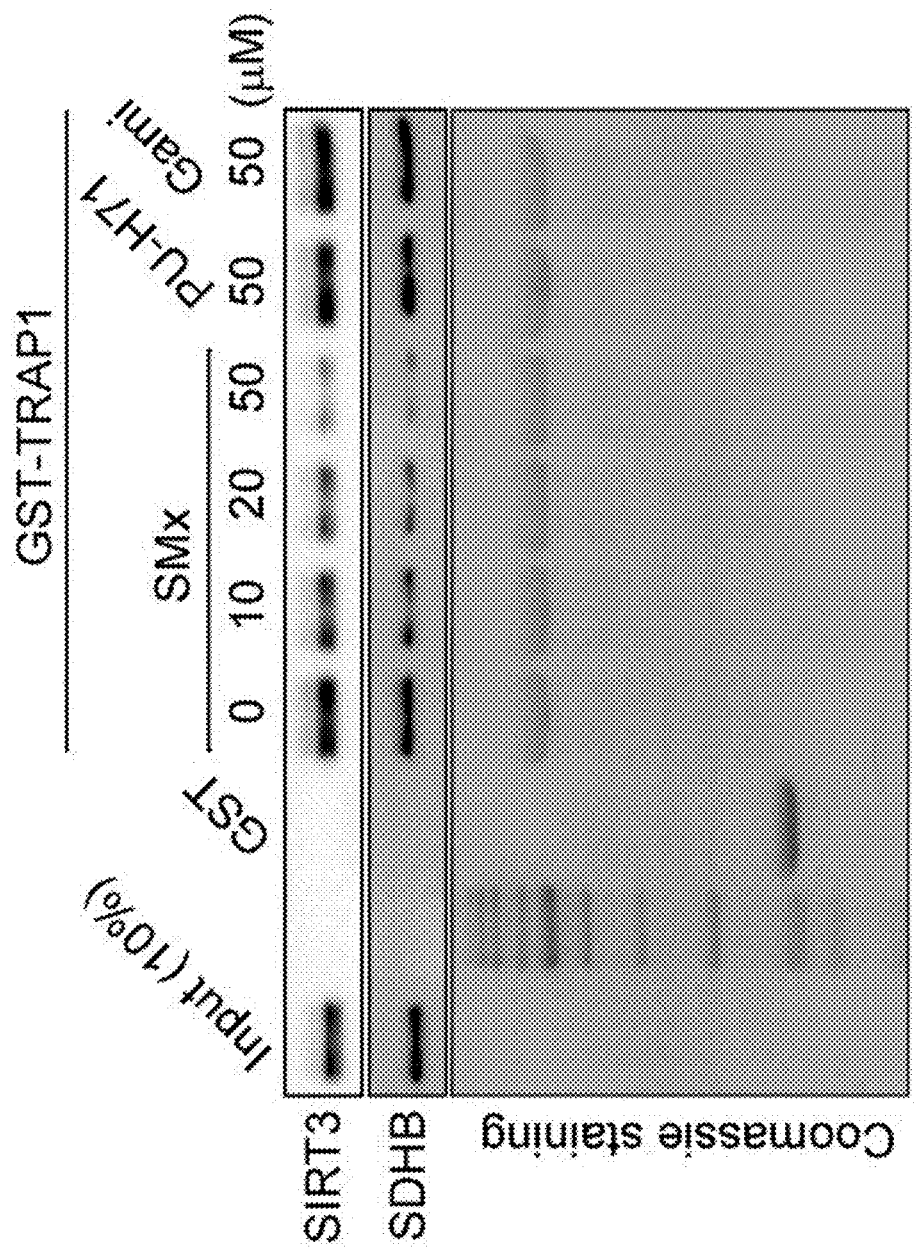
FIG. 14 illustrates the results of a full-down assay for verifying that SMx competitively binds to the client protein.

A pull-down assay was performed to confirm whether SMx competitively binds to SIRT3 and SDHB, which are known as client proteins of TRAP-1. TRAP1 protein in the GST fusion form was purified from bacteria cells and then bound to glutathione beads to make a TRAP1-bead form, and then the TRAP1-bead form was bound to the mitochondria isolated from mammalian cells (Thermo Scientific mitochondria isolation kit) with a drug at 4° C. for 18 hours. The cells were treated with SMx, and gamitrinib and PU-H71, which are previously developed N-terminal domain inhibitors of hsp90s, as the drugs, according to the concentrations shown in the drawing. As a result of pull-down assay (FIG. 14), it was confirmed that the binding of the client protein was significantly reduced depending on the concentration of SMx. This is strong evidence that SMx has the ability to bind to the middle domain of TRAP-1. This is supported by the fact that the expression of SIRT3 and SDHB was not significantly changed in the results of treatment with gamitrinib and PU-H71.

Figure 15:
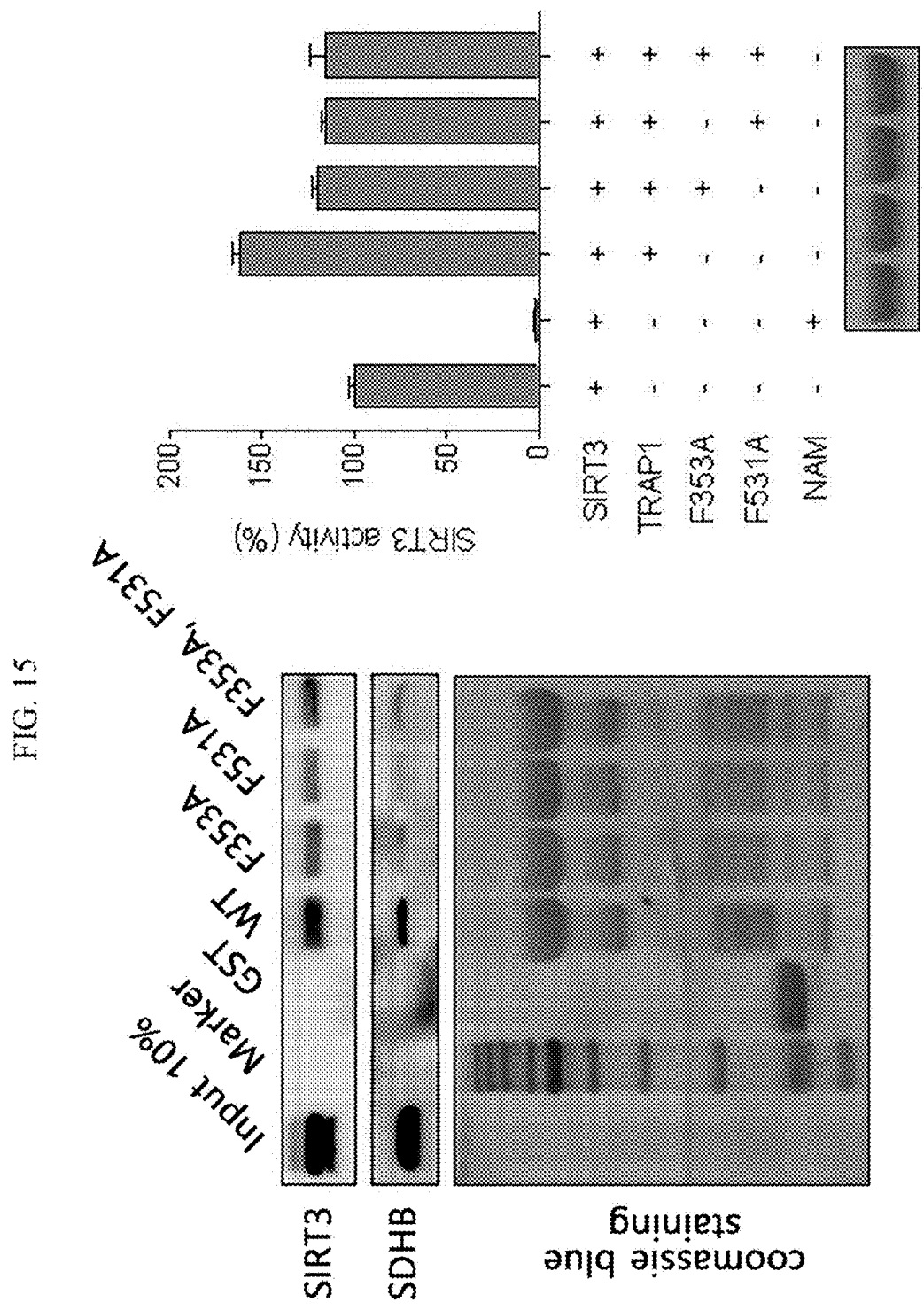
FIG. 15 is a set of experimental results for confirming that the position involved in binding to SMx on TRAP-1 is the same as the position involved in binding to the client protein on TRAP-1. The left side is a result of a full-down assay performed after the corresponding position is modified, and the right side is a result of an SIRT3 activity experiment performed after the corresponding position is modified.

In addition, after a TRAP1 mutant-bead form of the mutants in which the binding moiety of SMx on the TRAP-1 confirmed in Example 2.2 was modified was prepared, a pull-down assay was performed (FIG. 15, left side). As a result of the experiment, it was observed that the mutants in which the corresponding position was modified could not bind properly to the client protein. This cross-validates that the position where SMx binds to TRAP-1 is the same as the site where TRAP-1 binds to the client protein.

Example 3.4. SMx Reduce Expression of Neovascularization Factors

Muller cells (MIO-M1) were cultured at 37° C. and 5% $CO_2$, and DMEM-low glucose (Sigma) including 10% fetal bovine serum and 1% penicillin & streptomycin was used as the medium. A hypoxic chamber was maintained at 37° C., 5% $CO_2$ and 1% $O_2$. Muller cells (MIO-M1) were seeded in the number of $4 \times 10^5$ on a 60-millimeter plate and cultured in 3 ml of the medium for 24 hours. The next day, the cells were treated with SMx, a mitochondrial heat shock protein 90 (TRAP1) inhibitor, and gamitrinib and PU-H71, which are previously developed N-terminal domain inhibitors of hsp90s, according to the concentrations shown in the drawing, and cultured in a hypoxic chamber for 24 hours. Whole cell lysates were made from the cultured cells, electrophoresed, transferred to a PVDF membrane, and then treated with a primary antibody at 4° C. for 18 hours. The next day, the whole cell lysates were treated with a secondary antibody for 1 hour and protein expression was analyzed using a western blotting detection reagent.

Figure 8:
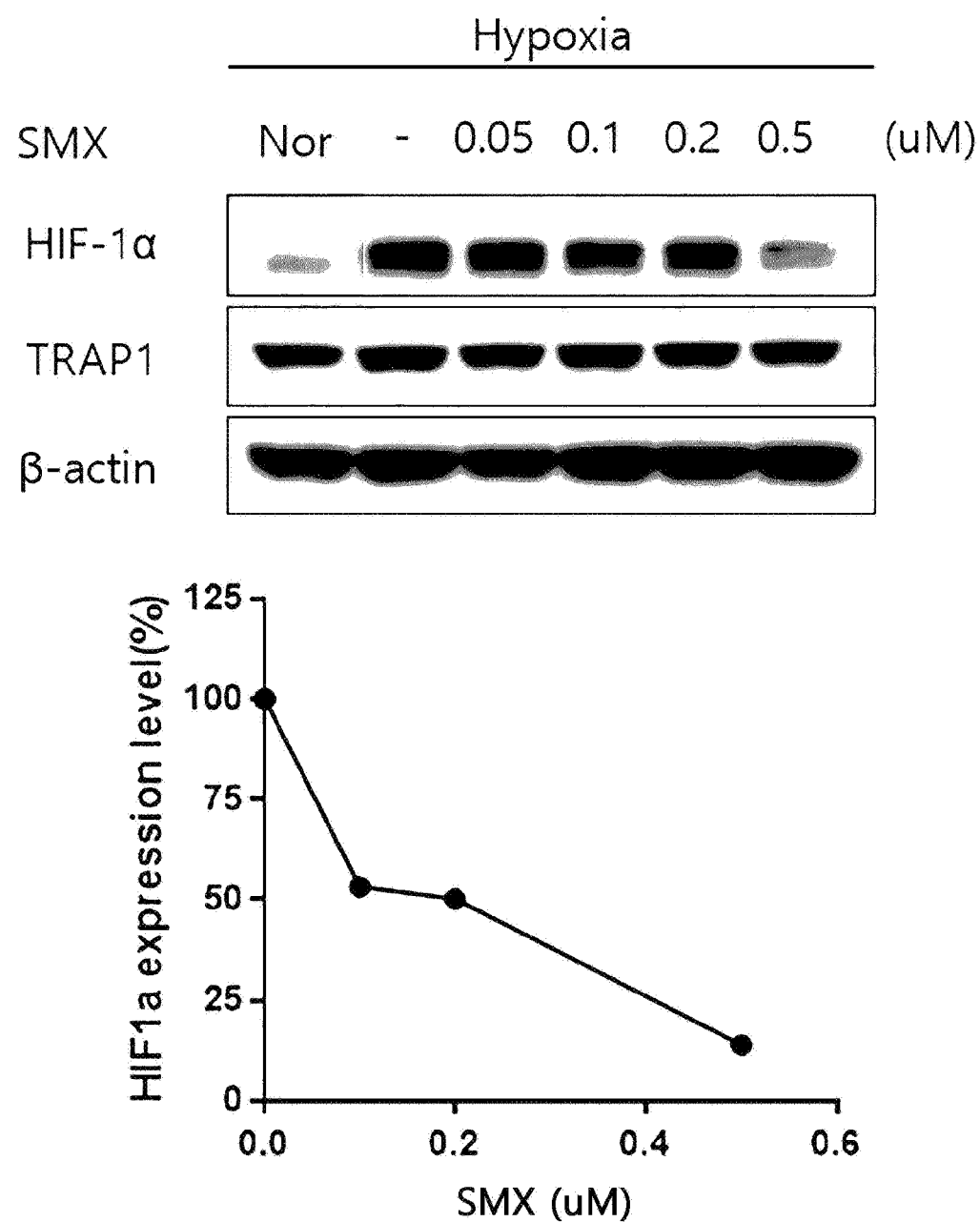
FIG. 8 illustrates the results of western blot of confirming the change in expression of HIF-1 according to the concentration of SMx.
Figure 9:
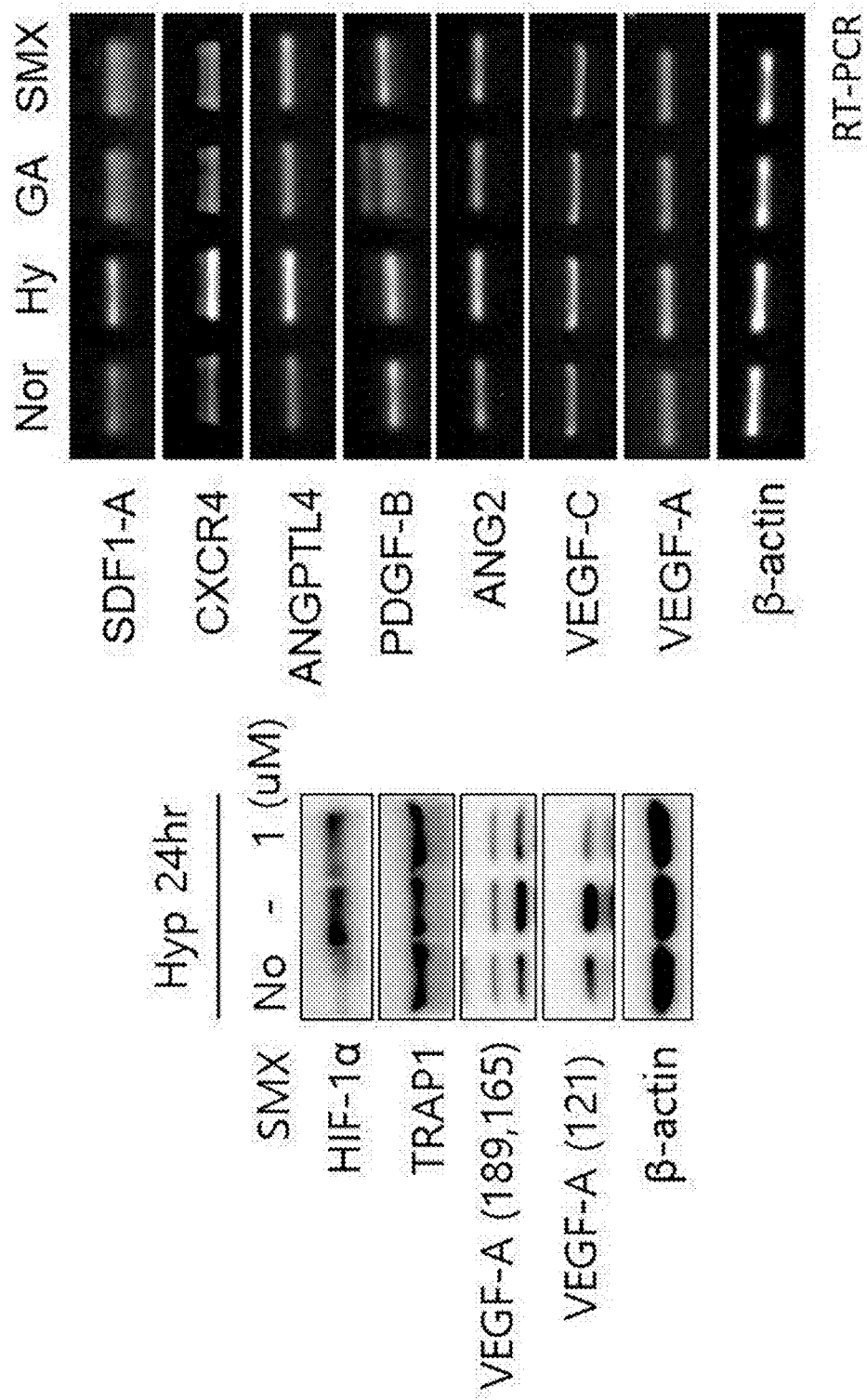
FIG. 9 illustrates the results of western blot of confirming the change in expression of neovascularization factors when HIF-1α SMx is treated.

In addition, as a result of western blot and a quantitative polymerase chain reaction, it could be confirmed that the expression (FIG. 9) of well-known neovascularization factors including HIF-1α (FIG. 8) was suppressed by SMx.

Example 3.5. SMx Suppresses TRAP1 with a Novel Mechanism that is Different from that of Existing hsp90s Inhibitor From the results of Example 3.3, it could be confirmed that SMx successfully suppressed the function of TRAP-1. Subsequently, in order to verify that SMx suppresses TRAP-1 by a novel mechanism different from that of the existing hsp90s inhibitor, ATPase activity assay was performed by treating TRAP-1 with each of SMx and PU-H71.

Existing hsp90s inhibitors (gamitrinib, PU-H71) have the characteristics of binding to the N-terminal domain of hsp90s, which functions as an ATPase, and thus have the characteristics of reducing the ATPase activity of TRAP-1. However, since the N-terminal domain of hsp90s has a very high homology between paralogs, there is a problem in that these inhibitors non-selectively suppress hsp90s. The problems that may occur when hsp90s are non-selectively suppressed are previously mentioned in '4. Treatment of neovascular disease by suppressing TRAP-1'.

Therefore, when SMx can suppress TRAP-1 without binding to the N-terminal domain of TRAP-1 as previously mentioned, it will be possible to innovatively solve the problems of the existing hsp90s. Furthermore, this will be verified by measuring the ATPase activity of TRAP-1 after treatment with SMx.

ATPase activity was measured by measuring the release of inorganic phosphates through the PiColorLock Gold Phosphate Detection Kit (Innova Biosciences) according to the manufacturer's manual. TRAP1 (0.5 μM) was cultured with 0.2 mM ATP in 100 mM Tris, 20 mM KCl, and 6 mM $MgCl_2$ under the conditions of pH 7.0 and 37° C. for 3 hours. Thereafter, the PiColorLock Gold reagent and an accelerator (100:1) were added to a 100 μL ATP hydrolyzate sample. After culturing at 25° C. for 5 minutes, the change in color was stopped by adding 10 μL of a stop solution thereto, and the absorbance at 620 nm was measured by SYNERGY NEO microplate reader (BioTek Instruments).

For inhibitory ability analysis, TRAP-1 was cultured with a predetermined concentration (0.520 μM) of inhibitor for 30 minutes and then stirred with ATP. Absorbance values were normalized to a DMSO control and data was expressed as % ATPase activity.

Figure 16:
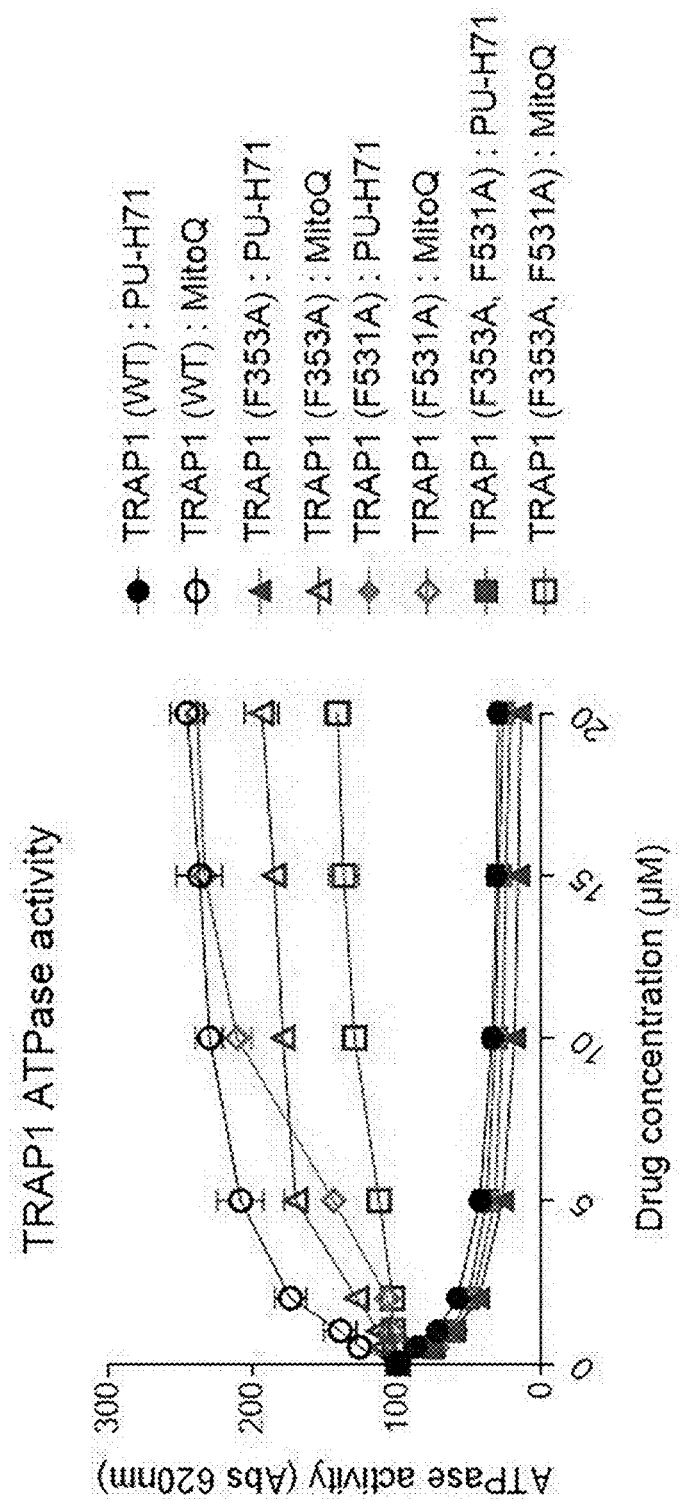
FIG. 16 illustrates the results of an ATPase activity assay for wild-type and mutant TRAP-1 treated with SMx and PU-H71.

As a result of the ATPase activity assay, it was observed that when TRAP-1 was treated with PU-H71, the ATPase activity of TRAP-1 was significantly decreased according to the concentration, whereas when TRAP1 was treated with SMx, the ATPase activity of TRAP-1 was significantly increased according to the concentration (FIG. 16). This indicates that SMx does not bind to the N-terminal domain of TRAP1, and strongly indicates that SMx simultaneously promotes the binding of ATP by binding to the binding position of the client protein.

Example 4. SMx Molecules have Therapeutic Efficacy for Neovascular Ocular Diseases An oxygen-induced retinopathy mouse model was induced by rearing young C57BL/6J (Hyochang Science Inc.) mice aged 7 days after birth (P7) in a hyperoxic chamber (Coy Lab. in vivo chamber, 75% $O_2$) for 5 days (P12), and then rearing the mice in a normoxic environment for 5 days (P17). After the young mice were removed from the hyperoxic chamber (P12), 1 ul of SMx was intraocularly injected once at a concentration of 0.15 mM (0.1% DMSO). The SMx used for ocular injection was used after being diluted in phosphate buffer saline (1×PBS) to 0.1%, and 0.1% DMSO in 1×pbs was used in control mice. In the case of Eylea (Aflibercept, anti-VEGFab), which is known to have therapeutic efficacy for diabetic retinopathy in the related art, 40 ug was diluted in 1 ul and 1 ul was intraocularly injected.

The oxygen-induced retinopathy mouse model was formed, and then perfused with 1×PBS and 4% PFA. After mouse eyes were extracted and fixed in 4% PFA, the retinas were isolated. The isolated retinas were washed with 1×PBS, and then blocked (0.1% BSA, 0.1% Triton X-100 in 1×PBS) at room temperature for 1 hour. The retinas were treated with a CD31 blood-vessel staining antibody (CD31, Cell Signaling, 1:100) overnight at 4° C. The next day, the retinas were washed with 1×PBS and then stained with a secondary antibody (Alexa Fluor 594-anti rabbit antibody, 1:500) overnight at 4° C. The next day, the retinas were washed with 1×PBS, and then mounted. Blood vessel staining was analyzed under a fluorescence microscope (Zen, Axio Zoom). Analysis was performed using Zen software.

As a result of retinal vascular analysis of control mice, Eylea-injected mice, and SMx-injected mice (FIG. 17), first, the neovascular area of the SMx-injected mouse retina was reduced to the same level as that of the Eylea-injected mouse retina, so it could be confirmed that SMx had therapeutic efficacy for diabetic retinopathy. Furthermore, exceptionally, it was confirmed that the avascular area of the SMx-injected mouse retina was significantly reduced compared to the Eylea-injected mouse retina, and through this, it could be confirmed that SMx has effects of normalizing the vascularization pattern of the retina, unlike Eylea.

Example 5. Molecule of Present Application is Small Molecule which can be Administered by Oral Cavity/Eye Drops Existing therapeutic agents for diabetic retinopathy are antibody drugs against VEGF and are less invasive to tissues due to their large molecular weights, thus only prescription by eye injection was possible. Since SMx and the novel compound molecules according to the present application were considered to be significantly improved in terms of delivery as a small molecule drug, eye drops were administered to the mouse model.

An oxygen-induced retinopathy mouse model was induced by rearing young C57BL/6J (Hyochang Science Inc.) mice aged 7 days after birth (P7) in a hyperoxic chamber (Coy Lab. in vivo chamber, 75% $O_2$) for 5 days (P12), and then rearing the mice in a normoxic environment for 5 days (P17).

An oxygen-induced retinopathy mouse model was induced by rearing young C57BL/6J (Hyochang Science Inc.) mice aged 7 days after birth (P7) in a hyperoxic chamber (Coy Lab. in vivo chamber, 75% $O_2$) for 5 days (P12), and then rearing the mice in a normoxic environment for 5 days (P17). SMx was diluted with Liposic (solvent) to 1 mM during P12 to P17 (5 days), which is the period of time when oxygen-induced retinopathy is induced from normal oxygen, and then administered by eye drops 3 times a day. The right eye was administered SMx, and the left eye was administered the control Liposic.

The oxygen-induced retinopathy mouse model was formed, and then perfused with 1×PBS and 4% PFA. After mouse eyes were extracted and fixed in 4% PFA, the retinas were isolated. The isolated retinas were washed with 1×PBS, and then blocked (0.1% BSA, 0.1% Triton X-100 in 1×PBS) at room temperature for 1 hour. The retinas were treated with a CD31 blood-vessel staining antibody (CD31, Cell Signaling, 1:100) overnight at 4° C. The next day, the retinas were washed with 1×PBS and then stained with a secondary antibody (Alexa Fluor 594-anti rabbit antibody, 1:500) overnight at 4° C. The next day, the retinas were washed with 1×PBS, and then mounted. Blood vessel staining was analyzed under a fluorescence microscope (Zen, Axio Zoom). Analysis was performed using Zen software.

Figure 18:
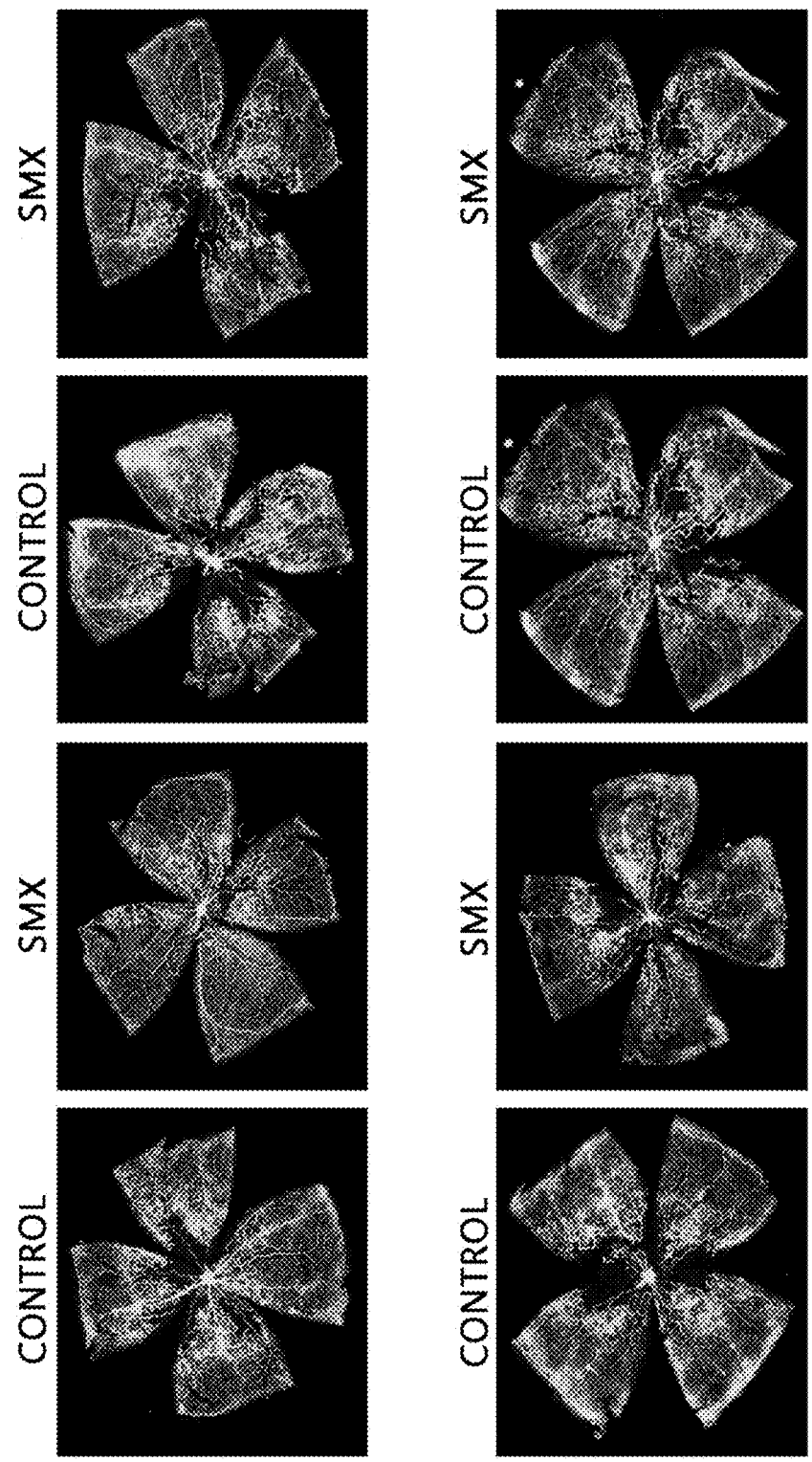
FIG. 18 is a set of retinal blood vessel analysis photographs of an oxygen-induced retinopathy mouse model in which SMx is administered by eye drops.
Figure 19:
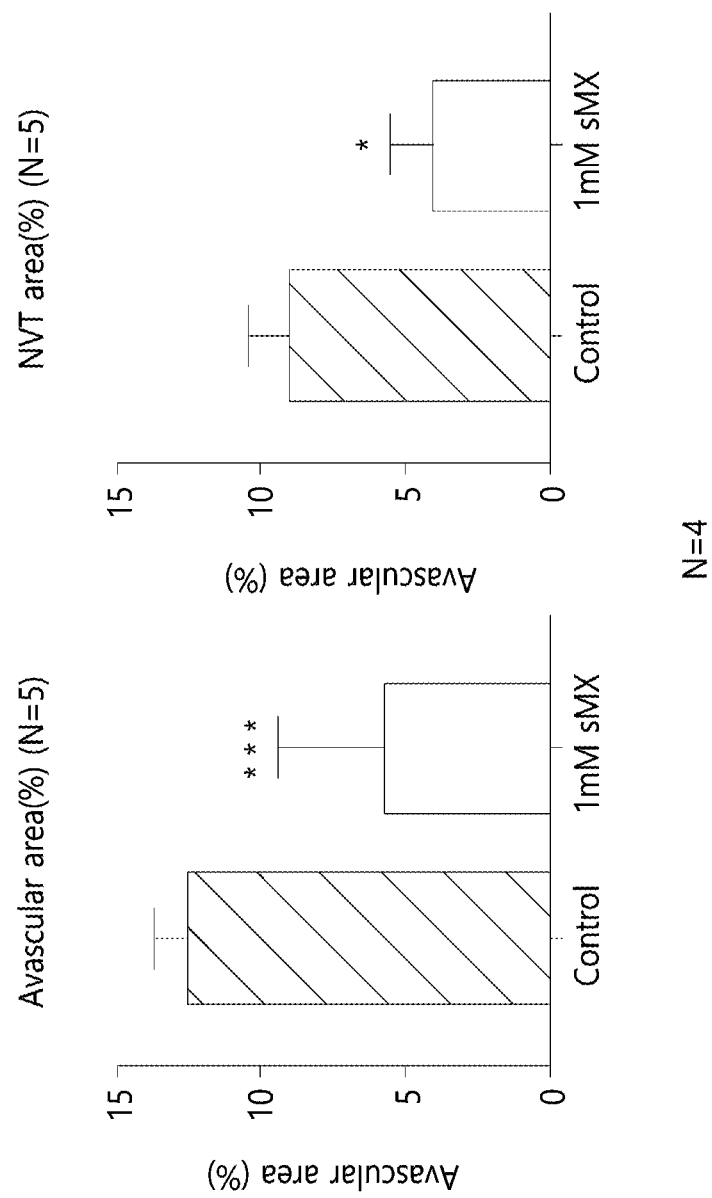
FIG. 19 is a set of results of statistically processing retinal blood vessel analysis photographs of an oxygen-induced retinopathy mouse model in which SMx is administered by eye drops.

The photographs and program analysis results obtained by retinal vascular analysis after eye drop administration are shown in FIG. 18 and FIG. 19. SMx was instilled into the right eye of each individual, and the left eye was not administered SMx and used as a control. As a result, it was confirmed that the neovascular area and the avascular area were significantly reduced in the SMx-injected eye, and thus, the retinal neovascular disease was improved.

Example 6. Methods for Synthesizing Novel Compounds of Present Application

Provided is methods for preparing novel molecules represented by [Chemical Formula 2] to [Chemical Formula 5] of the present application.

The method for preparing the compound is not limited to the specific examples described below, and the compound may be produced using a method widely known to those skilled in the art.

Example 6.1. Method for Preparing (10-(2-Bromo-5-Hydroxy-3,4-Dimethoxy-6-Methylphenyl)Decyl) Triphenylphosphonium Formate (SB-U009)

Figure 20:
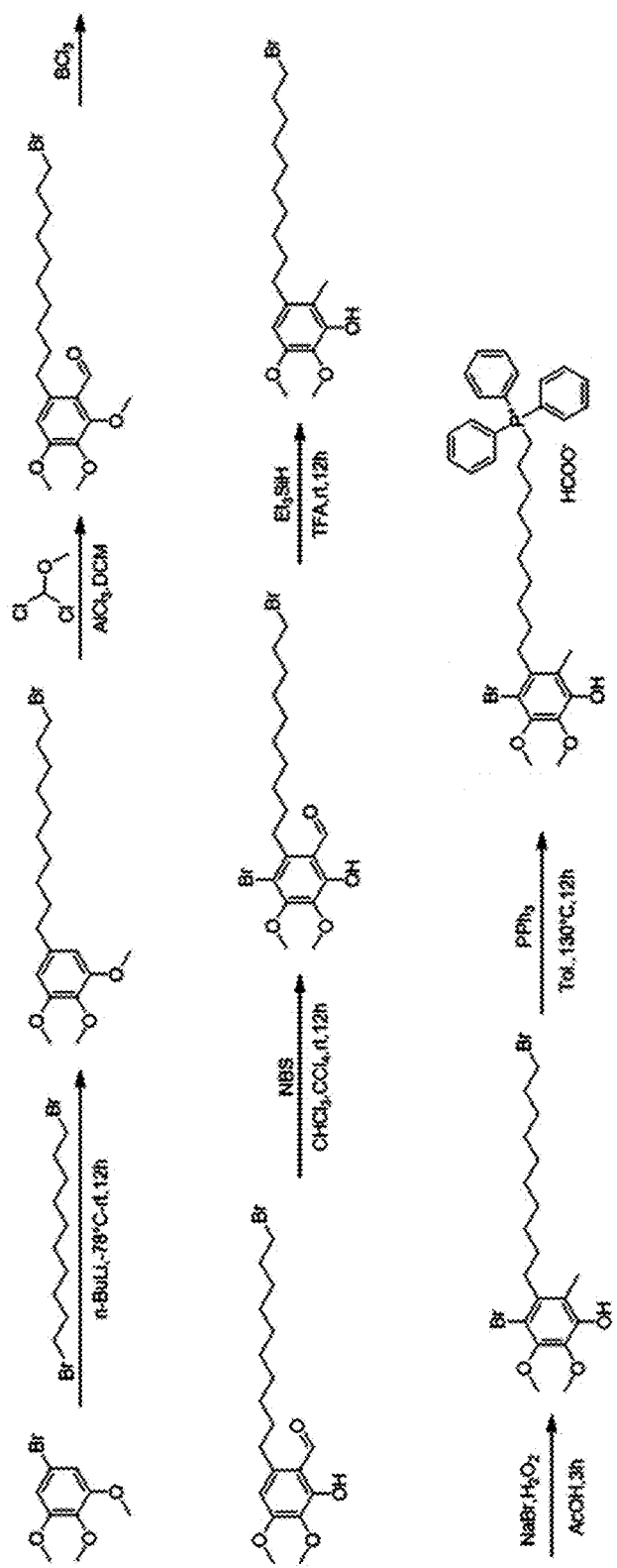
FIG. 20 is a schematic view illustrating steps of preparing (10-(2-bromo-5-hydroxy-3,4-dimethoxy-6-methylphenyl)decyl)triphenylphosphonium formate.

In the present application, the method for preparing the compound represented by [Chemical Formula 3] will be described (FIG. 20). The method for preparing the compound of Chemical Formula 3 includes the following preparation steps 1 to 7.

Step 1. Preparation of 5-(10-bromodecyl)-1,2,3-trimethoxy-benzene n-Butyllithium (n-BuLi, 2.5 M, 2.10 mL, 1 eq) was added dropwise to a solution of 5-bromo-1,2,3-trimethoxy-benzene dissolved in tetrahydrofuran (THF, 20 mL) at −78° C.

After the addition, the mixture was stirred at the same temperature for 1 hour, and then a solution of 1,10-dibromodecane (3.16 g, 10.52 mmol, 2 eq) in THF (10 mL) was added dropwise at −78° C., and then the resulting mixture was stirred at 20° C. for 11 hours.

It was confirmed by a liquid chromatography mass spectrometer (LCMS) that 50.6% of a desired mass was detected.

A residue was diluted with saturated $NH_4Cl$ (10 mL) and extracted with EtOAc (50 mL×3).

The combined organic layers were dried over [$Na_2SO_4$], filtered, and then concentrated under reduced pressure to obtain a residue.

The residue was purified by column chromatography ($SiO_2$, petroleum ether/ethyl acetate=100/0 to 95/5) to obtain a compound, 5-(10-bromodecyl)-1,2,3-trimethoxy-benzene (580 mg, 1.02 mmol, yield 19.35%, purity 68%), as a colorless oil.

$^1$H NMR (400 MHz, $CDCl_3$) δ=6.40 (s, 2H), 3.86 (s, 6H), 3.83 (s, 3H), 3.42 (t, J=6.8 Hz, 2H), 2.59-2.52 (m, 2H), 1.86 (quin, J=7.2 Hz, 2H), 1.60 (br d, J=5.5 Hz, 2H), 1.48-1.38 (m, 2H), 1.38-1.26 (m, 10H)

The mass of the obtained compound ($C_{19}H_{31}BrO_3$) was measured by mass spectrometry-electrospray ionization (MS-ESI), and 387.4; m/z found, 387.1[M+H]$^+$ was confirmed.

Step 2. Preparation of 6-(10-bromodecyl)-2,3,4-trimethoxy-benzaldehyde

A solution of 5-(10-bromodecyl)-1,2,3-trimethoxy-benzene (580 mg, 1.02 mmol, 1 eq) dissolved in anhydrous dichloromethane (dry $CH_2Cl_2$, 2 mL) was added dropwise to dry $CH_2Cl_2$ (8 mL) of $AlCl_3$ at 0° C.

The mixture was stirred at the same temperature for 45 minutes, a dry $CH_2Cl_2$ (2 mL) solution of dichloro(methoxy) methane (188.97 mg, 1.64 mmol, 145.36 uL, 1.61 eq, yield 68%) was gradually added dropwise for 10 minutes, and the mixture was stirred at 0° C. for 5 minutes.

At this time, it was confirmed by LCMS that the reaction was completed.

The reaction mixture was poured into 30 mL of ice water, a dichloromethane (methylene chloride) phase was separated, and then the aqueous phase was extracted twice using dichloromethane (methylene chloride, 50 mL).

The combined organic layers were dried over [$Na_2SO_4$], filtered, and then concentrated under reduced pressure to obtain a residue.

The crude product was used in the next step without further purification.

A compound, 6-(10-bromodecyl)-2,3,4-trimethoxy-benzaldehyde (510 mg, 858.27 umol, yield 84.29%, purity 69.9%), as a colorless oil was obtained.

$^1$H NMR (400 MHz, $CDCl_3$) δ=10.41 (s, 1H), 6.53 (s, 1H), 4.00 (s, 3H), 3.95 (s, 3H), 3.89 (s, 3H), 3.43 (t, J=6.9 Hz, 2H), 2.99-2.92 (m, 2H), 1.93-1.82 (m, 2H), 1.49-1.39 (m, 4H), 1.32 (br s, 10H)

The mass of the obtained compound ($C_{20}H_{31}BrO_4$) was measured by mass spectrometry-electrospray ionization (MS-ESI), and 415.4; m/z found, 415.1 [M+H]+ was confirmed.

Step 3. Preparation of 6-(10-bromodecyl)-2-hydroxy-3,4-dimethoxy-benzaldehyde Boron chloride ($BCl_3$, 1 M, 1.9 mL, 2.21 eq) was added dropwise to a solution of 6-(10-bromodecyl)-2,3,4-trimethoxy-benzaldehyde (510.00 mg, 858.27 umol, 1 eq, purity 69.9%) dissolved in $CH_2Cl_2$ (10 mL) at 0° C.

The mixture was stirred at 0° C. for 30 minutes, and then stirred at 20° C. for 30 minutes.

At this time, it was confirmed by LCMS that the reaction was completed.

The residue was poured into ice water (30 mL) and extracted using $CH_2Cl_2$ (50 mL×3).

The combined organic layers were dried over [$Na_2SO_4$], filtered, and then concentrated under reduced pressure to obtain a residue.

The residue was purified using column chromatography ($SiO_2$, petroleum ether/ethyl acetate=100/0 to 95/5) to obtain a compound, 6-(10-bromodecyl)-2-hydroxy-3,4-dimethoxy-benzaldehyde (300 mg, 583.06 umol, yield 67.93%, purity 78%), as a colorless oil.

The mass of the obtained compound ($C_{19}H_{29}BrO_4$) was measured by mass spectrometry-electrospray ionization (MS-ESI), and 401.3; m/z found, 401.1 [M+H]+ was confirmed.

$^1$H NMR (400 MHz, $CDCl_3$) δ=12.30-12.20 (m, 1H), 10.24-10.03 (m, 1H), 6.34 (s, 1H), 3.96 (s, 3H), 3.89 (s, 3H), 3.43 (t, J=6.9 Hz, 2H), 2.90-2.83 (m, 2H), 1.88 (quin, J=7.1 Hz, 2H), 1.70-1.60 (m, 2H), 1.50-1.38 (m, 3H), 1.49-1.29 (m, 1H).

Step 4. Preparation of 3-bromo-2-(10-bromodecyl)-6-hydroxy-4,5-dimethoxy-benzaldehyde A solution of 6-(10-bromodecyl)-2-hydroxy-3,4-dimethoxy-benzaldehyde (250 mg, 622.92 umol, 1 eq) dissolved in chloroform ($CHCl_3$, 2.5 mL) and carbon tetrachloride ($CCl_4$, 2.5 mL) was added to N-bromosuccinimide (133.04 mg, 747.51 umol, 1.2 eq) at 0° C.

The mixture was stirred at 0° C. for 1 hour, and then stirred at 20° C. for 11 hours.

At this time, it was confirmed by LCMS that the reaction was completed.

The mixture was extracted using sodium hydrogen carbonate ($NaHCO_3$, 10 mL) and ethyl acetate (EtOAc, 20 mL×3).

The combined organic layers were dried over [$Na_2SO_4$], filtered, and then concentrated under reduced pressure to obtain a residue.

The residue was purified by prep-TLC ($SiO_2$, petroleum ether/ethyl acetate=4:1) to obtain a compound, 3-bromo-2-(10-bromodecyl)-6-hydroxy-4,5-dimethoxy-benzaldehyde (200 mg, 307.77 umol, yield 49.41%, purity 73.9%), as a yellow oil.

The mass of the obtained compound ($C_{19}H_{28}Br_2O_4$) was measured by mass spectrometry-electrospray ionization (MS-ESI), and 480.2; m/z found, 481.0 [M+H]+ was confirmed.

Step 5. Preparation of 5-(10-bromodecyl)-2,3-dimethoxy-6-methyl-phenol

3-Bromo-2-(10-bromodecyl)-6-hydroxy-4,5-dimethoxy-benzaldehyde (190 mg, 292.38 umol, 1 eq, purity 73.9%) and triethylsilane (TES, $Et_3SiH$, 169.99 mg, 1.46 mmol, 233.50 uL, 5 eq) dissolved in $CH_2Cl_2$ (4 mL) were added dropwise to trifluoroacetic acid (TFA, 708.40 mg, 6.21 mmol, 460 uL, 21.25 eq) through an addition funnel for 5 minutes at 0° C.

The reaction mixture was stirred at 0° C. for 2 hours.

At this time, it was confirmed by LCMS that the reaction was completed.

The mixture was slowly poured into saturated sodium hydrogen carbonate ($NaHCO_3$, 50 mL) and then extracted using 100 mL of $CH_2Cl_2$ (100 mL×3).

The combined organic layers were dried over [$Na_2SO_4$], filtered, and then concentrated under reduced pressure to obtain a residue.

The residue was purified using prep-TLC ($SiO_2$, petroleum ether:ethyl acetate=4:1) to obtain a compound, 5-(10-bromodecyl)-2,3-hydroxy-6-methyl-phenol (130 mg, 241.64 umol, yield 82.65%, purity 72%), as a colorless oil.

Step 6. Preparation of 4-bromo-5-(10-bromodecyl)-2,3-dimethoxy-6-methyl-phenol After a solution of 5-(10-bromodecyl)-2,3-dimethoxy-6-methyl-phenol (130 mg, 241.64 umol, 1 eq, purity 72%) and sodium bromide (NaBr, 37.29 mg, 362.46 umol, 11.65 uL, 1.5 eq), which was dissolved in acetic acid (AcOH, 5 mL) and stirred, was added to hydrogen peroxide ($H_2O_2$, 41.09 mg, 362.46 umol, 34.82 uL, purity 30%, 1.5 eq), the resulting mixture was stirred at 20° C. for 3 hours.

At this time, it was confirmed by LCMS that the reaction was completed.

The residue was diluted with 30 mL of saturated $NaHCO_3/Na_2S_2O_3$ in a ratio of 10:1, and then extracted using EtOAc (30 mL×3).

The mixed organic layer was washed with brine (10 mL), then dried over [$Na_2SO_4$], filtered, and then concentrated under reduced pressure to obtain a residue.

The crude product was used in the next step without further purification.

Through this, a compound, 4-bromo-5-(10-bromodecyl)-2,3-dimethoxy-6-methyl-phenol (140 mg, 195.18 umol, yield 80.77%, purity 65%), as a yellow oil was obtained.

The mass of the obtained compound ($C_{19}H_{30}Br_2O_3$) was measured by mass spectrometry-electrospray ionization (MS-ESI), and 466.3; m/z found, 466.9 [M+H]+ was confirmed.

¹H NMR (400 MHz, CDCl₃) δ=5.73 (s, 1H), 3.86 (s, 3H), 3.78 (s, 3H), 3.34 (t, J=6.9 Hz, 2H), 2.71-2.64 (m, 2H), 2.14 (s, 3H), 1.84-1.76 (m, 2H), 1.37 (br d, J=4.1 Hz, 7H), 1.24 (br s, 7H)

Step 7. Preparation of (10-(2-bromo-5-hydroxy-3,4-dimethoxy-6-methylphenyl)decyl)triphenylphosphonium formate A stirred solution of 4-bromo-5-(10-bromodecyl)-2,3-dimethoxy-6-methyl-phenol (140 mg, 195.18 umol, 1 eq, purity 65%) and triphenylphosphine (PPh₃, 255.96 mg, 975.88 umol, 5 eq) dissolved in toluene (2 mL) was heated at 125° C. under N2 for 8 hours.

At this time, it was confirmed by LCMS that the reaction was completed.

A residue was obtained by removing the solvent in vacuo.

The residue was purified using column chromatography (SiO₂, petroleum ether/ethyl acetate=100/0 to 0/100; ethyl acetate:MeOH=100/0 to 92/8).

The residue was purified using prep-HPLC (FA conditions; column: Xtimate C18 100*30 mm*3 um; mobile phase: [water (0.225% FA)-ACN]; B %: 40%-70%, 8 minutes).

A compound, (10-(2-bromo-5-hydroxy-3,4-dimethoxy-6-methylphenyl)decyl)triphenylphosphonium formate (6 mg, 8.61 umol, yield 4.41%, purity 99.54%), as a colorless gum was obtained.

The mass of the obtained compound ($C_{37}H_{45}BrO_3P^+$) was measured by mass spectrometry-electrospray ionization (MS-ESI), and 648.6; m/z found, 649.2 [M+H]+ was confirmed.

¹H NMR (400 MHz, CDCl₃) δ=8.56 (br s, 1.309H), 7.78-7.59 (m, 15H), 3.84 (s, 3H), 3.76 (s, 3H), 3.44 (br s, 2H), 2.70-2.59 (m, 2H), 2.13 (s, 3H), 1.50 (br s, 4H), 1.40-1.12 (m, 12H)

³¹P NMR (162 MHz, CDCl₃) δ=24.17 (s, 1P)

Example 6.2. Method for Preparing (10-(3-bromo-6-hydroxy-4,5-dimethoxy-2-methylphenyl)decyl)triphenylphosphonium bromide (SB-U005)

Figure 21:
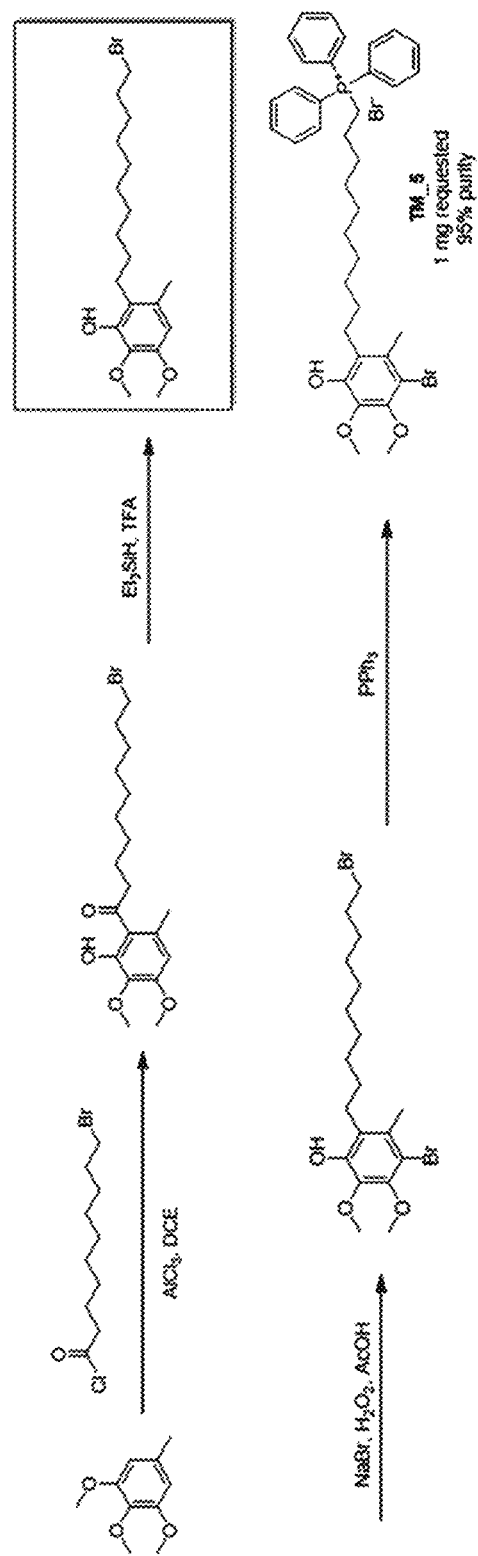
FIG. 21 is a schematic view illustrating steps of preparing (10-(3-bromo-4,5,6-trimethoxy-2-methylphenyl)decyl)triphenylphosphonium bromide.

In the present application, the method for preparing the compound represented by [Chemical Formula 2] will be described (FIG. 21). The method for preparing the compound of Chemical Formula 2 includes the following preparation steps 1 to 4.

Step 1. Preparation of 10-bromo-1-(2-hydroxy-3,4-dimethoxy-6-methyl-phenyl)decan-1-one After freshly powdered AlCl₃ (457.89 mg, 3.43 mmol) was added to a solution of 10-bromodecanoyl chloride (0.536 g, 1.89 mmol) and 1,2,3-trimethoxy-5-methyl-benzene (312.86 mg, 1.72 mmol) under dry DCE (10 mL), the resulting mixture was stirred at 25° C. for 40 hours.

At this time, it was confirmed through LCMS that a desired material was produced as a main component.

The mixture was poured into ice water and extracted using CH₂CL₂ (50 mL×2).

The mixed extract was washed with water, then dried using Na₂SO₄, and concentrated to obtain an oil. The obtained oil was purified by column chromatography (SiO₂, 10:0 to 10:1 petroleum ether/EtOAc) to obtain a colorless oil (520 mg, yield 66.56%).

The mass of the obtained compound ($C_{19}H_{29}BrO_4$) was measured by mass spectrometry-electrospray ionization (MS-ESI), and 400.12; m/z found, 402.8 [M+H]⁺ was confirmed.

¹H NMR (400 MHz, CDCl₃) δ 1.21-1.55 (m, 10H), 1.56-1.78 (m, 2H), 1.85 (m, 2H), 2.46 (s, 3H), 2.89 (t, J=7.4 Hz, 2H), 3.41 (t, J=6.8 Hz, 2H), 3.88 (d, J=12.3 Hz, 6H), 6.31 (s, 1H), 10.38 (s, 1H).

Step 2. Preparation of 2-(10-bromodecyl)-5,6-dimethoxy-3-methyl-phenol

After 10-bromo-1-(2-hydroxy-3,4-dimethoxy-6-methyl-phenyl)decan-1-one (520 mg, 1.14 mmol) was dissolved in trifluoroacetic acid (TFA, 10 mL), Et₃SiH (2 mL) was added thereto, and then the resulting mixture was stirred at 80° C. for 12 hours.

At this time, it was confirmed through LCMS that a starting ketone was consumed, and a new peak was formed.

The reaction mixture was evaporated, dried and purified by column chromatography (SiO₂, 5:0 to 5:1 petroleum ether/EtOAc) to obtain a colorless oil (410 mg, yield 82.34%).

The mass of the obtained compound ($C_{19}H_{31}BrO_3$) was measured by mass spectrometry-electrospray ionization (MS-ESI), and 386.15; m/z found, 388.9 [M+H]⁺ was confirmed.

¹H NMR (400 MHz, CDCl₃) δ 1.22-1.55 (m, 14H), 1.86 (quin, J=7.1 Hz, 2H), 2.26 (s, 3H), 2.51-2.65 (m, 2H), 3.42 (t, J=6.9 Hz, 2H), 3.86 (m, 6H), 5.82 (s, 1H), 6.29 (s, 1H).

Step 3. Preparation of 4-bromo-2-(10-bromodecyl)-5,6-dimethoxy-3-methyl-phenol

After 2-(10-bromodecyl)-5,6-dimethoxy-3-methyl-phenol (410 mg, 940.98 umol) and NaBr (145.23 mg, 1.41 mmol) were dissolved in acetic acid (AcOH, 10 mL), hydrogen peroxide (H₂O₂, 160.04 mg, 1.41 mmol, 30%) was added thereto, and then the resulting mixture was stirred at 25° C. for 2 hours.

At this time, it was confirmed through LCMS that a starting material was consumed, and one new peak was formed.

The reaction mixture was quenched in 50 mL of water and extracted using EtOAc (40 mL×2).

The mixed organic phase was washed with saturated NaHCO₃ until pH>7, then dried over Na₂SO₄, and concentrated to a colorless oil (300 mg, crude).

The mass of the obtained compound ($C_{19}H_{30}Br_2O_3$) was measured by mass spectrometry-electrospray ionization (MS-ESI), and 464.06; m/z found, 466.9 [M+H]⁺ was confirmed.

¹H NMR (400 MHz, CDCl₃) δ 1.22-1.55 (m, 14H), 1.86 (quin, J=7.1 Hz, 2H), 2.26 (s, 3H), 2.51-2.65 (m, 2H), 3.42 (t, J=6.9 Hz, 2H), 3.85 (s, 3H), 3.93 (s, 3H), 5.77 (s, 1H).

Step 4. Preparation of (10-(3-bromo-4,5,6-trimethoxy-2-methylphenyl)decyl)triphenylphosphonium bromide After 4-bromo-2-(10-bromodecyl)-5,6-dimethoxy-3-methyl-phenol (300 mg, 597.11 umol) and triphenylphosphine (PPh₃, 939.68 mg, 3.58 mmol) were dissolved in toluene (1 mL), the resulting solution was stirred at 130° C. under N2 for 18 hours.

It was confirmed through thin layer chromatography (TLC, DCM:MeOH=10:1, Rf=0.2) that one new peak was formed under OPPh$_3$.

A brown residue was obtained by evaporating the reaction mixture, and purified through Prep-HPLC (column: 3_Phenomenex Luna C18 75*30 mm*3 um; mobile phase: [water (0.2% FA)-ACN]; B %: 52% to 82%, 6 minutes).

After the residue was lyophilized, a desired product as a white solid (16 mg, yield 12.24%, purity 97.2%) was obtained.

The mass of the obtained compound ($C_{37}H_{45}BrO_3P^+$) was measured by mass spectrometry-electrospray ionization (MS-ESI), and 647.23; m/z found, 649.3 [M+H]$^+$ was confirmed.

$^1$H NMR (400 MHz, CHLOROFORM-d) δ 1.13-1.70 (m, 16H), 2.34 (s, 3H), 2.56-2.76 (m, 2H), 3.65-3.79 (m, 2H), 3.68-3.77 (m, 1H), 3.83 (s, 3H), 3.88 (s, 3H), 7.61-7.93 (m, 15H), 8.76 (s, 1H); $^{31}$P NMR (162 MHz, CHLOROFORM-d) δ 24.47 (s, 1 P).

Example 6.3. Method for Preparing (10-(2-bromo-3,4,5-trimethoxy-6-methylphenyl)decyl)triphenylphosphonium bromide (SB-U012)

Figure 22:
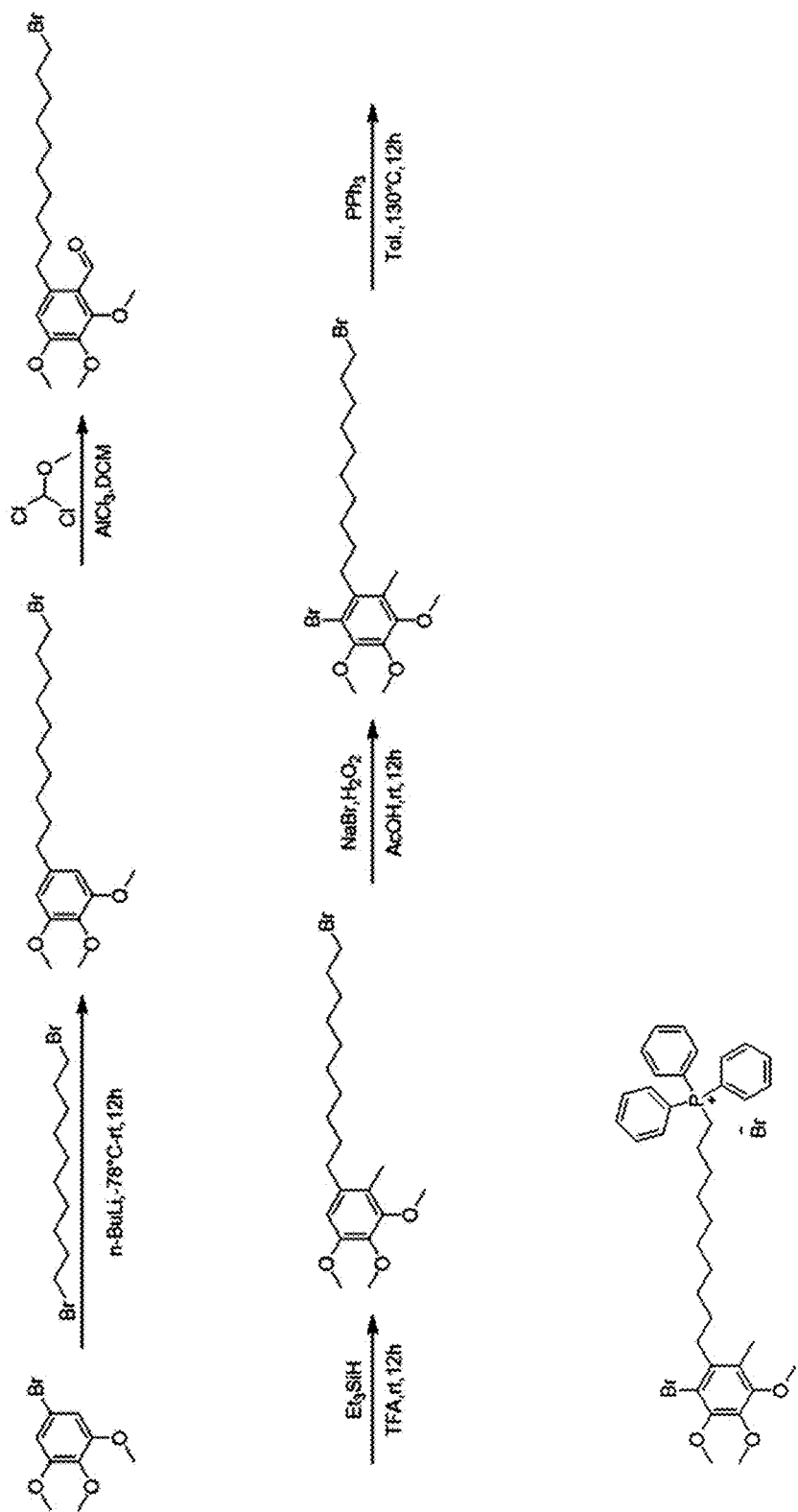
FIG. 22 is a schematic view illustrating steps of preparing (10-(2-bromo-3,4,5-trimethoxy-6-methylphenyl)decyl)triphenylphosphonium bromide.

In the present application, the method for preparing the compound represented by [Chemical Formula 5] will be described (FIG. 22). The method for preparing the compound of Chemical Formula 5 includes the following preparation steps 1 to 5.

Step 1. Preparation of 5-(10-bromodecyl)-1,2,3-trimethoxy-benzene

A solution of 5-bromo-1,2,3-trimethoxy-benzene (2 g, 8.09 mmol, 1 eq) dissolved in THF (30 mL) was added dropwise to n-BuLi (2.5 M, 3.24 mL, 1 eq) at −78° C.

After the addition, the mixture was stirred at the same temperature for 1 hour, a solution of 1,10-dibromodecane (4.86 g, 16.19 mmol, 2 eq) dissolved in THF (10 mL) was added dropwise thereto at 78° C.

The produced mixture was stirred at 20° C. for 11 hours.

At this time, it was confirmed through LCMS that 20% of a desired mass was detected.

A residue was diluted with saturated NH$_4$Cl (10 mL), and extracted with EtOAc (50 mL×3).

The combined organic layers were dried over [Na$_2$SO$_4$], filtered, and then concentrated under reduced pressure to obtain a residue.

The residue was purified using column chromatography (SiO$_2$, petroleum ether/ethyl acetate=100/0 to 95/5) to obtain a compound, 5-(10-bromodecyl)-1,2,3-trimethoxy-benzene (430 mg, 395.86 umol, yield 4.89%, purity 35.66%), as a colorless oil.

The mass of the obtained compound ($C_{19}H31BrO_3$) was measured by mass spectrometry-electrospray ionization (MS-ESI), and 387.4; m/z found, 389.1[M+H]$^+$ was confirmed.

Step 2. Preparation of 6-(10-bromodecyl)-2,3,4-trimethoxy-benzaldehyde

A solution of 5-(10-bromodecyl)-1,2,3-trimethoxy-benzene (430 mg, 395.86 umol, 1 eq, 35.66% purity) dissolved in anhydrous dichloromethane (dry CH$_2$Cl$_2$, 2 mL) was added dropwise to dry CH$_2$Cl$_2$ (6 mL) of AlCl$_3$ (178 mg, 1.33 mmol, 72.95 uL, 3.37 eq) at 0° C.

After the addition, the mixture was stirred at the same temperature for 45 minutes, a dry CH$_2$Cl$_2$ (2 mL) solution of dichloro(methoxy)methane (140 mg, 1.22 mmol, 107.69 uL, 3.08 eq) was gradually added dropwise thereto for 10 minutes.

The reaction mixture was poured into 30 mL ice water, a methylene chloride phase was separated, and then the aqueous phase was extracted twice using methylene chloride (50 mL×2).

The combined organic layers were dried over [Na$_2$SO$_4$], filtered, and then concentrated under reduced pressure to obtain a residue.

The crude product was used in the next step without further purification.

A compound of a colorless oil 6-(10-bromodecyl)-2,3,4-trimethoxy-benzaldehyde (410 mg, 384.97 umol, yield 97.25%, purity 39%) was obtained.

The mass of the obtained compound ($C_{20}H_{31}BrO_4$) was measured by mass spectrometry-electrospray ionization (MS-ESI), and 415.4; m/z found, 415.2[M+H]$^+$ was confirmed.

Step 3. Preparation of 1-(10-bromodecyl)-3,4,5-trimethoxy-2-methyl-benzene

TFA (3 mL) was added to a mixture of 6-(10-bromodecyl)-2,3,4-trimethoxy-benzaldehyde (410 mg, 384.97 umol, 1 eq, purity 39%) and Et$_3$SiH (447.64 mg, 3.85 mmol, 614.89 uL, 10 eq).

The mixture was stirred at 20° C. for 12 hours.

At this time, it was confirmed by LCMS that the reaction was completed.

The mixture was slowly poured into saturated NaHCO$_3$ (50 mL), and extracted using CH$_2$Cl$_2$ (50 mL×3).

The mixture organic layer was dried over [Na$_2$SO$_4$], filtered, and then concentrated under reduced pressure to obtain a residue.

The residue was purified by prep-TLC (SiO$_2$, petroleum ether/ethyl acetate=4:1) to obtain a compound, 1-(10-bromodecyl)-3,4,5-trimethoxy-2-methyl-benzene (120 mg, 152.18 umol, yield 39.53%, purity 50.9%), as a colorless oil.

The mass of the obtained compound ($C_{20}H_{33}BrO_3$) was measured by mass spectrometry-electrospray ionization (MS-ESI), and 401.4; m/z found, 402.8[M+H]$^+$ was confirmed.

Step 4. Preparation of 1-bromo-2-(10-bromodecyl)-4,5,6-trimethoxy-3-methyl-benzene H$_2$O$_2$ (17.25 mg, 152.18 umol, 14.62 uL, purity 30%, 1 eq) was added to a stirred solution of 1-(10-bromodecyl)-3,4,5-trimethoxy-2-methyl-benzene (120 mg, 152.18 umol, 1 eq, purity 50.9%) and NaBr (15.66 mg, 152.18 umol, 4.89 uL, 1 eq) dissolved in AcOH (4 mL), and the resulting mixture was stirred at 20° C. for 12 hours.

At this time, it was confirmed by LCMS that the reaction was completed.

A residue was diluted with 30 mL of saturated NaHCO$_3$: Na$_2$S$_2$O$_3$=10:1, and extracted using EtOAc (30 mL×3).

The combined organic layers were washed with brine (10 mL), dried over [Na$_2$SO$_4$], filtered, and then concentrated under reduced pressure to obtain a residue.

The crude product was used in the next step without further purification.

A compound, 1-bromo-2-(10-bromodecyl)-4,5,6-trimethoxy-3-methyl-benzene (130 mg, crude), as a yellow oil was obtained.

The mass of the obtained compound ($C_{20}H_{32}Br_2O_3$) was measured by mass spectrometry-electrospray ionization (MS-ESI), and 480.3; m/z found, 480.9[M+H]$^+$ was confirmed.

Step 5. Preparation of 1-bromo-2-(10-BLAHdecyl)-4,5,6-trimethoxy-3-methyl-benzene A stirred solution of 1-bromo-2-(10-bromodecyl)-4,5,6-trimethoxy-3-methyl-benzene (130 mg, 162.41 umol, 1 eq, purity 60%) and PPh3 (212.99 mg, 812.04 umol, 5 eq) dissolved in toluene (2 mL) was heated at 125° C. under N2 for 12 hours.

At this time, it was confirmed by LCMS that the reaction was completed.

The solvent were removed under reduced pressure to obtain a residue.

The residue was purified by column chromatography (SiO2, Petroleum ether/Ethyl acetate=100/0~0/100; Ethyl acetate:MeOH=100/0~92/8) to obtain a compound, 1-bromo-2-(10-BLAHdecyl)-4,5,6-trimethoxy-3-methyl-benzene (30 mg, 39.69 umol, yield 24.44%, purity 98.234%) as a colorless oil.

The mass of the obtained compound ($C_{38}H_{47}BrO_3P^+$) was measured by mass spectrometry-electrospray ionization (MS-ESI), and 662.7; m/z found, 663.2[M+H]$^+$ was confirmed.

$^1$H NMR (400 MHz, CDCl$_3$) δ=7.93-7.66 (m, 15H), 3.94-3.78 (m, 11H), 2.78-2.67 (m, 2H), 2.22 (s, 3H), 1.64 (br s, 4H), 1.50-1.34 (m, 4H), 1.25 (br d, J=10.1 Hz, 8H).

$^{31}$P NMR (162 MHz, CDCl$_3$) δ=24.54 (s, 1P).

Example 6.4. Method for Preparing (10-(3-bromo-4,5,6-trimethoxy-2-methylphenyl)decyl)triphenylphosphonium bromide (SB-U011)

Figure 23:
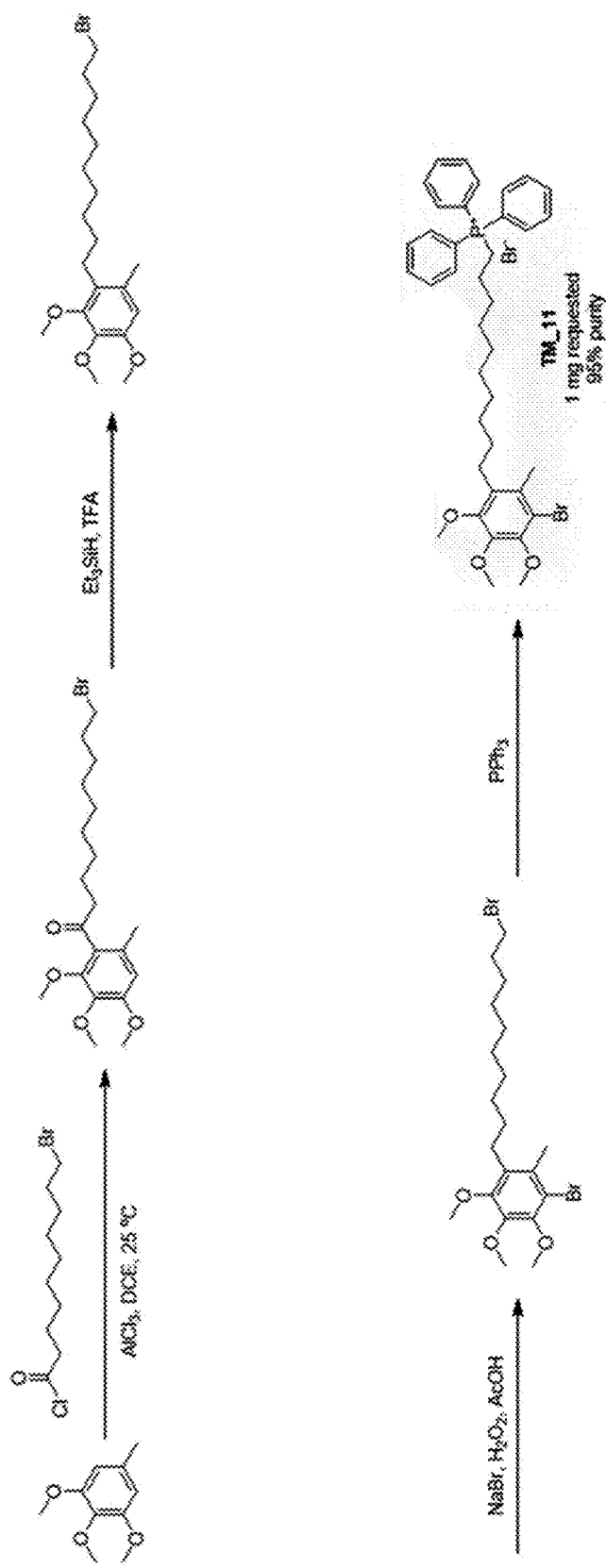
FIG. 23 is a schematic view illustrating steps of preparing (10-(3-bromo-4,5,6-trimethoxy-2-methylphenyl)decyl)triphenylphosphonium bromide.

In the present application, the method for preparing the compound represented by [Chemical Formula 4] will be described (FIG. 23). The method for preparing the compound of Chemical Formula 4 includes the following preparation steps 1 to 4.

Step 1. Preparation of 10-bromo-1-(2,3,4-trimethoxy-6-methyl-phenyl)decan-1-one After AlCl$_3$ (206.41 mg, 1.55 mmol) was added to a stirred solution of 4-bromo-1,2,3-trimethoxy-5-methyl-benzene (449.11 mg, 1.72 mmol) and 0-bromodecanoyl chloride (536.94 mg, 1.89 mmol) dissolved in DCE (10 mL), the resulting mixture was stirred at 25° C. for 18 hours.

At this time, it was confirmed by LCMS that the reaction was completed.

It was confirmed through TLC (petroleum ether: EtOAc=3:1, Rf=0.4) that one new major spot was formed.

The reaction mixture was poured into 30 mL of ice water, and the aqueous phase was extracted using DCM (30 mL×3), dried over [Na$_2$SO$_4$], and then concentrated under reduced pressure. The yellow oil was obtained.

The yellow oil was purified by flash column chromatography on silica gel (0 to 100% EtOAc in petroleum ether, 30 minutes) to obtain a colorless oil (215 mg, yield 29.1%).

The mass of the obtained compound ($C_{20}H_{31}BrO_4$) was measured by mass spectrometry-electrospray ionization (MS-ESI), and 414.14; m/z found, 416.8 [M+H]$^+$ was confirmed.

$^1$H NMR (400 MHz, CDCl$_3$) δ 1.32 (m, 8H), 1.38-1.49 (m, 2H), 1.67 (m, 2H), 1.86 (quin, J=7.2 Hz, 2H), 2.19 (s, 3H), 2.75 (t, J=7.4 Hz, 2H), 3.41 (t, J=6.9 Hz, 2H), 3.77-3.92 (m, 9H), 6.48 (s, 1H).

Step 2. Preparation of 4-(10-bromodecyl)-1,2,3-trimethoxy-5-methyl-benzene

After Et3SiH (1.46 g, 12.52 mmol, 2 mL) was added to a stirred solution of 10-bromo-1-(2,3,4-trimethoxy-6-methyl-phenyl)decan-1-one (210 mg, 455.03° C. umol) dissolved in TFA (10 mL) at 25° C., the resulting mixture was stirred at 80° C. for 2 hours.

At this time, it was confirmed by LCMS that a desired product was produced as a major component.

It was confirmed by TLC (petroleum ether:EtOAc=4:1, Rf=0.45) that one new major spot was formed.

The reaction mixture was evaporated and dried under vacuum to obtain a colorless oil, and the colorless oil was further purified using flash column chromatography on silica gel (25 g, 0-50% EtOAc in petroleum ether, 30 minutes) to obtain a desired product, 4-(10-bromodecyl)-1,2,3-trimethoxy-5-methyl-benzene (118 mg, 250.93 umol, yield 55.15%), as a colorless oil.

The mass of the obtained compound ($C_{20}H_{33}BrO_3$) was measured by mass spectrometry-electrospray ionization (MS-ESI), and 400.16; m/z found, 403.0 [M+H]$^+$ was confirmed.

$^1$H NMR (400 MHz, CDCl$_3$) δ 1.20-1.54 (m, 14H), 1.77-1.96 (m, 2H), 2.27 (s, 3H), 2.46-2.64 (m, 2H), 3.42 (t, J=6.8 Hz, 2H), 3.76-3.97 (m, 9H), 6.49 (s, 1H).

Step 3. Preparation of 1-bromo-5-(10-bromodecyl)-2,3,4-trimethoxy-6-methyl-benzene H$_2$O$_2$ (42.68 mg, 376.39 umol) was added dropwise to a solution of 4-(10-bromodecyl)-1,2,3-trimethoxy-5-methyl-benzene (118 mg, 250.93 umol) and NaBr (38.73 mg, 376.39 umol) dissolved in AcOH (5 mL), and was stirred at 25° C. for 1 hour.

At this time, it was confirmed by LCMS that a desired product was formed as a major component.

The reaction mixture was partitioned between EtOAc/H$_2$O (80 mL/60 mL).

The organic layer was washed using sat. aq. NaHCO$_3$ (60 mL) until PH>7.

The combined organic layers were dried over [Na$_2$SO$_4$], concentrated under reduced pressure, and then obtained a yellow oil (140 mg, crude).

At this time, it was confirmed through HNMR that the yellow oil was a desired product with sufficient purity for the next step.

The mass of the obtained compound ($C_{20}H_{32}BrO_3$) was measured by mass spectrometry-electrospray ionization (MS-ESI), and 478.07; m/z found, 481.0 [M+H]$^+$ was confirmed.

$^1$H NMR (400 MHz, CDCl$_3$) δ 1.20-1.52 (m, 14H), 1.78-1.94 (m, 2H), 2.36 (s, 3H), 2.62 (m, 2H), 3.42 (t, J=6.9 Hz, 2H), 3.81-3.98 (m, 9H).

Step 4. Preparation of (10-(3-bromo-4,5,6-trimethoxy-2-methylphenyl) decyl)triphenylphosphonium bromide A stirred solution of 1-bromo-5-(10-bromodecyl)-2,3,4-trimethoxy-6-methyl-benzene (140 mg, 279.13 umol) and PPh3 (366.06 mg, 1.40 mmol) dissolved in toluene (1 mL) was heated at 130° C. under N2 for 18 hours.

At this time, it was confirmed by LCMS that a desired product was formed.

In addition, it was confirmed by TLC (DCM:MeOH=10:1, Rf=0.2) that one major new peak was formed below OPPh3

The reaction mixture was dried and obtained a brown residue, and it was purified using Flash Column chromatography in silica gel ((25 g, 0-15% MeOH in DCM, for 30 minutes).

The desired product was obtained using freeze-drying, as a white solid (108.5 mg, yield 51.41%, purity 98.2%).

The mass of the obtained compound ($C_{38}H_{47}BrO_3P^+$) was measured by mass spectrometry-electrospray ionization (MS-ESI), and 661.24; m/z found, 663.3 $[M+H]^+$ was confirmed.

$^1$H NMR (400 MHz, CHLOROFORM-d) δ 1.12-1.50 (m, 12H), 1.64 (m, 4H), 2.34 (s, 3H), 2.52-2.71 (m, 2H), 3.77-3.97 (m, 11H), 7.60-7.97 (m, 15H); $^{31}$P NMR (162 MHz, CHLOROFORM-d) δ 24.53 (s, 1 P).

Example 7. SMx and Novel Compound Molecules of Present Application Suppress TRAP1 by Binding to TRAP1 Competitively with Client Protein Cell Culture 22Rv1 cell lines were cultured at 37° C. and 5% $CO_2$, and DMEM-low glucose (Sigma) including 10% fetal bovine serum and 1% penicillin & streptomycin was used as the medium.

Western Blot

22Rv1 cell lines were eeded in the number of 5×10$^5$ on a 60-millimeter plate, and cultured in 3 ml of medium for 24 hours. The next day, the cells were treated with 5 M SMx and SM-series (SB-U005, SB-U009, SB-U011, SB-U012), mitochondrial heat shock protein 90 (TRAP1) and cultured for 2 hours. Whole cell lysates were made from the cultured cells, electrophoresed, transferred to a PVDF membrane, and then treated with a primary antibody at 4° C. for 18 hours. The next day, the whole cell lysates were treated with a secondary antibody for 1 hour and protein expression was analyzed using a western blotting detection reagent (FIG. 24).

The cultured cells were treated with the SMx molecule and novel compound molecules SB-U005, SB-U009, SB-U011, and SB-U012 synthesized in Example 6 as drugs, and the treatment results were normalized with DMSO.

As a result of pull-down assay (FIG. 24), it could be confirmed that when the cultured cells were treated with each novel compound molecule, the concentrations of the client proteins (SIRT3, SDHB) were significantly decreased, as in the results when the cultured cells were treated with SMx in Example 3.3 (FIG. 24). That is, these results can be strong proof that the novel compound molecules of the present application suppress TRAP1 by binding to the middle domain of TRAP1 competitively with the client protein.

Example 8. SMx and Novel Compound Molecules of Present Application have Therapeutic Efficacy for Diabetic Retinopathy (DR)

Analysis of Drug Activity Using MIO-M1 HRE Cell Line

After MIO-M1 Muller cells were transfected with a 5HRE/GFP plasmid (Addgene #46926) (jetPrime kit), plasmid-transfected cells were selected using 1 mg/ml G418 (neomycin) which is a selection marker. A stable cell line was manufactured by selecting cells that were growing in the form of a colony from single cells. The manufactured stable MIO-M1-HRE/GFP cell line was aliquoted into 96 wells and treated with a drug at each concentration the next day. After the cell line was exposed to a hypoxic environment (1% $O_2$) for 24 hours, GFP (Ex/Em: 488/507) fluorescence signals were measured by a SYNERGY NEO microplate reader (BioTek Instrument). As a negative control, DMSO, which is a solvent in which a drug was dissolved, was used, and calculation was performed based on the negative control as 100%.

It can be confirmed that when the MIO-M1 cell line is treated with SMx and the novel compound molecules, a neovascularization factor HIF-1α is suppressed (FIG. 25). It can be seen through this result that the SMx and novel compound molecules of the present application have therapeutic efficacy for diabetic retinopathy (DR).

Example 9. SMx and Novel Compound Molecules of Present Application have Therapeutic Efficacy for Wet Age-Related Macular Degeneration (Wet-AMD)

Cell Culture

Human retinal pigmented epithelium ARPE-19 cells were seeded in the number of 3×10$^5$ on a 60-millimeter plate, and cultured at 37° C. and 5% $CO_2$, and DMEM/F-12 including 10% fetal bovine serum and 1% penicillin & streptomycin was used as the medium for 2 days. Two days later, the cells were treated with DMSO (0.5%), SMx, SB-U005, SB-U009, SB-U011 and SB-U012 at 1 μM and cultured under 1% oxygen conditions in a hypoxia chamber for 6 hours, and then a western blot experiment was performed.

Western Blot

After the cell culture experiment was completed, the cell culture solution was removed, the cells was washed once with cold PBS, and a RIPA solution (50 mM Tris-HCl pH 7.4, 150 mM NaCl, 0.25% Na-deoxycholate, 1% NP-40) was added thereto to harvest cells using a cell scraper. After the cells were sufficiently lysed, a 6× sample buffer was mixed with a cell suspension obtained by low-temperature centrifugation, the resulting mixture was boiled at 95° C. for 5 minutes, and then 12% SDS-PAGE was performed. A gel protein after electrophoresis was transferred to a PVDF membrane at 350 mA for 1 hour and 20 minutes, then blocked (10% skim milk) and reacted at room temperature for 1 hour to prevent non-specific antibody binding. A primary antibody HIF-1α (1:1000) and actin (1:3000) were diluted with an antibody solution (TBS-T with 0.02% sodium azide, 1 mg/ml BSA) and reacted with the membrane overnight at 4° C.

Thereafter, the membrane was washed twice with TBS-T (Tris-buffered saline+Tween-20), and then reacted with a secondary antibody (diluted at 1:5,000) at room temperature for 1 hour. After the membrane was washed twice with TBS-T, changes in protein expression level were measured by a Chemidoc system (GE, LAS 4000) using a Clarity Western ECL substrate (Bio-Rad).

As a result, it could be confirmed that SMx and the novel compound molecules of the present application effectively suppressed HIF-1α in an ARPE-19 cell line (FIG. 26). Through this, it can be seen that the compound of the present application has therapeutic efficacy for wet age-related macular degeneration (wt-AMD).

What is claimed is:

1. A compound of structure represented by the following [Chemical Formula 1], a pharmaceutically acceptable salt or a prodrug thereof:

[Chemical Formula 1]

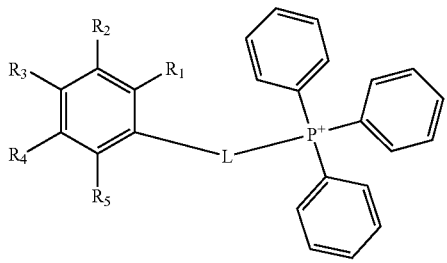

wherein, $R_1$ is H, $C_{1-5}$ alkyl, $C_{2-5}$ alkenyl, or $C_{2-5}$ alkynyl;

$R_3$ and $R_4$ are independently $C_{1-5}$ alkoxy;

$R_2$ and $R_5$ are independently hydroxy, alkoxy or halogen and at least one of $R_2$ and $R_5$ is halogen;

L is —$(CH_2)_n$—; and n is an integer from 5 to 12.

2. The compound of claim 1, wherein the compound of represented by [Chemical Formula 1] is selected from [Chemical Formula 2] to [Chemical Formula 5]:

[Chemical Formula 2]

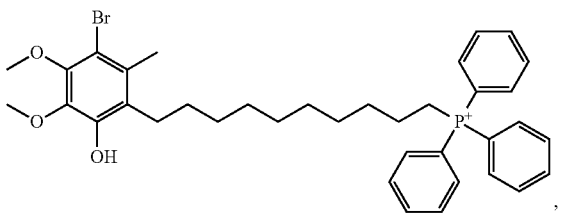

,

[Chemical Formula 3]

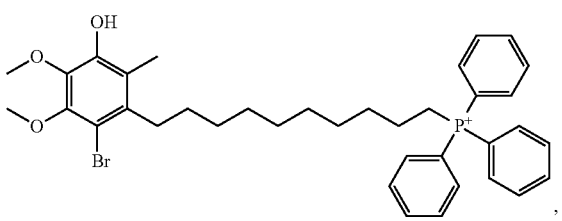

,

[Chemical Formula 4]

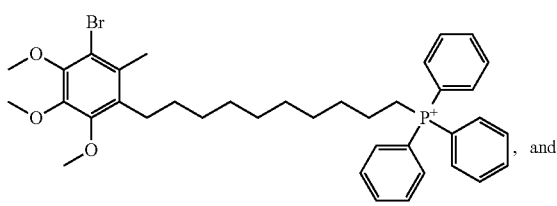

, and

[Chemical Formula 5]

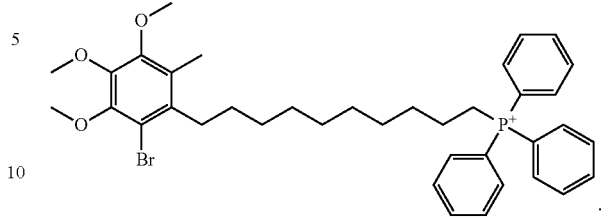

.

3. A method of treating a neovascular ocular disease in a subject in need thereof, comprising administering to said subject a therapeutically effective amount of a compound of a structure represented by the following [Chemical Formula 1], a pharmaceutically acceptable salt or a prodrug thereof:

[Chemical Formula 1]

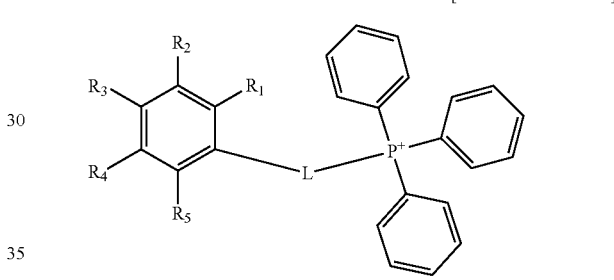

wherein, $R_1$ is H, $C_{1-5}$ alkyl, $C_{2-5}$ alkenyl, or $C_{2-5}$ alkynyl;

$R_3$ and $R_4$ are independently $C_{1-5}$ alkoxy;

$R_2$ and $R_5$ are independently hydroxy, alkoxy or halogen and at least one of $R_2$ and $R_5$ is halogen;

L is —$(CH_2)_n$—; and n is an integer from 5 to 12.

4. The method of claim 3, wherein the [Chemical Formula 1] is selected from [Chemical Formula 2] to [Chemical Formula 5]:

[Chemical Formula 2]

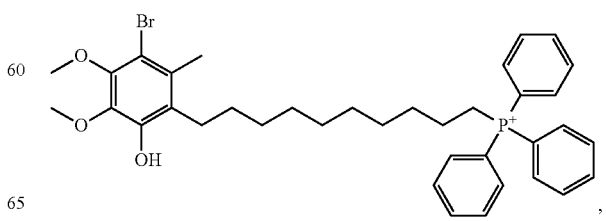

,

[Chemical Formula 3]

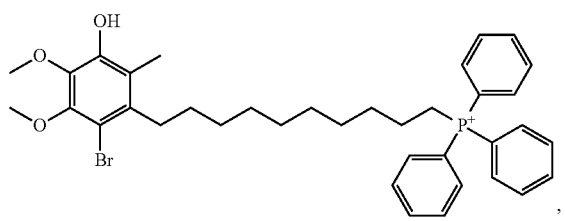

[Chemical Formula 4]

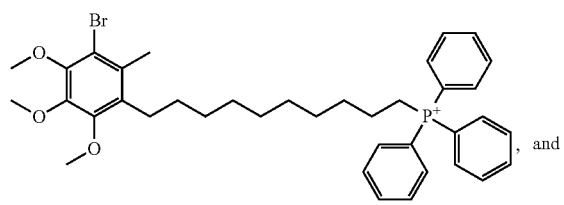
, and

[Chemical Formula 5]

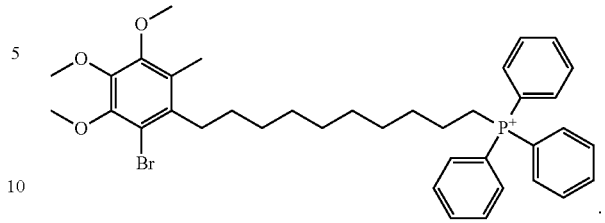
.

5. The method of claim 3, wherein the compound is formulated for eye drops.

6. The method of claim 3, wherein the neovascular ocular disease is selected from choroidal neovascular disease, retinal neovascular disease, subretinal neovascular disease, corneal neovascular disease, iris neovascular disease and neovascular glaucoma.

7. The method of claim 3, wherein the neovascular ocular disease is a retinal neovascular disease selected from diabetic retinopathy, retinopathy of prematurity, and retinal vein occlusion.

8. The method of claim 3, wherein the neovascular ocular disease is wet age-related macular degeneration (wet AMD).

* * * * *